US012560931B2

(12) United States Patent
Altman et al.

(10) Patent No.: US 12,560,931 B2
(45) Date of Patent: Feb. 24, 2026

(54) COLLABORATIVE ORDER FULFILLMENT SYSTEMS AND METHODS

(71) Applicant: IAM Robotics, LLC, Pittsburgh, PA (US)

(72) Inventors: Vladimir Altman, Pittsburgh, PA (US); Krishna Venkatasamy, Sewickley, PA (US); Mansi David, Mars, PA (US); Marjorie Loresch, Pittsburgh, PA (US); Thomas Galluzzo, Gibsonia, PA (US); Richard Rodgers, Oakmont, PA (US); Christopher J. Sullivan, Avon, MA (US)

(73) Assignee: IAM Robotics, LLC, Pittsburgh, PA (US)

( * ) Notice: Subject to any disclaimer, the term of this patent is extended or adjusted under 35 U.S.C. 154(b) by 85 days.

(21) Appl. No.: 18/217,991

(22) Filed: Jul. 3, 2023

(65) Prior Publication Data

US 2024/0004391 A1      Jan. 4, 2024

Related U.S. Application Data

(60) Provisional application No. 63/357,802, filed on Jul. 1, 2022.

(51) Int. Cl.
*G05D 1/00*      (2006.01)
*B65G 1/137*      (2006.01)
*G06V 10/141*      (2022.01)

(52) U.S. Cl.
CPC ......... *G05D 1/0214* (2013.01); *B65G 1/1373* (2013.01); *G05D 1/0274* (2013.01); *G06V 10/141* (2022.01)

(58) Field of Classification Search
CPC .. G05D 1/0214; G05D 1/0274; G06V 10/141; B65G 1/1373
See application file for complete search history.

(56)            References Cited

U.S. PATENT DOCUMENTS 9,552,056 B1 *    1/2017  Barry ..................... B25J 9/1689
10,147,070 B1 *  12/2018  Tate ....................... G06Q 10/08

* cited by examiner

*Primary Examiner* — Adnan M Mirza
(74) *Attorney, Agent, or Firm* — Eckert Seamans Cherin & Mellott, LLC

(57)            ABSTRACT

A "meet me" model of collaboration among autonomous mobile robots (AMRs) and human workers (pickers) to execute picking and putting within a logistics facility. The AMRs include an intelligent platform having an array of indicator elements that illuminate subsets of the indicator elements to indicate tote locations and numbers of items to be received therein. The pickers receive instructions from a central server on a user device that they hold or wear, and the AMRs receive a list of stop locations within the logistics facility. Selection of the picker to provide an item to an AMR as it approaches one of the stop locations may be dynamic as each picker instruction includes a single item type to be delivered to/from an AMR. Moreover, the central server determines timing for sending the instructions to a user device based on a location of the robot designated to collect an item, thus streamlining workflows for each of the AMR and picker.

17 Claims, 30 Drawing Sheets

10 ⌐

20 ⌐

100

146a

71

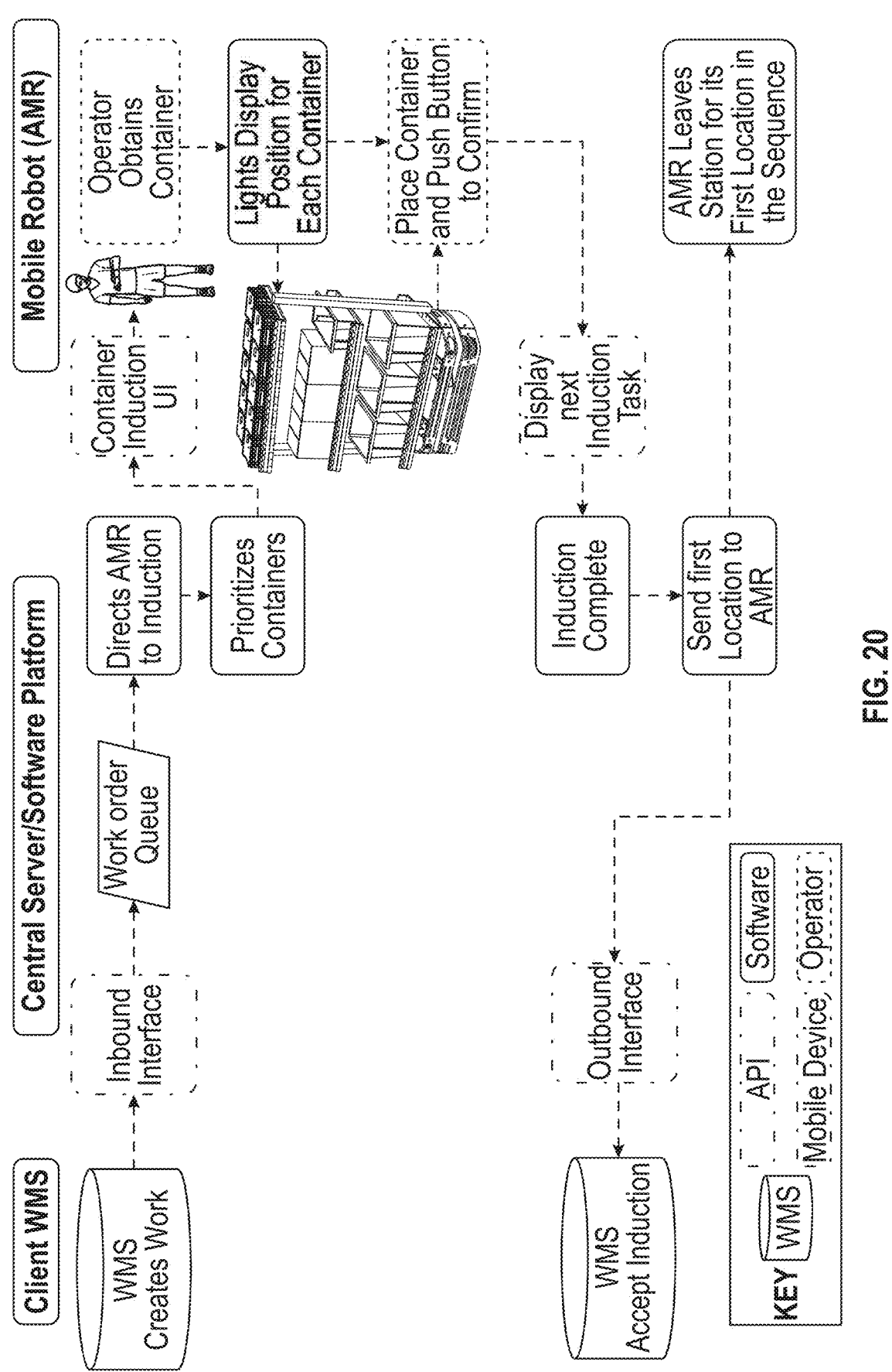

Mobile Robot (AMR)

Operator Obtains Container

Lights Display Position for Each Container

Place Container and Push Button to Confirm

AMR Leaves Station for its First Location in the Sequence

Container Induction UI

Display next Induction Task

Central Server/Software Platform

Directs AMR to Induction

Prioritizes Containers

Work order Queue

Induction Complete

Send first Location to AMR

Inbound Interface

Client WMS

WMS Creates Work

Outbound Interface

WMS Accept Induction

KEY  WMS    API    Software    Mobile Device    Operator

← Picking Workflow                                              ⋮

Complete the Pick                                    (bot-1-10)

LOCATION:                          A1B2

Quantity:                          18

AMR ID:                            bot-1-10

Waiting for robot to arrive (Work Orders)

(Product Details)

COLLABORATIVE ORDER FULFILLMENT SYSTEMS AND METHODS

CROSS-REFERENCE TO RELATED APPLICATIONS

This application claims priority to U.S. Provisional Patent Application Ser. No. 63/357,802 filed Jul. 1, 2022, which is incorporated herein in its entirety.

TECHNICAL FIELD

This invention relates generally to supply chain, manufacturing, and logistics automation equipment, systems, and methods. More specifically, the present disclosure is directed to systems and methods for picking inventory items via orchestrated interaction among a central server, a user device of a human picker, and an autonomous mobile robot.

BACKGROUND

Currently, warehouse and retail facilities follow a standard process for put-away and picking of goods. Items arrive at the facility to a receiving area, typically in cases or pallets, and are registered into a Warehouse Management System (WMS). The WMS is a software database that stores information about the items, such as size, weight, inventory count, storage location, etc. After the items are received into the warehouse or retail facility, they are put-away into their storage locations, generally open shelving or racks. When an order for items is received and registered with the WMS, a work order is created, commonly known as a pick list. The pick list instructs the human worker, or "picker," about the items to be retrieved, i.e., identities, quantities, and locations within the facility. The picker then finds the items and physically transfers them to a shipping container associated with the order.

The time consuming and very manual nature of picking and put-away makes it a costly process. Currently, distribution centers such as warehouse and retail facilities are facing increased pressures on cost and delivery time from the exploding e-commerce industry. Manufacturing processors are facing similar pressures. For example, the common practice of kitting, i.e., bundling of components and materials for assembly of a given product, is not only time consuming, but also subject to human error. This comes at a time when many companies are also facing a national labor shortage. For employees, these changes lead to pressure to increase their pick rates and longer work hours. Additionally, in many distribution centers, the employees may spend more than half of their time walking to the next item location within the facility and searching for the item, cutting their picking efficiencies dramatically.

There are currently many solutions for both optimizing and automating various aspects of the process, ranging from augmenting human labor with various technologies to completely replacing human labor with customized picking equipment and infrastructure. One solution used in many large distribution centers includes automated storage and retrieval systems (ASRS) that bring the items or bins directly to the picker. For example, some systems bring an entire shelving unit to a goods-to-person (G2P) station, where a picker transfers items from the inventory bins to order containers for delivery to stores or individual customers. Other systems bring bins to a centralized shelving unit or "pick wall," thus reducing the time a human picker spends walking through a facility. By delivering the shelves or bins containing the items to the human location rather than having the human go to the individual shelf locations, the humans, and in turn, overall order fulfillment, become more efficient. Such solutions are described in U.S. Pat. No. 9,519,284 assigned to Amazon Technologies, Inc., U.S. Pat. No. 10,583,982 assigned to Hitachi, Ltd., U.S. Pat. No. 11,104,516 assigned to Beijing Geekplus Technology Co, Ltd., and U.S. Pat. No. 11,370,109 assigned to Zhejiang Guozi Robot Tech Co, Ltd.

Other ASRS systems are massively complicated machines that behave like complicated vending machines. Product is stored in custom bins and these bins are sent into the ASRS, which then places the bins into a number of storage locations within the ASRS. The ASRS can retrieve the bins when the product is needed. In most cases, such automation systems require a complete overhaul of the distribution site or require specialized shelving units and/or storage containers that the robots can lift and move within the distribution site. This requires a significant up-front investment from the facility, which may be difficult to afford and is the main reason many automation solutions have not been widely adopted. One such solution is described in U.S. Pat. No. 11,279,558 assigned to Symbotic LLC.

Systems that rely on human-robot interactions are also common. As disclosed in at least U.S. Pat. Nos. 9,834,380 and 11,345,546, both assigned to 6 River Systems, Inc., a robot is configured to lead a human picker to a pick location, or vice versa, whereupon the human picks an item and deposits the picked item into a bin on the robot (i.e., a "follow me" model of human-robot collaboration). Alternatively, as disclosed in at least U.S. Pat. Nos. 10,354,214 and 11,034,027, both assigned to Locus Robotics Corp, the robot proceeds to a location adjacent an item to be picked and visually displays a signal to indicate that it is waiting on a human picker to complete a pick (i.e., transfer of an expected item by a human picker in a "find me" model of human-robot collaboration).

While these latter two models of picking and/or put-away offer improvements on the previous systems that require a complete overhaul of the distribution center, they fail to fully address the labor shortage companies are currently facing. For example, in the follow-me model, the human worker is still required to walk significant distances within a facility. In the find me model, the human worker must search for and find robots that are waiting and pick items indicated on the screen of the waiting robot. While this may save the human picker from walking large distances within a facility, it may not suitably address the current labor shortage issues. That is, in the find me model, a sufficient number of human pickers must be stationed throughout a facility to be aware of waiting robots, and the human picker is not informed of a pick action until they have arrived at the waiting robot, i.e., time is wasted waiting on the human-robot interaction to start the pick action.

Accordingly, what is needed are improved methods for collaboration between human pickers and robots that may address some or all the aforementioned issues noted for current order fulfillment systems.

SUMMARY

The present invention provides a "meet me" model of human-robot interaction, wherein the human picker is working continuously and efficiently to execute pick or put actions provided on a held or worn user device and deposit picks to and/or accept puts from a plurality of autonomous mobile robots that are each working to collect items to complete one or more orders. The disclosed system may function in a wide range of logistics facilities, including those previously configured for only human pickers. Moreover, the disclosed system is fully dynamic, allowing for robust response to changes in the human and/or robot workforce.

Accordingly, the present disclosure provides an autonomous mobile robot comprising a mobile base and a platform positioned above and vertically separated from the mobile base, the platform comprising an array of indicators spaced along opposing first and second horizontal edges thereof, and a pick to light controller in communication with the array of indicators and a processor of the mobile base. In addition to the processor, the mobile base includes a memory, a remote communication interface, and sensors including forward and rear facing cameras and a navigation sensor, wherein the memory comprises computer program instructions executable by the processor to receive data from and send data to a central server, process data received from each of the plurality of sensors, and output control signals to the mobile base for autonomous navigation and obstacle avoidance. Based on instructions from the processor, the pick to light controller of the platform is configured to illuminate subsets of the array of indicators to (i) define individual regions of the platform that delimit positions for tote placement, (ii) identify target totes for item placement by a human picker and a number of items to be placed therein, and/or (iii) identify totes to be removed from the platform. The pick to light controller may further send signals to the processor indicating a user interaction with one or more of the array of indicators.

The present disclosure further provides a system for item picking in a logistics facility, wherein the system comprises an autonomous mobile robot as defined hereinabove, and a user device having a display screen and designed to be worn or held by a human picker. For example, the user device may include a housing comprising a reader processor, a reader memory, a reader communication interface, a reader sensor, and a display screen, wherein the user device is configured to receive, from the central server, identification information for a pick or put item and a number of the pick or put item, and display the identification information and number on the display screen, along with an identity of a robot to receive the pick item and/or provide a put item. Additional information pertinent to the individual human picker may also be displayed on the display screen of the user device, such as any one or more of personalized messaging, location assistance (e.g., maps and/or directions to the next item), performance statistics, and a dynamic help functionality that may reduce the time required to train new human pickers. The user device may be further configured to read an ID tag on a pick or put item and send a signal regarding the read to the central server.

According to certain aspects of the system, the pick to light controller on the autonomous mobile robot may be configured to cause a target subset of lights defining a target bin on the platform to illuminate, indicating to the human picker a correct location of the pick or put item (i.e., to place or remove, respectively). The pick to light controller may be further configured to cause a target subset of display elements to display a number of items to be picked and placed in the target bin or items to be removed therefrom and put to inventory shelves, or other identifying information. The pick to light controller may receive confirmation of receipt of the picked item in the target bin or removal of a put item therefrom, such as via a selection button, e.g., as depressed by the human picker.

The present disclosure further provides a method for picking within a logistics facility. One implementation of the method generally comprises: receiving, at a central server, a plurality of orders each including at least one item to be picked; generating, at the central server, a robot task list comprising a list of stop locations within the logistics facility, and a first picker task list comprising a first item in one or more orders of a group of orders assigned to a robot, a number of the first item to be picked, a location of the first item within the logistics facility, and an identity of the robot; sending, from the central server, the robot task list to a processor of the robot; and calculating, at the robot processor, a route within the logistics facility to each of the stop locations, and sending output control signals to a drive system of the robot for autonomous navigation to a first stop location in the list of stop locations.

The picking method further comprises: sending, from the central server, the first picker task list to a processor of a user device worn or carried by a first human picker; receiving, at the central server, a scan signal from the user device of the first human picker, wherein the scan signal includes information from a read by the user device of any one or more of: an item ID tag on the first item, a shelf ID tag on a shelf holding the first item, and a bin ID tag of a bin in which the first item is stored on the shelf; and receiving, at the robot processor from the central server, an instruction to illuminate a subset of indicators on a platform of the robot to designate a target tote positioned on the platform and a first number of the first item to be placed in the target tote by the first human picker; illuminating the subset of indicators on the platform of the robot and displaying the first number of the first item; and receiving a verification signal indicating the first item is received in the target tote, and sending the verification signal to the central server.

The steps of illuminating the next subset of indicators and receiving the next verification signal may be continued until all the first item picked by the first human picker are received to totes on the robot, i.e., the central server has received all expected verification signals at the first stop location. The method may further comprise sending output control signals to the drive system of the robot for autonomous navigation to a next stop location in the list of stop locations; and receiving a next item from a next human picker, wherein the next item is found in one or more of the orders of the group of orders assigned to the robot.

In the disclosed picking method, the robot receives items from a plurality of human pickers and each human picker delivers items to more than one robot. The central server determines timing for sending the first picker task list to the user device of the first human picker based on a location of the robot. Thus, in this model, the robot and human picker meet at a location to execute the picking action. This allows the human picker to provide item picking within a specific region of a logistics facility and reduces downtime between item picks as the next pick action for the human picker may initiate as soon as they have completed a prior pick action. Moreover, the disclosed method allows for dynamic selection of the human picker to complete a pick action based on proximity to the robot, experience level of the human picker, availability of the human picker, and the like. As such, the method also reduces downtime for the robots as they do not have to wait for a human picker to be available.

The disclosed picking method may work equally well for item put-away, i.e., put. That is, in the method, the group of orders assigned to a robot may alternately, or additionally, include at least one item to be put. As such, the first picker task list may alternately include an identity of the robot holding the put item, a tote location of the put item on the robot, and a location within the logistics facility to place the put item. The method may then include receiving, at the robot processor from the central server, an instruction to illuminate a subset of indicators on a platform of the robot to designate a target tote positioned on the platform holding the put item; illuminating the subset of indicators on the platform of the robot; and receiving a verification signal indicating the put item is removed from the target tote and sending the verification signal to the central server. The method may also include sending a scan signal from the user device of the first human picker to the central server, wherein the scan signal includes information from a read by the user device of any one or more of: an item ID tag on the put item, a shelf ID tag on a shelf on which the put item is placed, and a bin ID tag of a bin in which the put item is placed on the shelf.

The present disclosure further provides a method for configuring an autonomous mobile robot for order fulfillment, i.e., induction. One implementation of the method for induction generally comprises: generating, at a central server, an induction configuration for a mobile robot, wherein the induction configuration includes a target location for at least one tote on a platform of a mobile robot; sending the induction configuration to a processor of the mobile robot and a user device; causing a subset of indicators of an array of indicators positioned on opposing first and second horizontal edges of a platform on the mobile robot to illuminate, wherein the subset of indicators define a target location for a first tote on the platform; receiving from the user device a scan of an ID tag on a tote that is to be positioned on the target location; receiving a signal from the mobile robot indicating the tote has been placed on the target location.

The induction method may further comprise, upon receipt of the signal, causing a next set of indicators to illuminate, wherein the next set of indicators define a target location for a next tote on the platform; receiving from the user device a scan of an ID tag on a next tote that is to be positioned on the target location; receiving a signal from the mobile robot indicating the next tote has been placed on the target location; and repeating the process until all totes in the induction configuration are positioned on the platform of the mobile robot.

The disclosed induction method may optimize the induction configuration based on a group of orders to be assigned to the robot, e.g., the size of each tote is selected based on a single order to be placed thereon. Alternatively, or additionally, the induction configuration may allow the induction of unassigned totes to the robot, i.e., totes not having an order assignment. This latter may support of real-time allocation of rush orders while the robot is in the process of executing a mission. This would allow a fulfillment operation to react more quickly in completing highest priority orders.

The present disclosure further provides a method for order delivery to a shipping or packing station, i.e., drop off, within a logistics facility. One implementation of the method for drop off generally comprises: generating, at a central server, a robot drop off task list comprising a list of stop locations within the logistics facility, wherein the stop locations are at one or more packing/shipping stations; sending, from the central server, the robot drop off task list to a processor of the robot; calculating, at the robot processor, a route within the logistics facility to each of the stop locations; and sending output control signals to a drive system of the robot for autonomous navigation to a first stop location in the list of stop locations.

The drop off method further comprises: at the first stop location, sending, from the central server to the robot processor, an instruction to illuminate a subset of indicators of an array of indicators positioned on opposing first and second horizontal edges of a platform on the robot to designate a target tote positioned on the platform to be removed therefrom; illuminating the subset of indicators; receiving at the central server one or both of (i) a scan of an ID tag on the target tote from a user device of a human operator and (ii) a verification signal indicating the target tote is removed from the robot is received in the target tote; and sending the verification signal to the central server signal. The steps of illuminating the subset of indicators and receiving the verification signal may be continued until all totes to be delivered at the first stop are removed from the robot, i.e., the central server has received all expected verification signals at the first stop location. The method may further comprise sending output control signals to the drive system of the robot for autonomous navigation to a next stop location in the list of stop locations and repeating the drop off steps until all totes from the robot have been removed. The stops of the robot drop off task list may be packing and/or shipping stations, wherein the shippers may be different shippers, stations receiving packages meant for different transport vehicles (e.g., trucks) of the same shipper, and the like.

BRIEF DESCRIPTION OF DRAWINGS

Aspects, features, benefits, and advantages of the embodiments herein will be apparent with regard to the following description, appended claims, and accompanying drawings. In the following figures, like numerals represent like features in the various views. It is to be noted that features and components in these drawings, illustrating the views of embodiments of the present disclosure, unless stated to be otherwise, are not necessarily drawn to scale. The illustrative embodiments in the following drawings are not meant to be limiting; other embodiments may be utilized, and other changes may be made without departing from the spirit or scope of the subject matter presented herein.

FIG. 20 illustrates the flow of information among a central server, user device, and autonomous mobile robot during induction according to aspects of the present disclosure.

DETAILED DESCRIPTION

Figure 1:
FIG. 1 illustrates a system for collaborative order fulfillment including a user device and an autonomous mobile robot with an intelligent shelving system according to aspects of the present disclosure.

The present disclosure describes systems and methods for collaboration between autonomous mobile robots ("AMRs") and human pickers ("pickers") to execute streamlined picking or put away, i.e., put, in a logistics facility. A central server receives orders comprising at least one item to pick or put and provides separate task lists to an AMR and a user device held or worn by a picker in the logistics facility. The picker's task list comprises an item to be picked or put, while the AMR's task list includes stop locations within the logistics facility, generally within the vicinity of the item. The picker and AMR will then meet at the stop location to coordinate the pick or put action.

The picker generally picks within a smaller region of the logistics facility to provide picks for multiple orders across many AMRs while the AMR travels to receive items from one or more pickers to complete one or more orders. Identification of a tote on the AMR for placement of a picked item may be via lights on an intelligent platform of the AMR. Verification of a pick may be made by the picker via their user device (scan barcode or key in entry on display screen or keypad) and/or via buttons on the intelligent platform, specifically, buttons associated with a tote or other location to which the picked item is placed on a platform of the AMR.

In this "meet me" model of human-robot interaction, the picker is working continuously and efficiently to execute each pick action provided as a task on their user device, and the robot is working continuously to arrive at stop locations provided on the robot task list. The software coordinating this interaction may provide dynamic assignment of pickers to pick items to a robot, such as based on picker location in the logistics facility, picker availability, and/or picker experience, and dynamically add an order to a working AMR, i.e., add one or more stop locations to the AMR's task list, and thus provides more efficient picking and fulfillment of orders within a logistics facility.

The AMRs disclosed herein are configured to accept a broad range of individual or grouped items, bins, totes, cases, pallets, and the like. Moreover, the system disclosed herein is configured to work in any number of logistics facilities, such as warehouses, distribution centers, manufacturing facilities, retail facilities, and the like. The presently disclosed systems and methods utilize both robotics hardware and software technologies that are detailed in the following description. The above summary and drawings are not intended to describe or show each illustrated embodiment or every possible implementation of the present disclosure.

Definitions and Abbreviations

As used herein, an autonomous mobile robot ("AMR") should be understood to include any wheeled robot configured for autonomous travel and navigation. As disclosed herein, an AMR includes a processor, memory, and sensors, and is configured with computer program instructions executable by the processor to process data received from the sensors, and output control signals to the mobile base for autonomous navigation and obstacle avoidance. The AMRs presently disclosed are specifically configured to transport individual or grouped items, as well as totes, bins, cases, pallets, and the like. These items may be received from or delivered to a human worker or picker, or may be received from or delivered to a conveyance system.

A "human picker" or "human worker" or "picker" is any person tasked with selecting items, groups of items, bins, totes, cases, and the like from within a logistics facility and delivering those items to an AMR or other location, i.e., picking, or vice versa, placing those items from an AMR to a shelf or other location, i.e., putting. These terms may also refer to any person working in the logistics facility to enable induction and/or drop off of totes, management of the autonomous mobile robots, i.e., exchanging batteries of the robot, and the like. The AMRs in collaboration with pickers form a system configured to pick and put individual or grouped items, totes, bins, cases, pallets, and the like within a logistics facility.

As defined herein, a Stock Keeping Unit (SKU) refers to a distinct item, and embodies attributes associated with the item that may distinguish it from another item. For a product, these attributes may include, but are not limited to, the product manufacturer, product description, material, size, shape, color, weight, and packaging. Further, an individual SKU may also have a code imprinted thereon which may indicate some of the same above attributes. Examples of such codes include at least 1D-barcodes such as a Universal Product Code (UPC), International Article Number (EAN), Global Trade Item Number (GTIN), Code 39 barcode, Code 128 barcode, Interleaved 2 of 5 (ITF), Code 93, Codabar, GS1 databar, and MSI Plessy. Examples further include 2D-codes such as a QR code, Datamatrix code, PDF417 code, Aztec code, and ArUco markers. Examples further yet include RFID tags.

The terms "goods," "products," "items," and SKUs may be used interchangeably, and may be taken to indicate items that need to be retrieved and/or stored. Such items can include any consumer product, including but not limited to, packaged and unpackaged products, and items that are not generally considered consumer products (e.g., library items, parts for kitting operations). Furthermore, while each of these terms is generally understood to indicate a single unit, these terms may refer to groups of these units packaged together, such as in a multipack or in a case.

The process of selecting and retrieving items, bins, or cases from a specific storage location in a facility is referred to as "picking." The process of breaking cases for individual product picking, i.e., taking the individual items from the case or pallet and placing them in a specific storage location in a facility, is called "put-away" or "putting" or "replenishment." Likewise, put-away may also include breaking multipacks for storage of the individual items or "eaches." Put-away may also comprise placing pallets, bins, totes, cases, multipacks, or individual items in a specific location within a facility. Picking and putting occurs in distribution warehouses, manufacturing facilities, and retail centers.

The term "kitting" may be understood to mean picking items useful in a manufacturing process, such as to build a product, and placing those items to a tote, i.e., part kit. Part kits are used in manufacturing environments to present a set of parts to a manufacturing technician at a workstation.

The terms "storage" and "data storage" and "memory," when used in the context of a computer system or method, may be used interchangeably, and may be taken to indicate both transient and permanent storage (i.e., on a non-volatile memory hardware device) of data on a computer.

The term "logistics" facility may be taken to mean any facility that provides for the efficient production, storage, and/or flow of goods. Exemplary logistics facilities include at least warehouses, distribution centers, retail centers, fulfillment or flow centers, and manufacturing facilities.

The terms "shelf" and "rack" are used to indicate a storage unit within a logistics facility. As used here, however, these terms may also refer to locations or regions of interest within a logistics facility. Moreover, while the term "slot" is used with respect to a shelf or rack to indicate a defined section having specifically delimited edges, the term slot may also be understood to refer to a region of interest. Thus, for example, a slot may be understood to indicate a general position on a floor within a logistics facility, e.g., bay, or on a shelf in which an item or tote or bin may be stored. For ease of readability, the term "shelf" will generally refer to a shelf or other storage location or area in a logistics facility, while the term "platform" will be used when referencing a storage region on an AMR of the present disclosure.

The terms "tote" and "bin" are also used interchangeably and may be taken to mean a container used to store products or goods while they are located on a shelf within a logistics facility, or as they are moved throughout the logistics facility on an AMR or conveyor belt. Exemplary containers include at least plastic, metal, wood, or cardboard bins or boxes, and plastic, metal, wood, or cardboard trays. Any of these containers may be specialized or may be standard examples of such a container, e.g., a standard commercially available plastic bin or cardboard box. Additionally, individual items or boxes may be packaged together and may form a tote or bin as used herein, such as by shrink wrapping, or in a case or multipack. For ease of reading, the term "tote" will generally refer to containers on an AMR and "bin" will generally refer to containers holding items on a shelf within a logistics facility. Moreover, while reference is made to picking and/or putting items to a bin or tote, such reference will generally be understood to include picking items directly from a space on a shelf or platform and putting to a space on a shelf or platform.

The term "warehouse management system" or WMS may be understood to mean any database which stores information about items or products stored within a logistics facility, and may include the product size, weight, inventory count, storage location, etc. The terms "warehouse execution system," or WES, and "warehouse control system," or WCS, "manufacturing execution system," or MES, and "enterprise resource planning," or ERP may be understood to mean a software application that directs the real-time activities within logistics facility. Each of WMS, WES, MES, WCS, and ERP are used interchangeably herein, and reference to one may comprise reference to any or all these terms. Moreover, the term "remote server" may be used to refer to at least a processor/memory of a computing system remote from the robotic system being discussed, such as the central server or cloud-based server.

As used herein, the terms "ID tag" may refer to an object used to identify a location and/or an individual item (e.g., a SKU). Most commonly, an ID tag may be a fiducial marker placeable in the field of view of an imaging system. Exemplary fiducial markers include at least 1D and 2D barcodes and ArUco markers. ID tags may alternatively, or additionally, include information readable by a human worker or picker, such as words and/or alphanumeric codes. ID tags may also be understood to refer to an object that is not visually perceived, such as RFID, sound, or tactile markers that may identify or differentiate an identity.

Unless defined otherwise, all technical and scientific terms used herein have the same meanings as commonly understood by one of ordinary skill in the art.

As used in the specification including the appended claims, the singular forms "a," "an," and "the" include the plural, and reference to a particular numerical value includes at least that value, unless the context clearly dictates otherwise. For example, "an" indicator element, "a" platform, or "the" AMR is a reference to one or more indicator elements, platforms, or robots, or assemblies and equivalents thereof known to those skilled in the art, and so forth.

The use of "or" means "and/or" unless specifically stated otherwise.

"Including" and like terms means including, but not limited to. When ranges are given, any endpoints of those ranges and/or numbers within those ranges can be combined within the scope of the present invention.

The word "comprising" and forms of the word "comprising," as used in the specification including the appended claims, does not limit the present invention to exclude any variants or additions.

Various aspects of the systems and methods for collaborative order fulfillment disclosed herein have been illustrated with reference to one or more exemplary implementations or embodiments. As used herein, the term "exemplary" means "serving as an example, instance, or illustration," and should not necessarily be construed as preferred or advantageous over other variations of the devices, systems, or methods disclosed herein. "Optional" or "optionally" means that the subsequently described event or circumstance may or may not occur, and that the description includes instances where the event occurs and instances where it does not. In addition, the words "comprising," "including," and "having" as used herein mean "including, but not limited to."

Various aspects of the systems and methods for collaborative order fulfillment may be illustrated by describing components that are coupled, attached, and/or joined together. The terms "coupled," "attached," and/or "joined" are interchangeably used in this disclosure to indicate either a direct connection between two components or, where appropriate, an indirect connection to one another through intervening or intermediate components. In contrast, when a component is referred to as being "directly coupled", "directly attached," and/or "directly joined" to another component, there are no intervening elements shown in said examples.

Relative terms such as "lower" or "bottom" and "upper" or "top" are used herein to describe one element's relationship to another element illustrated in the drawings. It will be understood that relative terms are intended to encompass different orientations of aspects of the system in addition to the orientation depicted in the drawings. By way of example, if aspects of an AMR shown in the drawings are turned over, elements described as being on the "bottom" side of the other elements would then be oriented on the "top" side of the other elements as shown in the relevant drawing. The term "bottom" can therefore encompass both an orientation of "bottom" and "top" depending on the particular orientation of the drawing.

"Substantially," as used herein, is understood to mean to a great or significant extent, such as at least 80%, or 90%, or 95%, 96%, 97%, 98%, or even 99%. For example, when an object is described as having a property substantially the same as a comparative such as a diameter or shape or position (e.g., perpendicular or parallel), etc., the property will be within at least 80% of the value of the comparative.

The inventions detailed in this disclosure are not limited to the specific devices, methods, processes, elements, or parameters described and/or shown herein and the terminology used herein is for the purpose of describing the various embodiments and is by way of example only and not intended to be limiting of the claimed invention. All patents and other publications identified in this specification are incorporated by reference as though fully set forth herein.

In the following description, certain details are set forth to provide a better understanding of various embodiments of a collaborative order fulfillment system and method. However, one skilled in the art will understand that these embodiments may be practiced without these details and/or in the absence of any details not described herein. In other instances, well-known structures, methods, and/or techniques associated with methods of practicing the various embodiments may not be shown or described in detail to avoid unnecessarily obscuring descriptions of other details of the various embodiments.

Embodiments of the Present Disclosure

The present disclosure relates to a system that provides collaboration between autonomous mobile robots (AMRs) and human pickers (pickers) to provide streamlined picking and putting within a logistics facility. With reference to FIG. 1, the AMRs 100 are configured to receive items, groups of items, bins, totes, cases, etc. from a picker 20, or from a conveyance system (see FIG. 18). The AMRs 100 are configured to provide items, groups of items, bins, totes, cases, etc. to a picker 20, or to a conveyance system. The AMRs 100 are further configured for autonomous travel throughout the logistics facility.

The picker 20 is provided with a user device 30 that includes at least a display screen. A task list may be provided to the user device 30 and the AMRs 100 from a software application running on a central server. Accordingly, the system 10 of the present disclosure includes at least one user device 30 and at least one AMR 100, wherein activities of each may be organized and directed by the central server. The system 10 may further comprise a server, i.e., the central server, as described in detail below. Reference throughout the following description will be to a central server with the understanding that such a server may be accessible through any network and includes one or more software applications that execute the following methods. The system may further yet comprise one or more intelligent shelves 40, i.e., shelving comprising indicator bars 49 having elements controllable via a pick to light controller, as described in detail hereinbelow.

Figure 23:
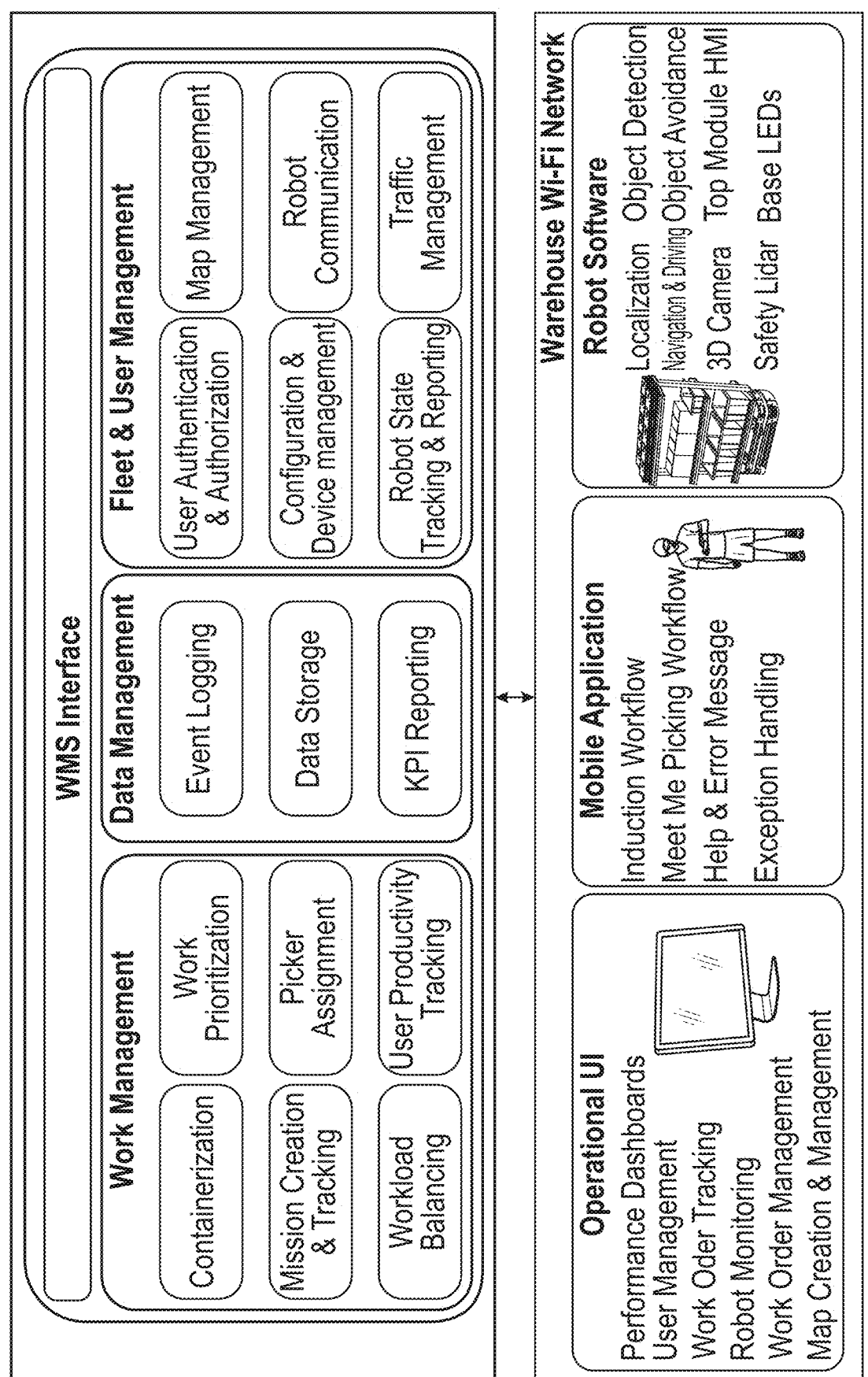
FIG. 23 illustrates a block diagram of the various software modules of the collaborative order fulfilment system of the present disclosure according to aspects of the present disclosure.

The disclosed system 10 can integrate with an application software layer to receive digital orders, such as from an e-commerce site or a warehouse management system (WMS). With reference to FIG. 23, the digital orders may be translated into system configuration and operations by the central server for orchestration of the collaborative order fulfillment methods disclosed herein. Such orchestration may include controlling and planning distribution of item types and numbers across different AMRs 100 and/or totes on those AMRs; controlling and planning distribution of pick orders across different pickers 20, as relayed on user devices 30 held or worn by the pickers; and/or controlling loading of items to specific AMRs 100 and totes thereon (i.e., work management). Orchestration may also include monitoring robot state and traffic management, and communications to/from the user devices and AMRs; and adapting operations in response to monitored conditions of the logistics facility, picker(s) 20, and/or AMRs 100, or in response to item inventory, changes in orders, and/or other factors (i.e., fleet and user management).

Figure 16:
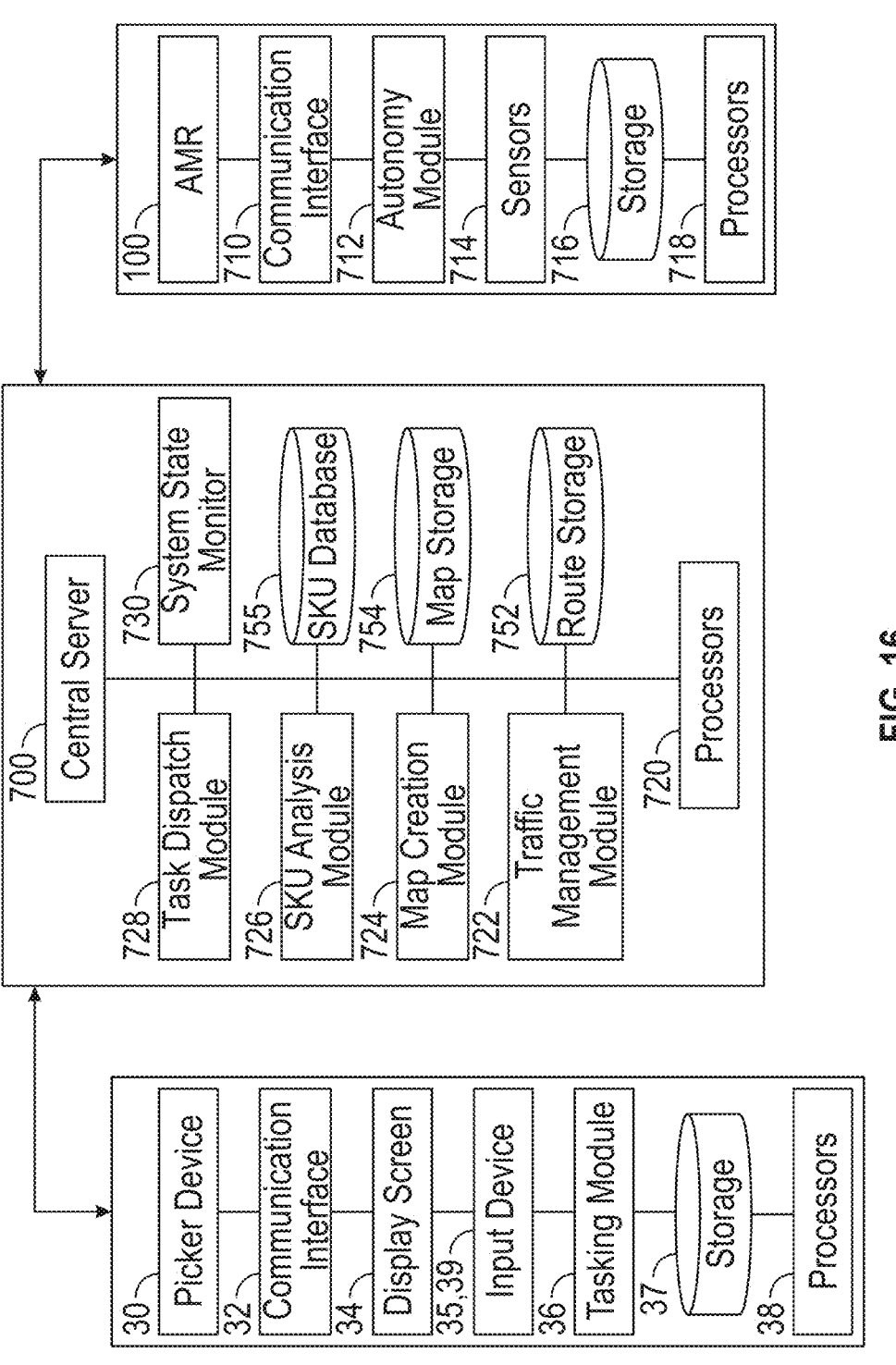
FIG. 16 illustrates a block diagram of a collaborative order fulfillment system with hardware and software modules of a central server or "central server" and a plurality of autonomous mobile robots and user devices according to aspects of the present disclosure.

While one arrangement of functions for each of the application software layer (e.g., backend services) and various user modules is disclosed and discussed herein, such as with reference to FIGS. 16 and 23, alternative arrangements of the system 10 are possible and within the scope of the present invention. Accordingly, reference herein to the central server may be understood to include reference to either or both the application software layer and the user modules unless specified otherwise.

Collaborative Systems

Figure 17:
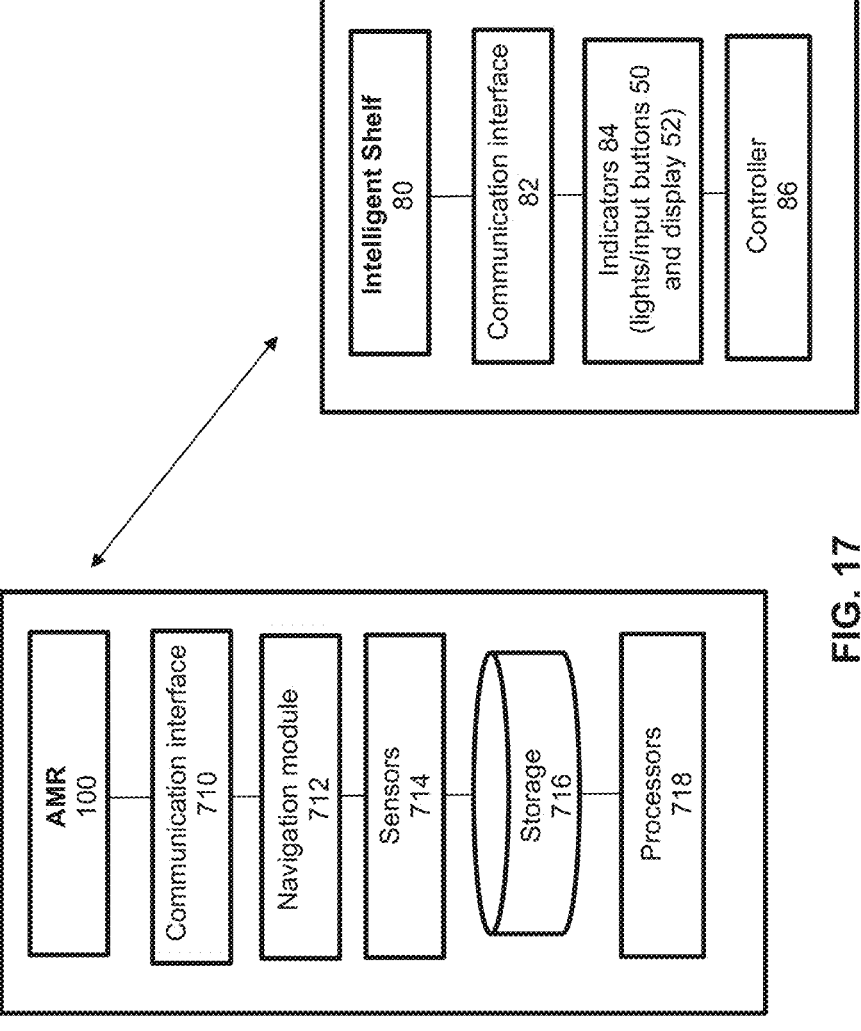
FIG. 17 illustrates a block diagram of the hardware and software modules of the autonomous mobile robots and intelligent shelves according to aspects of the present disclosure.

Coordination of the tasks provided to each of the picker(s) 20. i.e., via their user device 30, and the AMR(s) 100 is provided by the central server. With reference to FIGS. 16 and 17, the central server 700 comprises processor(s) 720, a memory (e.g., one or more of 752, 755, 754), and a communication interface (i.e., network enabled), which may be local to the logistics facility or may be accessible as a software application via the cloud. The central server 700 receives an order and coordinates fulfillment of the order by one or more AMRs 100 and pickers 20.

As example, an order may include ten items that are positioned throughout the logistics facility, wherein only two of the items are in close proximity to each other. The central server 700 may generate nine task lists for nine individual pickers 20, wherein eight of the lists include a single item from the order and one of the lists includes the two items from the order that are in close proximity. The central server 700 will dynamically assess where pickers 20 are located throughout the logistics facility and will send the nine task lists to the user devices 30 of the nine pickers 20 who will be closest to the item(s) on their received list at the time of picking.

At the same time, the central server 700 may generate a single task list for an AMR 100 (i.e., work order) that includes nine stop locations within the logistics facility close to each of the nine pickers 20 responsible for picking each of the items of the order. A processor 718 of the AMR 100 will generate a route map that optimizes the route through-out the logistics facility to each of the nine stop locations.

Of note, the central server will be coordinating many orders across many AMRs 100 and pickers 20. Thus, a single AMR 100 may be configured for receipt of multiple orders and each picker 20 may be picking items for multiple orders that may be placed on a plurality of AMRs 100. Thus, while the AMR 100 is moving about the logistics facility to receive items from pickers to complete or fulfill one or more orders, the pickers 20 are picking items for multiple orders and thus do not individually aid in completing or fulfilling orders assigned to a single AMR 100, unless the order includes a single item or two items that happen to be in close proximity to each other in the logistics facility (i.e., the picker would be sent two separate task lists each including one of the two items).

The central server 700 not only coordinates which AMRs 100 are receiving orders and which pickers 20 are picking items, but also the timing of these actions so that the item pick action of the picker 20 and the item receipt action on the AMR 100 is coordinated, i.e., timely so that neither is waiting on the other. In this way, the central server 700 is optimizing the walking distance of the picker 20 across fulfillment of multiple orders. Moreover, the central server 700 may expedite order fulfillment by grouping individual orders having many of the same item, or many items located in a similar position within the logistics facility, on a single AMR 100. Thus, a single picker 20 may be tasked with picking a number >1 of a single item, wherein specific numbers of the item may be placed in different totes on a first AMR. The same picker 20 may then be tasked with picking a number >1 of a next single item, wherein specific numbers of the next item may be placed in different totes on a second AMR. If the items are in proximity, the central server 700 may send two separate task lists to the same picker 20, each including instructions for picking the item and next item, respectively, wherein each task list indicates specific numbers of the item and next item are to be placed in totes on the same AMR 100.

This method of picking streamlines the picking and order fulfillment process as a picker can pick from a single item location to fulfill multiple orders. Prior art methods would instruct the picker to make picks on a per order basis, e.g., even for picks of the same item in different orders, the picker would receive multiple instructions for the same item occurring in multiple orders, and would thus make multiple pick actions for equivalent items (i.e., trips back to the same item location). Moreover, the method may include separate or simultaneous putting (i.e., put-away), enabling a picker to replenish inventory while remaining is a subsection of the logistics facility. Both order fulfilment and inventory replenishment actions may be executed from the same AMR.

Accordingly, and with reference to FIG. 16, computation on the central server 700 may be executed by one or more internal processors 720 that execute one or more software modules to enable order fulfillment coordination (722, 724, 726, 728), and may store or access information regarding maps of the logistics facility 754, optimal routes within the logistics facility 752, and SKU information for items stored in the logistics facility 755.

For example, the processing of SKU information may be executed within a SKU analysis software module 726. The SKU information can include SKU size and shape data, which can include physical dimensions, item weight, appearance information that can include images, and/or may include SKU marking codes, which can include barcode and UPC data. Additionally, the SKU information may include location information for that SKU within the logistics facility, such as a position on a rack and/or shelf and/or on a global map of the logistics facility.

Further, a task dispatch module 728 analyzes orders received from an application software layer and determines which of the plurality of AMRs 100 is to be assigned to an order, and the stop locations proximate to items in the order, which are provided to the selected AMR as an AMR task list. The task dispatch module 728 may also assign replenishment activities to an AMR and provide the stop locations proximate to the regions/shelves on which the replenishing items are to be placed as part of the robot task list. The central server 700 also assigns pickers 20 that are to pick the items in that order or put the items to shelves for replenishment. The pickers 20 may be selected dynamically, such as at a time closer to when an AMR 100 is to arrive at one of its stop locations or when it leaves a prior stop location, wherein the selection may be based on picker 20 availability, experience, and proximity to the item in the logistics facility. The task dispatch module 728 instructs the AMR 100 with stop locations only, and the autonomy module 712 of the AMR 100 calculates the navigation route to each of the stop locations.

The task dispatch module 728 provides the pickers 20 via their user devices 30 with a picker task, which may include at least an item identification for the item to be picked (e.g., SKU, picture, etc.), a total number of the item to be picked, a location within the logistics facility for the item, and an identity of the AMR 100 expected to accept the item (i.e., such as a tag or number visible on the AMR, e.g., license plate). Alternatively, or additionally, the task dispatch module 728 provides the pickers 20 via their user devices 30 a shelf identification for where an item for replenishment is to be placed. The task dispatch module 728 may further provide maps or walking routes to assist in locating the items.

The task dispatch module 728 works closely with a system state monitor 730 to obtain key feedback information from the system. The system state monitor 730 may communicate with the AMRs 100 and picker devices 30 to keep track of their current physical locations within the facility, along with status information, which may include but is not limited to: whether the AMR 100 and/or picker 20 is currently assigned an order, any faults or error modes, health information such as remaining battery power or charging status of the AMR 100, inventory information, status of the picker 20 (e.g., taking a break, in need of assistance, etc.), and the like. Communication between the pickers 20 and the system state monitor 730 may be via their user devices 30 and/or their interactions with an AMR 100.

Inventory and SKU status information may also be shared with the central server 700 and/or application software layer, WMS, etc. by the AMRs 100 and/or user devices 30. For example, if a certain SKU is absent, misplaced, or in a position that is not readily retrievable by the picker 20, or the wrong item is found in the location of an expected item (SKU), the picker 20 may indicate such on their user device 30, which may then send this information to the central server 700. The central server 700 may dynamically reroute the AMR 100 responsible for the order including that item to an alternate location of the item and may additionally assign a different picker 20 to retrieve the item (via their user device 30) or may simply cancel that item from the order. Alternatively, the central server 700 may signal to the WMS that originated the order, or the end customer directly via message (e.g., text, email), that the item is out of stock and provide the option to select a replacement item that is in stock. Should a replacement be selected, such would be dynamically added to the AMRs work order, or the work order of another AMR (i.e., include a stop location), and to the task list of a picker (picker selected based on availability, location of the replacement item, and the like). The constant communication between the user devices and the central server provides up-to-date information regarding item shortages within a facility.

For high demand SKUs, the logistics facility may include those SKUs at more than one storage location. As such, the central server 700 may reroute the AMR 100 to the additional storage location. Redundant storage of items or bins may improve efficiency and reduce error rates in a pick operation. For example, should the pick accuracy or fulfillment at a single pick location be about 90%, inclusion of at least a second pick location would increase the pick accuracy or fulfillment to about 99%, and inclusion of a third pick location would increase the pick accuracy or fulfillment to about 99.9%.

The central server 700 stores information about the infrastructure of the logistics facility in a map storage database 754, such as information on locations of the storage racks within the logistics facility. The map storage database 754 can also include information about the storage racks such as shelving dimensions (width, depth, and height), separate shelf level heights, shelf face widths, and rack column widths. This infrastructure information can be created, modified, and analyzed through a map creation software module 724. Using this module, a human operator can manually create a facility map or may load the map data from a predefined file, such as a Computer Aided Drawing (CAD) file, or may load mapping data automatically collected by an AMR 100, which can use its onboard sensors to observe the facility infrastructure and automatically generate a map.

Figure 24A:
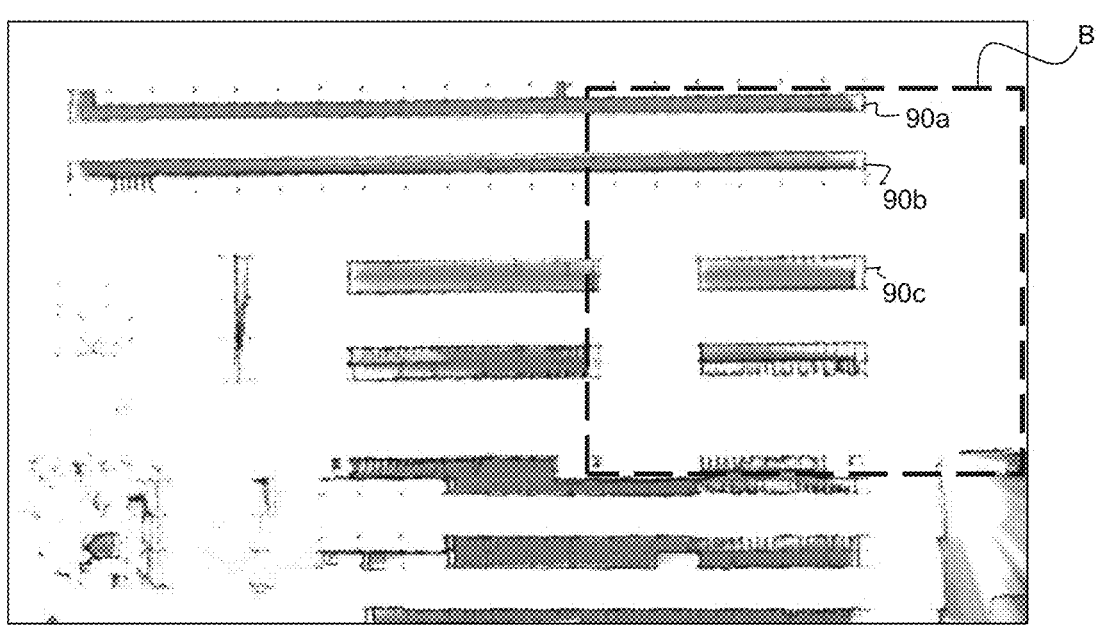
FIG. 24A shows an anal view of a facility map generated using a navigation sensor of an autonomous mobile robot according to aspects of the present disclosure.
Figure 24B:
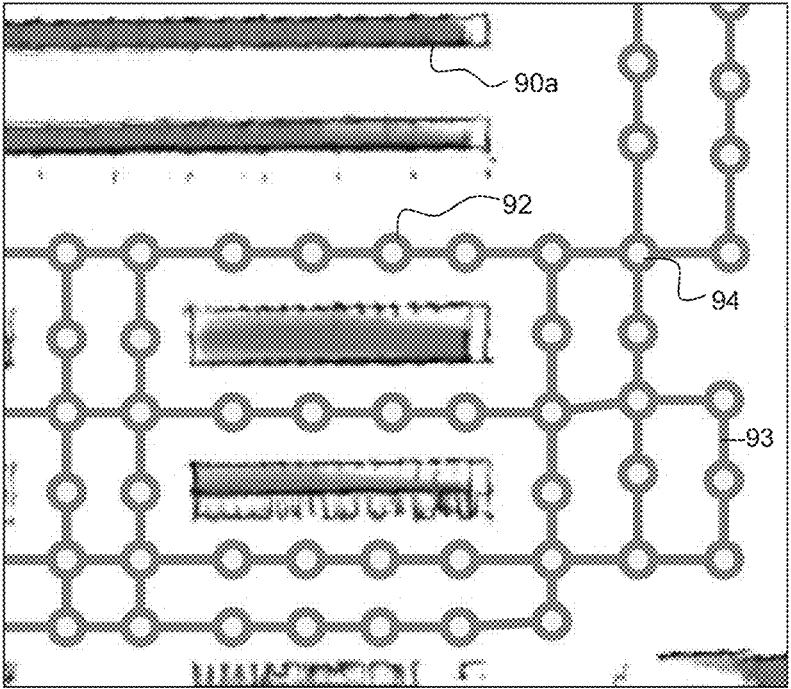
FIG. 24B illustrates virtual roads mapped onto the facility map of FIG. 24A according to aspects of the present disclosure.

For example, and with reference to FIGS. 24A and 24B, a facility map generated by mapping a logistics facility with the sensors of an AMR 100 is shown, in this case with LIDAR of an AMR. For example, of setting up a facility map, or upon changing/adding locations of storage racks, a human may drive an AMR 100 though the logistics facility to allow a navigation sensor on the AMR, such as a LIDAR or fisheye camera, to capture image data. This image data may be uploaded to the central server to be analyzed by the map creation software. Image data from such a mapping is shown in FIGS. 24A and 24B, which is a view looking down from the ceiling. The dark regions in FIGS. 24A and 24B represent obstacles, in this case shelving (90*a, b, c*), sensed by the navigation sensor, in this case LIDAR, of the AMR. An AMR 100 on a pick mission may calculate a navigation route throughout a logistics facility using such facility maps stored in storage 716 on the AMR.

With specific reference to FIG. 24B, a layout of virtual "roads" 93 mapped onto the facility map is illustrated. As shown, each of the roads 93 include a plurality of nodes (92, 94). The nodes represent no access regions, wherein an AMR will stop prior to entry to the region and send a request to the central server to pass through the node to proceed on a planned route. In particular, nodes 94 at intersections may require prior permission for entry to avoid traffic congestion. The central server 700 includes a traffic management module 722 that communicates with the AMRs 100 to manage traffic within a logistics facility, akin to an air traffic controller. As such, AMRs in a facility may be in constant communication with the central server 700, which may be using the traffic management module 722 to calculate timing of travel of each AMR through a node (92, 94). For example, the central server 700 may allow an AMR 100 to travel through four (4) consecutive nodes 92 along a straight roadway, and/or through an intersection 94, whereupon prior to passing through the fifth node, the AMR would request further traffic management instructions. The central server 700 may not allow any AMRs 100 to pass through an intersection 94 without prior permission.

While the central server 700 is responsible for general traffic management instructions, each AMR 100 is able to autonomously navigate around obstacles, i.e., deviate from a virtual road to move around an obstacle. As discussed additionally below, the AMR 100 includes sensors, such as cameras, that provide imaging of the region around the AMR, and are configured to detect obstacles in the AMRs path. When an obstacle is viewed, the AMR may slow down, such as by limiting power to the drive wheels. Information regarding an obstacle may also be transmitted to the AMR processor 718 to calculate a change to the navigation route, such as to provide an alternate navigation route to move around the obstacle, ultimately returning to a virtual road to continue travel according to the originally calculated navigation route of the AMR (i.e., route calculate to move from one stop location to the next based on the robot task list provided by the central server). In certain scenarios, the AMR may wait for the obstacle to move, may backup along the virtual road to proceed along a new route to the stop location, or request human assistance, such as via a signal to a near by picker (sent to the central server which then send the signal to the picker device of a nearby picker). In the latter case, i.e., requesting human assistance, the picker may depress a button on a handlebar of the AMR that deactivates the drive system of the AMR (see 78 at FIG. 2G), allowing the picker to push/pull the AMR to a position away from the obstacle.

Virtual roads may be updated to the map of the logistics facility dynamically, such as to reroute AMRs should an obstacle be noted, to include speed limits on roads of the logistics facility that are expected to have heavy picker or AMR traffic, during emergency situations, and the like.

The AMRs 100 may also dynamically upload mapping data automatically collected by their various sensors, such as via the communication interface 710. That is, the one or more AMRs 100 may collect image data and utilize simultaneous localization and mapping (SLAM) to generate a map of the logistics facility using the location of various markers dispersed throughout the warehouse, beacons, or landmarks. SLAM provides real-time construction/updating of a map of an unknown environment while navigating through that environment. Popular SLAM approximate solution methods include particle filter, extended Kalman filter, and GraphSLAM.

Data from the various sensors of the AMRs 100 may be processed by the onboard computer processor 718 of the AMR in an autonomy module 712 to extract landmark locations. The system may use information from a navigation sensor to detect a current location within the facility. Exemplary navigation sensors include at least LIDAR and fisheye cameras. Other sensors on the AMR may assist in obstacle detection and avoidance, such as 3D cameras and the like. Both the navigation sensors and 3D cameras, i.e., additional sensors, may work together to provide obstacle detection and avoidance.

According to certain aspects, the system may use landmarks placed ahead of time in fixed locations around the facility of operation. At least one of the sensors of the AMR 100 may be used to detect these markers and locate the AMR 100 relative to them. This enables the AMR 100 to know precisely where it is in the facility. Each marker may have a unique pattern that is different from other markers within the same facility. The unique marker pattern may be recognized by the autonomy module 712, thus allowing the AMRs 100 to disambiguate its location, i.e., localize itself.

Exemplary landmarks include visual markers as described above, which may include any identifiable unique visual pattern, such as barcodes, numbers, letters, geometric shapes, or even a specific pattern of blinking lights, and audible markers, which may include at least unique patterns of sound or even specific tones of sound. For example, the landmarks may be beacons, such as BLE beacons (Bluetooth low energy), that can be reliably observed in successive sensor measurements and can be accurately described in terms of a concise geometric parameterization, e.g., triangulation. The landmarks can be RFID transmitters and/or receivers.

The landmarks may be provided by indicial markers having a pattern of varying reflectivity regions arranged along a first dimension. For example, the indicial markers may have a pattern of varied intensity values along a first dimension, wherein opposing end regions of the indicial markers each comprise a segment that provides specular reflection or is retroreflective. The sensors 714 of the AMR 100, such as a light detection and ranging (LIDAR) device of the AMR, may receive intensity values for one or more of the indicial markers and determine identification data associated with at least one of the one or more indicial markers based on a pattern of the received intensity values. The AMR 100 may then determine its location within the logistics facility based on the identification data.

According to certain aspects, the AMR may understand a starting location within a logistics facility when moved to a specific position in the facility, such as when starting work for the day or when lost. In this scenario, a human worker such as a picker may manually push the AMR into position on one of the starting locations, i.e., a specific (x,y) coordinate in the logistics facility. As mentioned above, the picker may deactivate the drive system by depressing and/or holding down a button on a handlebar of the AMR, move the AMR to a location such as the start location, and then reactivate the drive system (depress the button again, or stop holding the button down). The picker may then use their user device to scan a code positioned adjacent the start position to indicate the specific location of the AMR within the logistics facility (i.e., scan signal is sent to the central server, which then communicates with the AMR).

At the start of the day, this interaction may be directed by the central server via instructions sent to the human worker or picker on their user device. When lost, the AMR may signal to the central server that it is lost, and the central server may send a signal to a nearby picker that indicates an AMR to reposition. Alternatively, or additionally, the AMR may indicate via lights on any region thereof, such as on a mobile base, that it needs assistance. A nearby picker may notice the state of the AMR via these lights and provide aid. For example, should several AMRs be in the vicinity, the picker may understand which AMR needs assistance based on lights on each.

Before an AMR 100 can use landmarks for navigation, the characteristics of the landmarks may be stored on the central server 700, and/or on the storage 716 of the AMR 100. When the characteristics of the landmarks are stored on the storage 716 of the AMR 100, they may navigate autonomously throughout a logistics facility and may not require constant communication from the central server 700. While the AMR may navigate fully autonomously, the central server 700 may maintain near constant communication with the AMR 100 to maintain proper traffic management within a logistics facility, status of the AMR (e.g., battery charge state), and status of order fulfilment (i.e., collection of items for orders assigned to the AMR).

Autonomous Mobile Robots—Intelligent Shelves

With reference to FIGS. 1 through 5, items may be carried by the AMR 100 (i.e., received to, removed from, or transported by), such as in a tote positioned on a platform 40. The platform 40 may be part of a larger system, such as several platform(s) supported by vertical posts 42. As shown in FIG. 1, the platform 40 may be supported between two vertical posts 42, while the system shown in FIGS. 2A-2E illustrates a configuration in which the platform(s) are supported by four vertical posts.

Figure 2A:
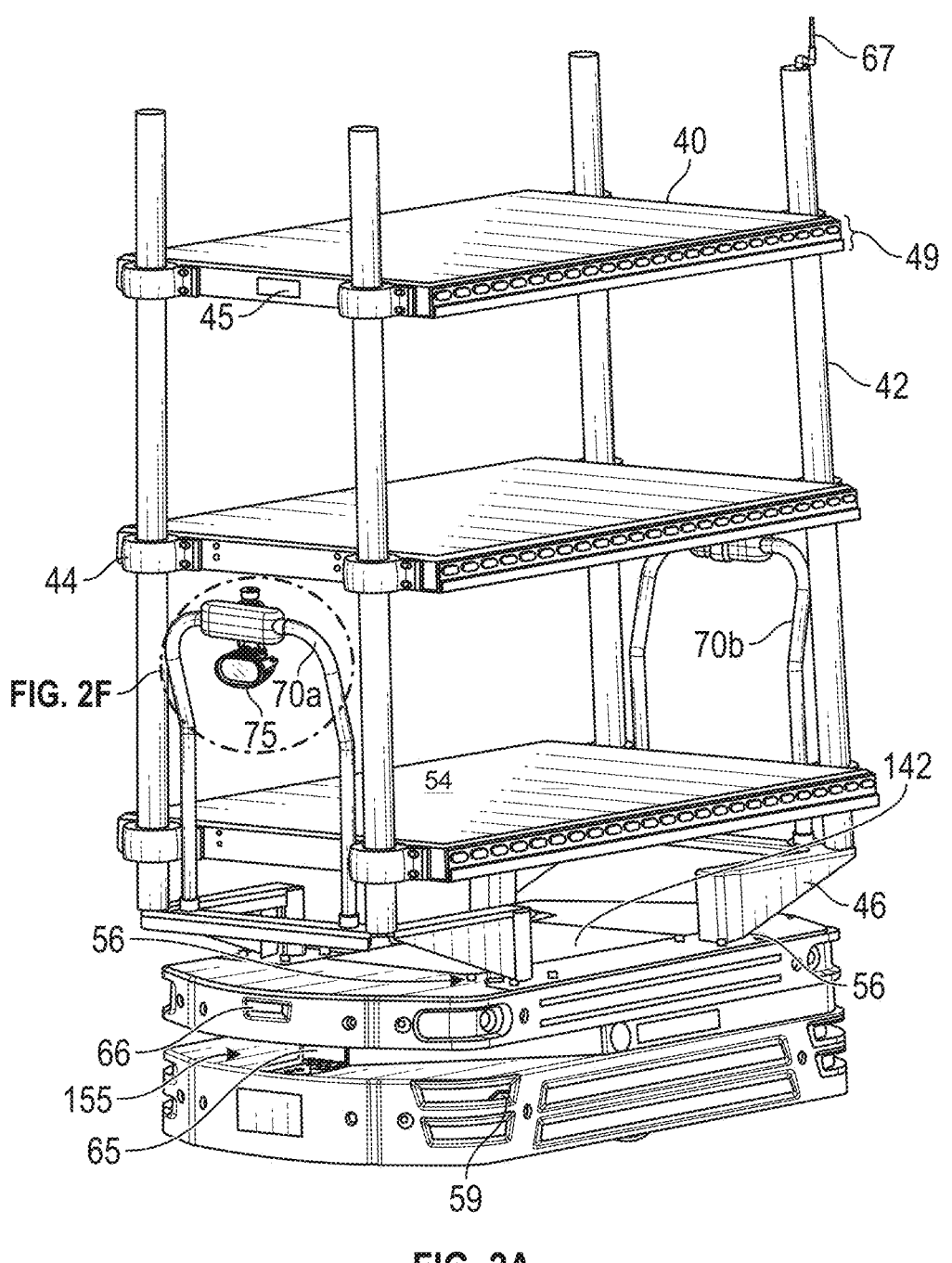
FIGS. 2A-2E illustrate a perspective, front, back, top, and side view, respectively, of the autonomous mobile robot with an intelligent shelving system comprising three shelves according to aspects of the present disclosure.
Figure 3:
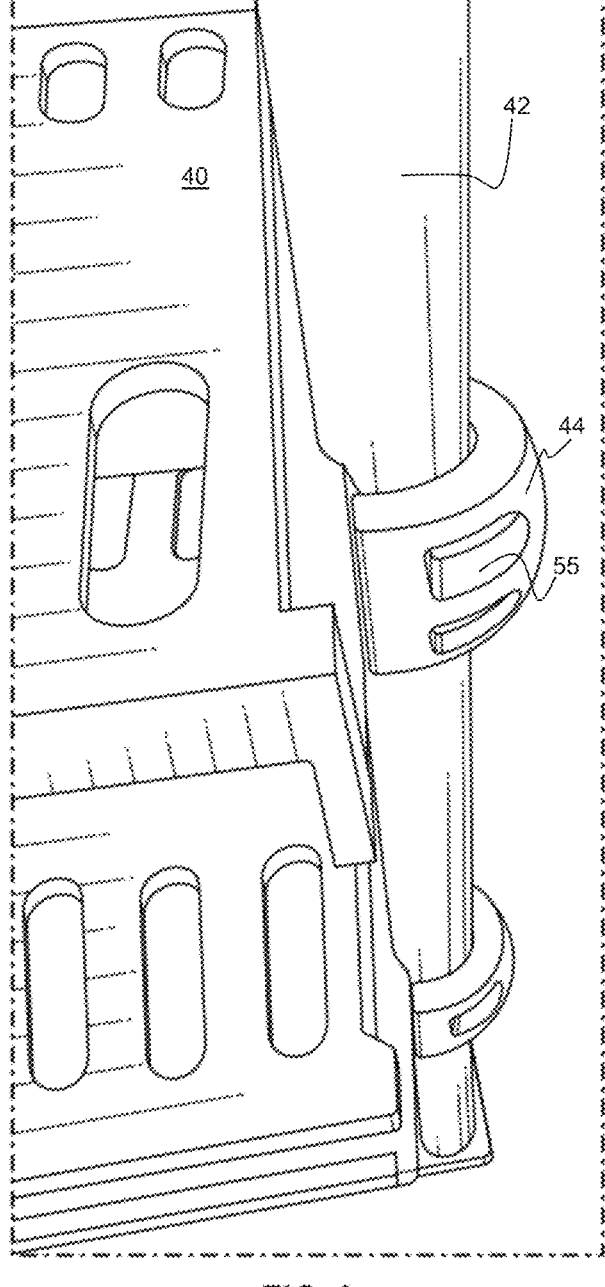
FIG. 3 illustrates a closeup side view of one exemplary connection means for shelves in the intelligent shelving system shown in FIG. 2A.
Figure 4:
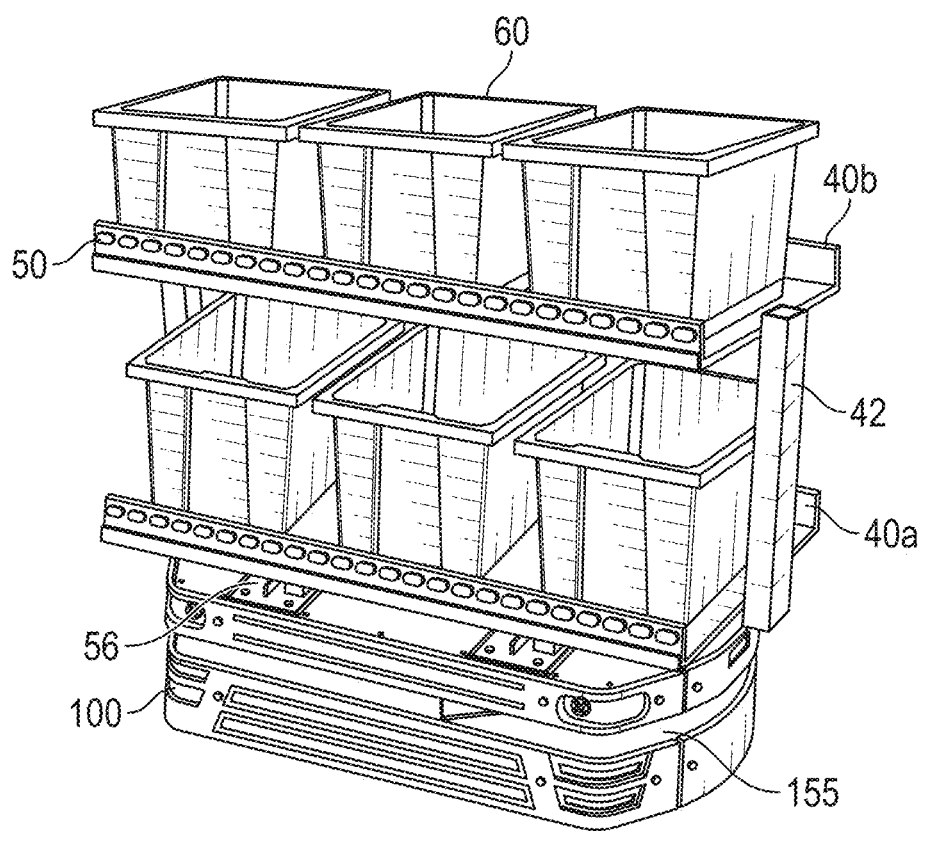
FIG. 4 illustrates an autonomous mobile robot with an intelligent shelving system comprising two shelves according to aspects of the present disclosure.

With specific reference to FIGS. 2A and 3, a position and number of platforms 40 may be adjustably configured on the vertical posts 42, such as via attachment using a releasable connection mechanism 44. While shown in the drawings as including two or three platforms, any number and configuration is possible. In one configuration, the releasable connection mechanism 44 may secure a position of the platform on the vertical posts by tightening a set of screws or bolts within apertures 55 in the connection mechanism 44 such that the platform and connection mechanism are tightly secured around the vertical posts 42.

With reference to FIGS. 1, 2A, 2D, and 17, the platforms of the present disclosure include additional "smart features" and may thus be considered intelligent shelves (80 of FIG. 17). For example, positioned along opposing longitudinal edges of each platform 40 are indicator bars 49 (84 of FIG. 17). Moreover, associated with or positioned on each platform, such as on a bottom surface of each platform (i.e., 54 in FIG. 2A indicates a top surface), is a pick to light controller 45 that may be communicatively connected to a processor of the AMR 100 (i.e., wired or wireless communication 82; controller 86 of FIG. 17). A general position of a pick to light controller 45 is shown on a platform in FIGS. 2A and 2D, wherein the controller may be attached to a bottom surface of the platform 40. Wiring for each controller may pass through conduit positioned along the vertical posts 42 or within the vertical posts 42. The pick to light controller 86 may direct individual lights or subsets thereof to be illuminated based on signals from the AMR, and/or from the central server received via the AMR (via the connection interface 710 on the AMR, such as assisted by an antenna 67 as shown in FIG. 2A).

In a preferred configuration, the indicator bar 49 comprises a set of lights 50, such as LED elements, which may illuminate to define a position of a tote on a respective platform. For example, an AMR 100 waiting to receive an item in a specific tote may cause the lights 50 beneath that tote to be illuminated to direct placement of the item by the picker 20 (i.e., send signals from a processor 718 of the AMR 100 to the pick to light controller 86, which then controls the indicator elements, e.g., lights).

Figure 26A:
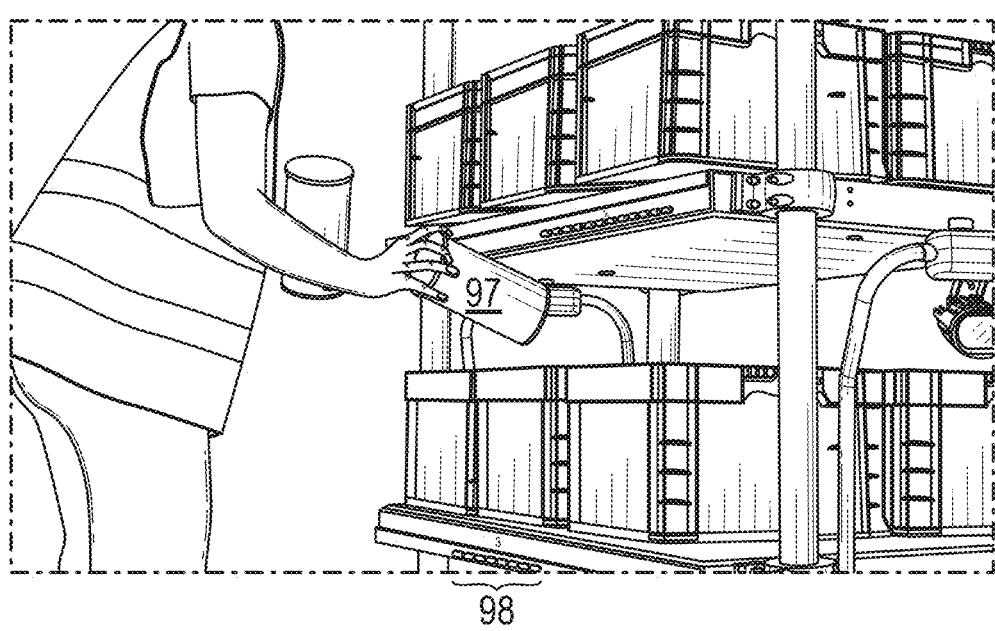
FIGS. 26A and 26B illustrate user interaction with an autonomous mobile robot during a pick operation according to aspects of the present disclosure.
Figure 26B:
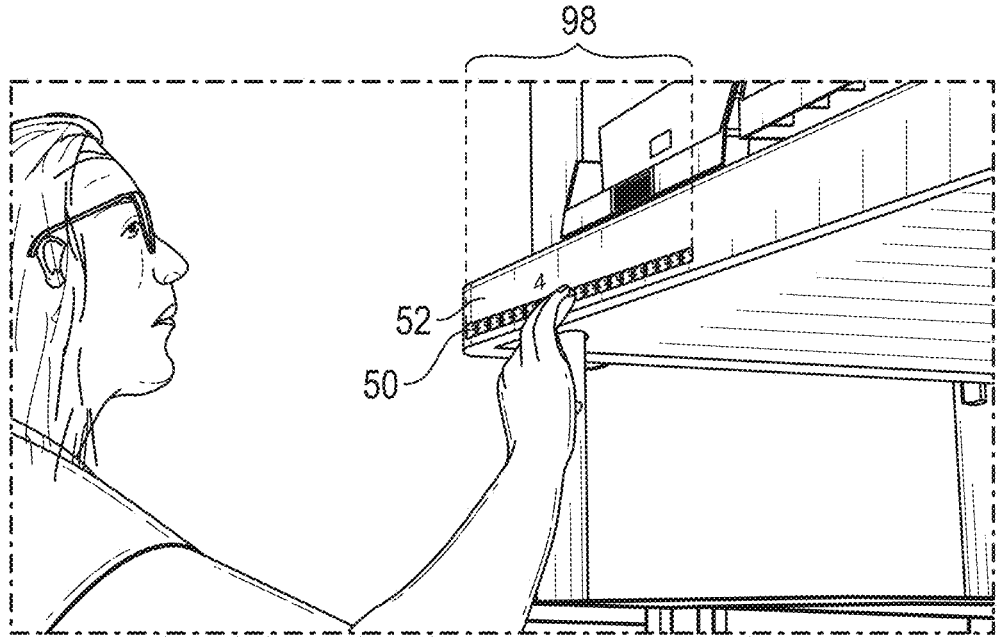

The indicator bar 49 may further include a set of display elements 52 associated with each of the lights 50, such as beneath the lights as shown in FIG. 1 or above the lights as shown in FIGS. 26A and 26B. In an exemplary configuration, the display elements 52 comprise individual seven segment display elements capable of displaying a letter or number. As such, the pick to light controller may be configured to cause a subset of lights 50 defining a target region on the platform 98 to illuminate, such as the lights beneath a specific tote, and may further cause a number or letter to be displayed on one or more of the display elements 52 within that target region. For example, as shown in FIG. 26B, the display elements 52 in the region 98 defining a position for a tote display the number four (4), indicating to the picker that four (4) of the picked item (e.g., 97 in FIG. 26A) should be placed in that tote.

The indicator bar 49 may further comprise selection buttons associated with, such as adjacent to or part of, each of the lights 50 and/or display elements 52. According to certain aspects, the indicator elements 49 (i.e., lights 50, buttons, and/or display elements 52) may be about 1 inch in width. Thus, for an intelligent platform 80 that is about 42 inches in width, the indicator bar 49 on each side of the platform may include 42 indicator elements. As shown, the display elements are associated with each of the indicator elements (e.g., lights), wherein each of the lights may include a button positioned therewith (i.e., lights and button are one element).

Moreover, the indicator bars 49 positioned on either side of each platform may be coordinated, i.e., act together, or may act separately. For example, the indicator bar on each longitudinal side of a platform may be independently addressable via the pick to light controller or may be controlled by a separate pick to light controller (i.e., each platform may include two pick to light controllers to separately control each of two indicator bars). In this way, each of the shelves may be configured to hold totes or containers positioned in two rows or any combination of groupings, e.g., large totes that span the width of a platform and have set of lights on each side assigned thereto and sets of totes positioned back-to-back wherein the lights on each side are separately assigned to each of the two totes.

Figure 22:
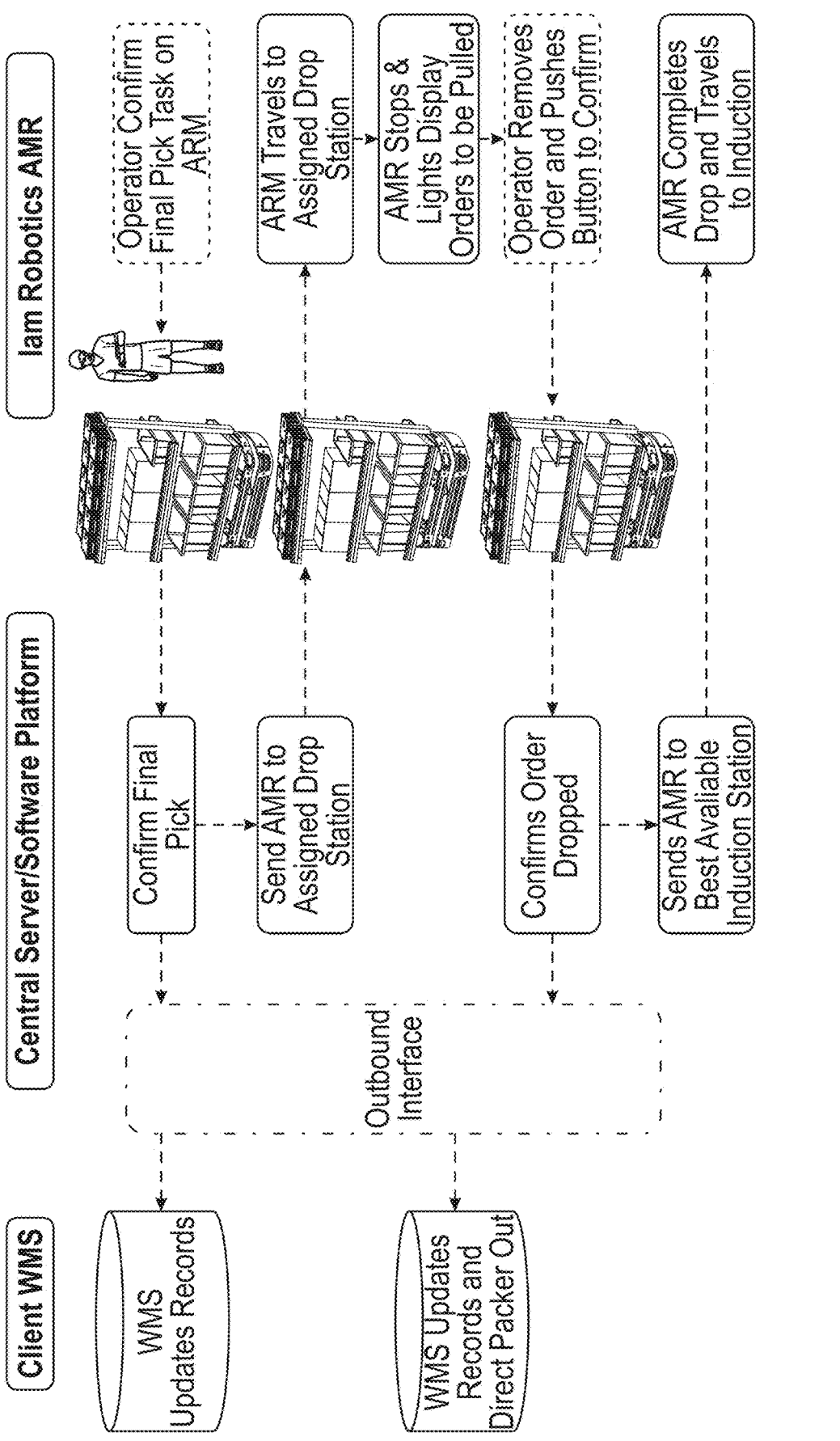
FIG. 22 illustrates the flow of information among a central server, user device, and autonomous mobile robot during drop off according to aspects of the present disclosure.

Reference may be had to FIGS. 20 and 22 during the following description. The selection buttons (e.g., as part of the lights 50 of the indicator bar 49) provide the picker 20 with a means to interact with the AMR. For example, on successful completion of a pick, such as depositing a picked item in a target tote on an AMR, the picker may depress a selection button beneath the tote into which the picked item was deposited, such as shown in FIG. 26B. This sends a signal to the AMR processor, via the pick to light controller, that the pick is complete. This information may also be relayed to the central server from the AMR. Completion of a pick may cause the AMR to illuminate another subset of lights on the indicator bar 49 indicating another tote waiting on a picked item, and so on until all items expected from the picker by that AMR have been received (i.e., as signaled by the picker 20 using the selection buttons).

As another example, the AMR 100 may cause the sets of lights beneath all totes into which items are to be placed to be illuminated, such as at the start of an interaction with a specific picker. Item counts for the number of an item to be placed into a specific tote may be indicated beneath that tote on the display elements. As the picker places an item(s) into a tote, they would depress a button under that tote to indicate they had completed that specific action (task), and the lights under that tote would change color or be turned off. When all items are picked and deposited into the tote(s) on the AMR, and all buttons have been pressed, that interaction of the AMR with the picker is complete.

Figure 18:
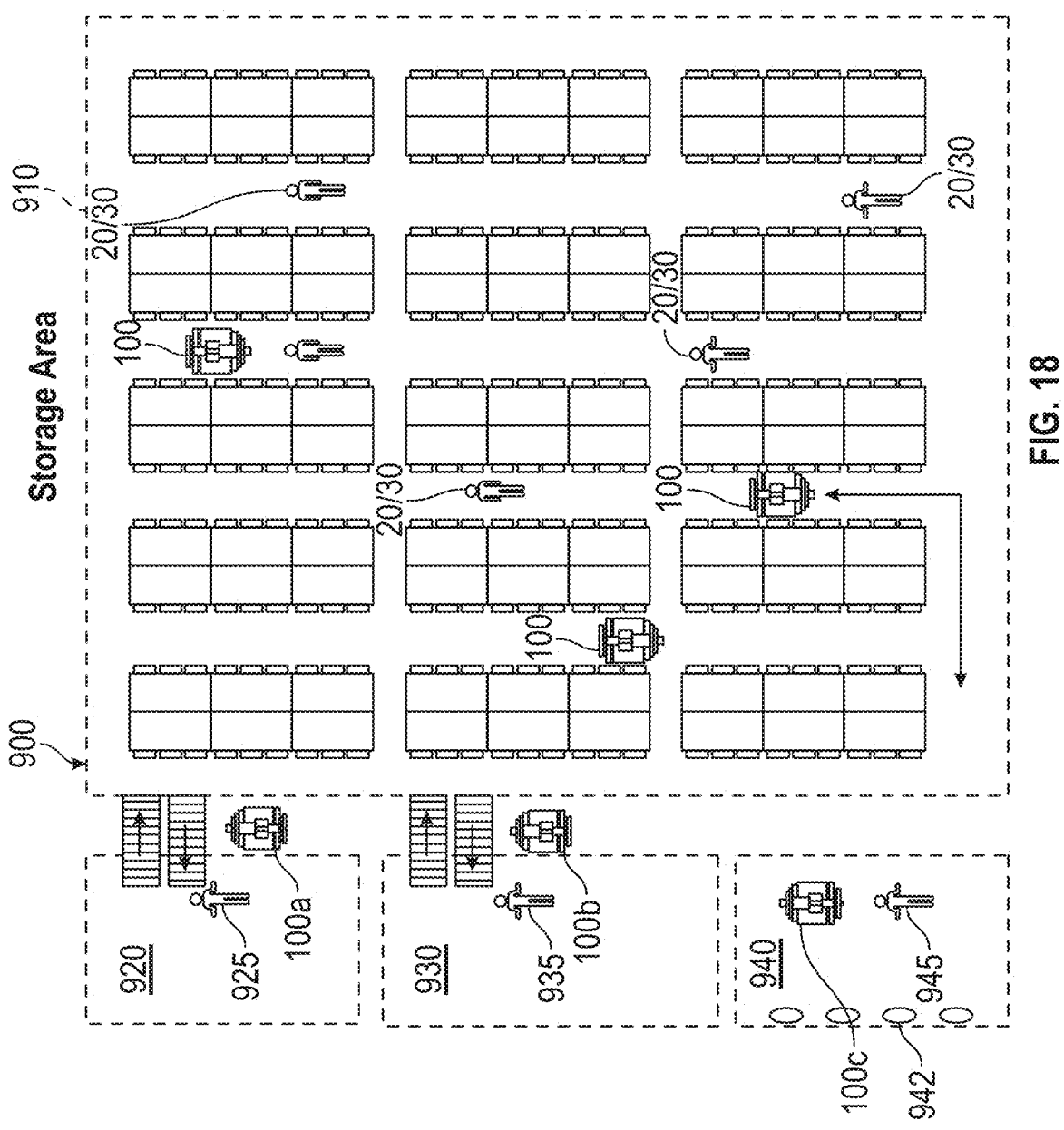
FIG. 18 illustrates an overhead plan view of a logistics facility in which the collaborative order fulfillment system according to aspects of the present disclosure may operate.

Once the full collaboration between that AMR and the picker is complete, the AMR will exit the area and proceed with its task list, i.e., travel autonomously to a next stop location. Moreover, once an AMR has completed all items on a task list, i.e., fulfilled its assigned work order by collecting items from one or more pickers, the AMR may be directed to proceed to a staging area or drop off station, such as illustrated in FIG. 18.

Of note, the picker may interact with any of the selection buttons beneath a tote to indicate an action has been taken or completed for that tote. For example, a tote position over a set of ten lights may have a set of ten selection buttons positioned with (e.g., part of) or adjacent to the lights. When the picker completes an action, they may depress any one or more or the ten buttons associated with the ten lights illuminated beneath that tote. Moreover, the display elements associated with the lights delineating that tote may individually display the same or different information related to an action expected at the tote. The information displayed by the display elements may be shown on one or more of the display elements, and according to certain aspects, may be centered in the subset of lights indicating the tote location.

Moreover, a picker may be tasked with picking a number >1 of a single item, wherein each of the items may be placed in different totes on the AMR. As such, the information shown on the display elements beneath each tote play an important role in expediting order fulfillment, i.e., multiple orders can have items added during a single human-robot interaction. This is a significant advantage of the meet me model of human-robot interaction of the present disclosure.

A single picker may be instructed to pick multiple of a single item and deposit subsets of that multiple to more than one tote. The indicator elements and display elements on the AMR are configured to indicate which totes and how many items go in each tote, respectively.

Figure 5:
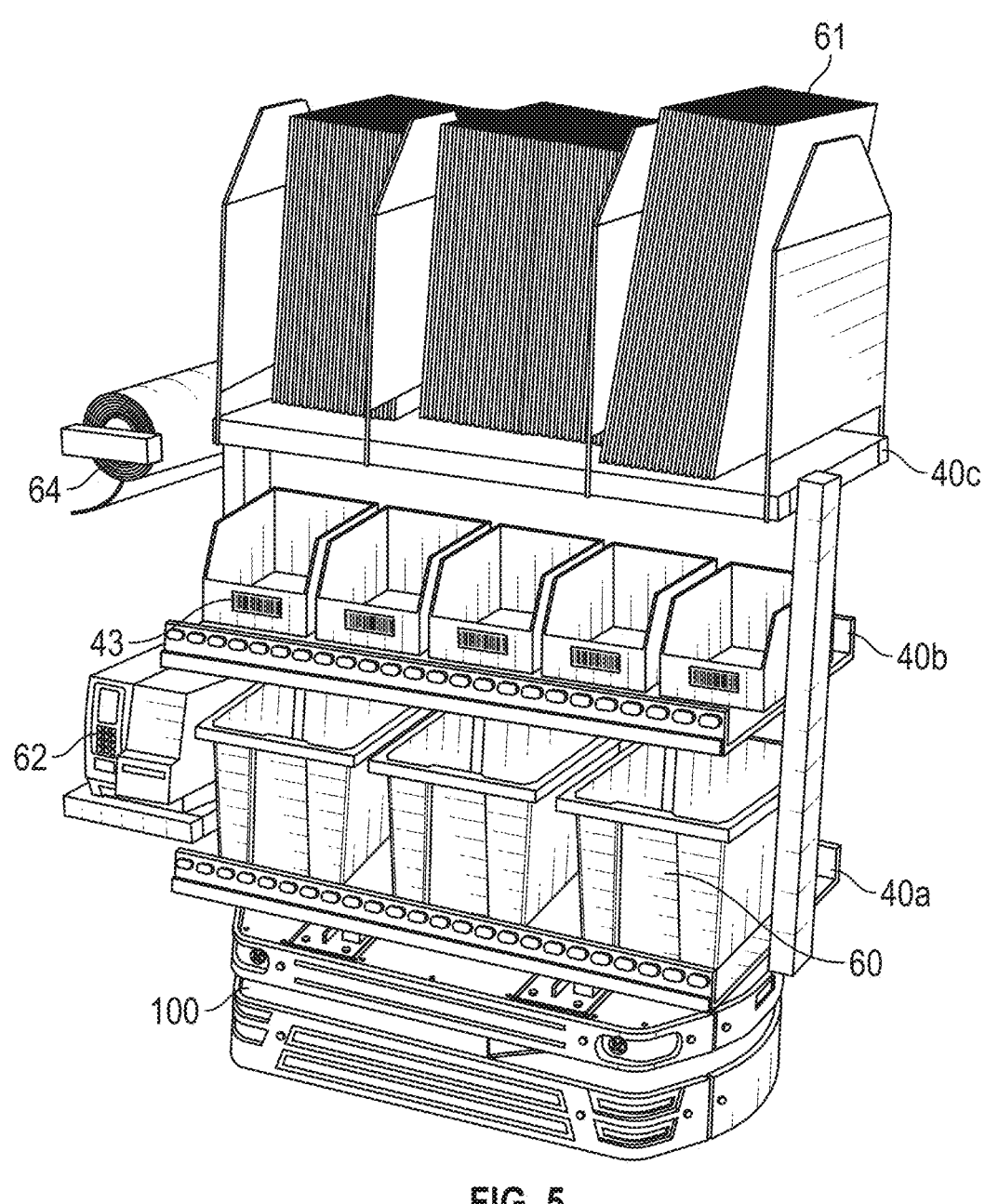
FIG. 5 illustrates an autonomous mobile robot with an intelligent shelving system configured for order packing and labelling according to aspects of the present disclosure.

According to certain aspects, the shelves may be configured and positioned on the frame for specific purposes. As shown in FIG. 5, platform 40*a* is configured and positioned to hold larger items, or larger numbers of items in totes 60, while platform 40*b* is configured and positioned on the vertical posts to hold smaller totes for smaller items or smaller numbers of items (i.e., spacing between shelves 40*a* and 40*b* is larger to hold larger totes, while the spacing between shelves 40*b* and 40*c* is smaller to hold smaller totes). The AMR 100 shown in FIG. 5 is configured for packing items directly after an order is fulfilled for shipping. As such, the AMR 100 may also include empty packing boxes on platform 40*c*, a printer 62 (labels and/or packing slips), and a wrapping or packing paper and/or packing tape 64. The AMR may signal to the picker that an order is complete upon receipt of a last item in a tote, such as a tote on platform 40*b*, by changing an illumination pattern of the indicator lights 50 or the display elements beneath that tote, and/or may indicate the same on the user device 30. The picker may proceed to package the complete order in an empty box 61 retrieved from platform 40*c* using the packing materials (64) provided on the AMR and may position a packing slip inside the box and/or packing label (62) on an outside of the loaded box and deposit the packed box to another tote, e.g., tote 60 on platform 40*a*, on the AMR. Such an arrangement may be useful in fulfilling quick ship orders, such as those designated for same day delivery.

Figure 6:
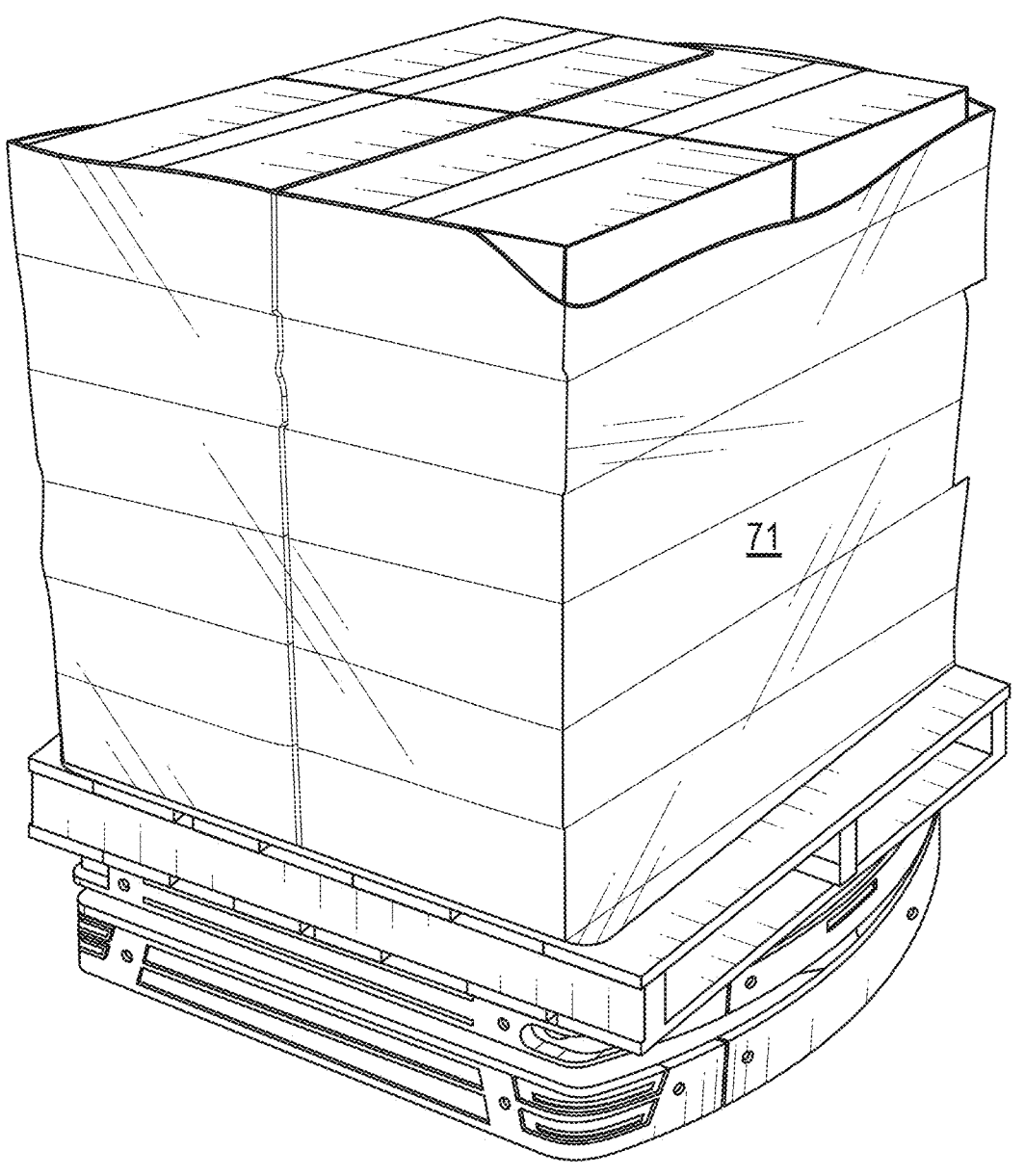
FIG. 6 illustrates an autonomous mobile robot configured for pallet transport according to aspects of the present disclosure.

While illustrated as including shelves configured for carrying totes, boxes, or other containers, the AMRs 100 of the present disclosure may be configured to carry a wide range of other items. For example, the AMR may include a rail or rack designed to hold cloths, such as clothing hung on a hanger. The AMR may be configured to carry pallets (see 71 of FIG. 6), which may be positioned thereon from a forklift or other conveyance means.

According to certain aspects, one or more of the shelves on the AMR may include a conveyance system, such as roller bars, conveyor belt, omni wheels, etc. to assist in unloading the totes to a conveyance system, such as conveyance systems shown in FIG. 18.

User Devices

Figures 25A, 25B:
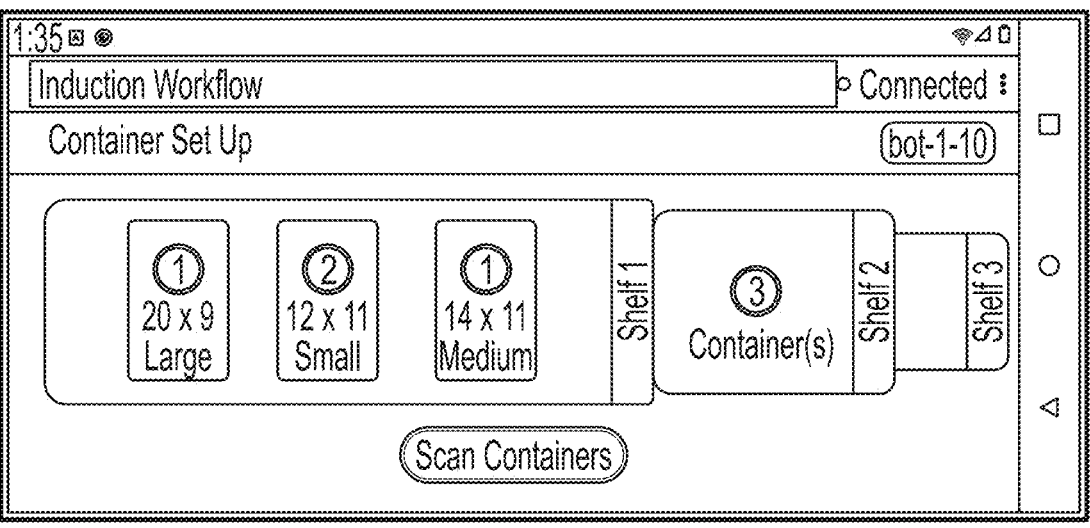
FIGS. 25A and 25B show screen shots of a user application running on a user device for induction of an autonomous mobile robot and picking to an autonomous mobile robot, respectively, according to aspects of the present disclosure.

Components of a user device 20 according to the present disclosure are shown in FIGS. 16 and 23 and select illustrations of a display on a screen of the user device as generated by a software application (e.g., mobile "app") are shown in FIGS. 25A and 25B. The user device is designed to be handheld or worn about a wrist or forearm of a picker 20. The user device includes a processor 38, storage 37 (e.g., RAM, hard disk, etc.), a communication interface 32, an input device 35, and a display screen 34. In some implementations, the display screen may also act as an input device, such as a touch screen.

The user device 30 may receive instructions from the central server via the communication interface and process those instructions on a processor based on software stored in memory (e.g., downloaded mobile app). The user device may further include a scan device (input device 39) configured to scan a code on an item, bin, shelf, or tote, which may be analyzed via a processor 38 on the user device or sent back to the central server 700 via the communication interface 32.

With specific reference to FIG. 23, the user device may be configured to assist a picker with each of induction and picking workflow, and may provide help and error messaging, and exception handling, such as described in this disclosure. A screen shot of an induction workflow interface is shown in FIG. 25A, wherein a specifics of a set of containers to be positioned on a first shelf are shown, and user interaction "buttons" are depicted. For example, FIG. 25A shows a "scan containers" button that initiates scanning of a barcode (e.g., 43 of FIG. 5) on a tote that is to be, or has been, positioned on the first shelf. A screen shot of a picking workflow interface is shown in FIG. 25B, wherein a specific location of an item to be picked ("Location: A1B1), number of the item to be picked (i.e., "Quantity 10"), and AMR to which the item should be placed ("AMR-ID: bot-1-10) is shown. User interaction "buttons" are also shown that allow the user to indicate certain actions have been taken, move to a next pick action instruction, request help. Exemplary help may include a map or walking directions to the item to be picked, such as when the picker is not able to locate the item to be picker. Additional exemplary help may include changing a light color on an AMR or showing a pattern on the AMR to distinguish the AMR from others, such as if the picker is unable to identify the AMR that should receive a picked item, and the like.

Overview of the "Meet-Me" Model

With reference to FIG. 18, a typical warehouse or distribution center utilizing a collaborative order fulfillment system (i.e., AMR 100, central server 700, and user device 30) according to certain aspects of the present disclosure is illustrated. Shown are pickers 20 wearing or holding their user devices 30 in a main storage area 910 of the logistics facility as well as AMRs 100. The AMRs 100 will travel within the storage area to meet up with human pickers to collect items for work orders from the human pickers 20. When all orders assigned to the AMR 100 are fulfilled, i.e., the AMR has completed its task list, the AMR will travel to a pack and ship area 920 or a drop off area (e.g., if the orders are already packaged on the AMR as discussed hereinabove). These areas may include additional conveyance means or areas configure for transfer of packed orders to shipping bays.

The AMR 100*a* may transfer totes directly to a conveyance system or may await unloading by a human worker 925, such as to a conveyance system. The AMR 100*a* may then travel to an induction area 930 where a human worker 935 may reload the AMR 100*b* with totes or configure the AMR according to any of the schemes described herein, as instructed by the central server 700 based on a new AMR task list. Once reloaded with totes, that AMR 100*b* may proceed back into the storage area to collect items on the new task list.

Should the rechargeable battery of an AMR 100*c* have low charge, the AMR 100*c* may proceed to a battery recharge area 940 where it may position itself over a charging station 942 for opportunistic charging, may exchange a spent battery for a fully charged or substantially charged battery automatically, or may await assistance from a human worker 945 who may remove the spent battery and insert a fully charged or substantially charged battery. Such charging may occur at any time, such as during a task list, between task lists, and the like.

While not specifically shown in FIG. 18, the logistics facility may include areas designated for replenishment, such as to receive items into the facility and restock within the storage area. While all the functions of the AMRs and pickers have generally been described with reference to picking items, the same actions are amenable to putting items, i.e., pickers remove items as indicated on their user devices from an AMR and replenish stock on a shelf within the facility. The intelligent platform on the AMR may illuminate a region where the items for replenishment are positioned (e.g., in a tote, etc.), and the picker may depress a button in that region to verify that they have removed the items from the AMR and placed on a shelf in the facility. The AMR may then proceed to a different location and meet up with another picker to have additional items replenished in a different part of the logistics facility.

Picking and Putting in an Implementation of the "Meet-Me" Model

Figure 19:
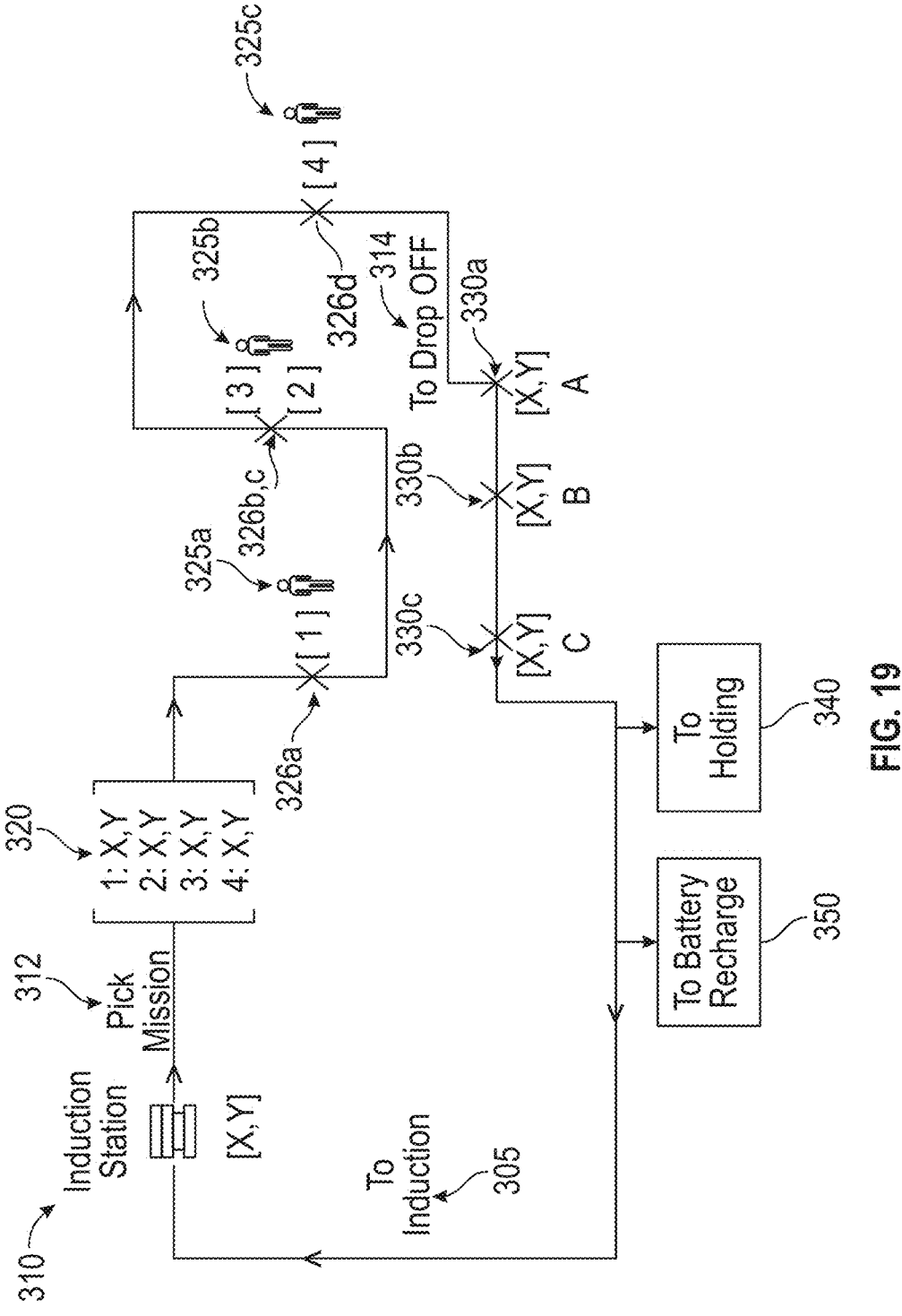
FIG. 19 illustrates an exemplary path of an autonomous mobile robot through a logistics facility during induction, pick, and drop off activities according to aspects of the present disclosure.
Figure 21:
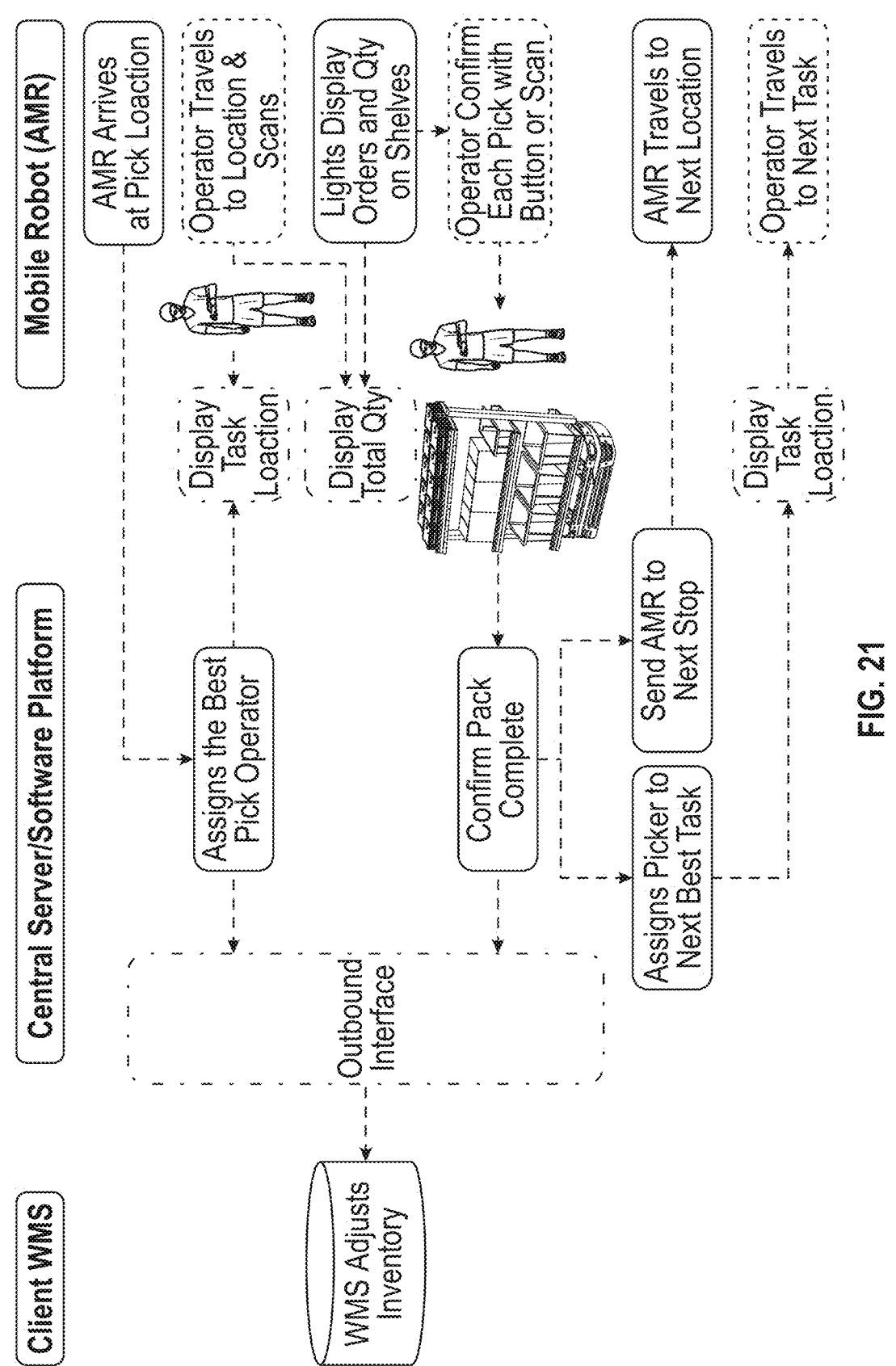
FIG. 21 illustrates the flow of information among a central server, user device, and autonomous mobile robot during an order fulfillment process according to aspects of the present disclosure.

A "meet-me" model for human-robot interaction is described with specific reference to FIGS. 19 and 21. A WMS may send at least one order including at least one item to be picked to a central server. The central server generates a global task list based on the at least one order, wherein the global task list includes a unique identification for each of a plurality of items to be picked, and a location within the logistics facility for each of the items. The central server may then generate individual tasks lists for AMRs within the facility, wherein each robot task list includes at least one order having one or more items. The central server may determine which AMRs get which orders based on locations within the logistics facility of items in the order, availability and configuration of the AMRs, health status of the AMRs (e.g., charge state of the battery), shipping times for the orders, selected shipper(s) of the orders, and the like.

The central server then generates a robot task list comprising a list of stop locations 320 within the facility and a first picker task list 325a comprising an item 326a and number thereof, a location of the item within the facility, and an identity of the robot, wherein the first picker task list includes the item to be picked at the first stop location [1]. Thus, in general, the central server provides an AMR task list comprising instructions for fulfillment of one or more orders and individual task lists for a plurality of pickers.

As noted herein, an AMR is generally tasked with collecting full orders, unless those orders are large (i.e., would not fit on one AMR) or are separated due to different shipping requirements, and the like. For example, for large orders, or for orders that include rush ship items, the central server may generate a task lists for more than one AMR, i.e., an order may be split among two or more AMRs. The picker, however, is tasked with picking items that will fulfill a broad range of orders and providing those picks to a number of different AMRs.

The robot task list may include orders for single items, in which case some or all such orders may be placed to a single totes on the AMR, i.e., a tote may comprise multiple orders each comprising a single items. The robot task list may include stops to collect whole bins or a large number of items, i.e., batch picking, that may be placed to a put wall. When the picker task list includes an entire bin, it would be placed at an open position on a platform of an AMR in much the same way as individual items, i.e., indicator elements would illuminate to indicate a position for the bin. At a put wall, pickers may select items from a smaller area in a logistics facility to fulfil orders. Each of these different types of orders may be included on a single AMR, i.e., totes for collection of singles orders, totes for collection of individual orders, and totes or spaces for accepting batch picking items or bins, respectively.

The method further includes sending, from the central server to a processor of the AMR, the robot task list comprising stop locations (initiate a pick mission 312). A first picker selected to pick a first item on the task list may receive a picker task list, such as via the central server to a processor of a user device worn or carried by the first picker. The AMR may then navigate autonomously along a route within the logistics facility (i.e., along a virtual road in a map stored on the AMR) to a first stop location [1] to receive a first item 326a from the first human picker 325a; and the first picker may proceed to the location of the first item.

The central server may send a picker task list to a user device of a first picker that may include an identity of the first item and a storage location of the first item, a number of the first item to pick, and an identity of the AMR tasked with receiving that item (i.e., identity of AMR marked on the AMR in a manner that the picker may recognize, e.g., license plate).

Upon receipt of a picker task list to their user device, the first picker 325a may pick the indicated item 326a from a bin or other container on a shelf and may scan one or more of: an item ID tag on the first item, a shelf ID tag on a shelf holding the first item, and a bin ID tag of a bin in which the first item is stored on the shelf. The user device then sends a signal to the central server including information from the scan by the user device. In some scenarios where tight inventory control is a benefit, each item may be scanned to provide specific ID of each item in an order to the central server (SKU, lot number, production date, etc.).

Based on this signal to the central server, the AMR at the first stop will then receive, at the robot processor from the central server, an instruction to illuminate a subset of indicators on a platform of the AMR to designate a target tote positioned on the platform and a first number of the first item to be placed in the target tote by the first picker. The AMR will send a signal from the processor to a pick to light controller to illuminate the subset of indicators on the platform and display the number of the first item to be placed in the target tote. The picker may then place the indicated number of items in the target tote, and depress a button on the indicator bar 49, such as a button associated with one of the illuminated indicators, causing a signal to be sent from the pick to light controller to the processor of the AMR, which may be sent to the central server 700.

In some implementations, the AMR may display a picker specific light color or pattern on the subset of indicators on the platform delineating a target tote, such as to aid the picker to more quickly locate their AMR should several AMRs be in the area (i.e., in addition to the ID tag on the AMR, such as the license plate indicated hereinabove).

This signal, i.e., the signal to the central server that a pick action to the target tote is complete, may be registered at the central server and used to denote progress of order fulfillment to the AMR, and to register removal of the number of the item from inventory (i.e., keep up to date inventory of the item).

Verification of receiving a first item to the target tote may be sent back to the central server from the AMR but could additionally or alternatively be sent from the user device. For example, the picker 20 may scan a code on the target tote, such as a barcode on the tote, using their user device 30. This information may be sent to the central server 700.

The steps of illuminating the next subset of indicators and receiving the next verification signal may be continued until all the first item picked by the first picker are received to totes on the robot, i.e., the central server has received all expected verification signals at the first stop location. Alternately, all of the subsets of indicators delineating totes to which items are to be placed at a stop location may be illuminated, such as after the picker has scanned the item (i.e., SKU, bin, shelf) to initiate interaction with the AMR, and may change color or be darkened after the picker indicates the pick to that tote is complete, such as by depressing a button on the AMR in the region delineating the target tote.

The method may further comprise sending output control signals to the drive system of the AMR for autonomous navigation to a next stop location [2, 3] in the list of stop locations 320 and receiving a next item (326b) from a next human picker (325b), wherein the next item is found in one or more of the orders of the group of orders assigned to the AMR. As shown, stop location [2] and [3] may have the same coordinates, wherein the AMR may receive two items (326b, c) from a single picker 325b. In this scenario, the two items may be in close proximity within the logistics facility. As such, the picker 325b may receive a first set of instructions for a first of the two items, and upon completion of the pick task to that AMR for all of that first item, the same picker may receive an instruction for a second of the two items. Upon completion of the pick task to that AMR for all the second item, the AMR may proceed on to a next stop [4], wherein a next picker 325c may provide a next item 325d.

In the disclosed picking method, the AMR receives items from a plurality of pickers and each picker delivers items to more than one AMR. The central server determines timing for sending the first picker task list to the user device of the first picker based on a location of the AMR. Thus, in this model, the AMR and picker meet at a location to execute the picking action. This allows the picker to provide item picking within a specific region of a logistics facility and reduces downtime between item picks as the next pick action for the picker may initiate as soon as they have completed a prior pick action. Moreover, the disclosed method allows for dynamic selection of the picker to complete a pick action based on proximity to the robot, experience level of the picker, availability of the picker, and the like. As such, the method also reduces downtime for the robots as they do not have to wait for a picker to be available.

The timing for sending a picker task list to a user device of the picker may be based on any of prior picking statistics, such as for specific pickers and/or specific item types or identities or quantities; and/or distance of each of the picker an AMR from their specified location. The timing may be additionally, or alternatively, selected by a system administrator. For example, messaging to the user device may be initiated on exit of the selected AMR from a prior stop, or on arrival of the AMR at the selected stop, or any range therebetween (e.g., such as a specific distance of one or both of the picker and AMR from the next item/stop location, respectively).

The collaborative methods disclosed herein work equally well for item put-away, i.e., put. That is, the group of orders assigned to a robot may alternately, or additionally, include at least one item to be put. As such, the picker task list may alternately include an identity of an AMR holding the put item, and a location within the logistics facility to place the put item (e.g., specific aisle, bay, shelf, and slot). The picker may initiate the interaction by scanning, using their user device, an ID tag of a shelf location where the put item is the be placed. This action sends a signal from the user device to the central server, which then send an instruction to the AMR to illuminate indicator elements under a target tote comprising the put item, and if only a subset of the put item is to be placed on the shelf, a number of the put item to remove from the tote. The picker may then remove the put item from the target tote and depress a button of the illuminated indicator elements under the target tote, which sends a verification signal indicating the put item is removed from the target tote to the central server.

In some scenarios, after the item is removed from the target bin, a scan signal from the user device of the first human picker may be sent to the central served, and may include an item ID tag on the put item, such as when each item is placed on the shelf, a shelf ID tag on a shelf on which the put item is placed, and/or a bin ID tag of a bin in which the put item is placed on the shelf.

Once an AMR has collected or delivered all items at the stop locations of its assigned task list, it may proceed to a pack and ship area of the logistics facility to have the items unloaded. For example, a human worker may remove loaded totes from the shelves of the AMR, or the AMR may be configured with conveyance means on the shelves and may transfer the loaded totes to a conveyance means, e.g., autonomously unload the totes.

In some scenarios, a correct pick action by the picker may be verified. For example, each platform or set thereof may include a scale that may measure a weight of an item or set of items placed in totes on the platform. The instructions sent to the AMR from the central server may include a weight of each item on the list such that an expected weight of the picked item may be compared to a measured weight of the items placed in the tote(s), either individually or as a group. Significant deviation of the measured weight from the expected weight may trigger an error response, such as a signal sent to the picker's user device, a change in color of the lights linked to the tote in which the item was placed, an audible signal from the AMR, and the like. The user may then recheck the picked items for accuracy and take corrective actions, providing updates to the user device, which may then relay messages to the central server, the AMR, and the pick to light controller in turn (e.g., correct pick may cause the indicator elements of the indicator bar 49 on the platform to illuminate or signal that the correct pick has been made).

In yet another alterative or additional means for verifying a correct pick, items may include RFID tags and the shelves may include an RFID tunnel that registers an RFID tag on an item as it is placed onto the platform. The identity of the item as determined by its RFID tag may then be relayed from the AMR to the central server. Should the RFID tag information not match an expected RFID tag, the central server may trigger an error response, such as a signal sent to the picker's user device, a change in color of the lights linked to the tote in which the item was placed, an audible signal from the AMR, and the like. The user may then recheck the picked items for accuracy and take corrective actions, providing updates to the user device, which may then relay messages to the central server, the AMR, and the pick to light controller in turn (e.g., correct pick may cause the indicator elements of the indicator bar 49 on the platform to illuminate or signal that the correct pick has been made).

Method for Directing Pickers and Picker Teams

Pickers may be grouped to work together in teams. Such grouping may allow two pickers to receive the same order, such as for training purposes, wherein only one scan and verification signal would be sent to the central server. Another grouping useful for training may provide orders to two or more pickers, wherein at least one of the pickers is an experienced picker. The orders may include items that are in close proximity to each other so the more experienced picker may aid the trainee(s) if needed, i.e., would be close by to provide assistance.

Other teams may include groups of experienced pickers, wherein team statistics can be collected, and rewards provided based on team performance, i.e., institute a reward-based system for good performance or compensation based on performance This type of system may also indicate teams or pickers that may need assistance or additional training. In cases where groups of pickers are included as a team, different groups of AMRs may be assigned to each team. Team members may be spread across a logistics facility to reduce bias in task lists.

Other groupings may be to position additional pickers within a region of the facility, such as within a bay. These pickers may be pick for orders that include items from the bay but may also spend any free time collecting inventory counts for items at each clot or bin on shelves in the bay. Instructions for such activities may be provided on the user device and may be assigned by the central server based on order frequency, e.g., when few orders are being fulfilled in a specific region, certain pickers may be tasked with inventory collection. Additionally, or alternatively, the central server may provide instructions to the user device for inventory counting based on a specific need, wherein a system administrator may request the action at the central server, which is then communicated to the user device.

Pickers may also be tasked with picking items that don't fit in a bin and bringing those items to a pack/ship are, e.g., drop off station. The central server may coordinate the timing of these picks to be coincident with pick being completed by an AMR.

Order Drop Off in an Implementation of the "Meet-Me" Model

A process for unloading totes from an AMR by a human worker will be described with reference to FIGS. 19 and 22. When an AMR has traveled to all of the stop locations on its task list, i.e., has received all items for each order in totes carried thereon, it may begin a drop-off process. The central server may send a drop-off task list to the AMR with stop locations of drop-off stations (e.g., coordinates for each stop location). The AMR may travel to each of the stop locations, wherein the indicator elements on the intelligent shelving of the AMR may be illuminated to assist in the "drop off." For example, should totes be expected at a number of different drop-off stations or areas (e.g., A, B, C of FIG. 19), the indicator elements under the tote(s) expected at a specific one of the locations would be illuminated to provide signal to the human worker which tote(s) to unload (i.e., totes 330a at A; totes 330b at B, totes 330c at C). The human worker may indicate successful unloading of a tote by depressing any of the selection buttons beneath the tote that is to be, or was just, unloaded. The AMR may then proceed to the next drop-off location to continue the unloading process until all totes have been removed from the AMR. For example, totes on an AMR may contain orders that are to be shipped via different shipping methods. In this scenario, a first drop-off station may be tailored for deliveries via a first shipper (e.g., FedEx, UPS, DHL, etc.), and a second, third, and more station may be tailored for the other shippers.

At unload, an ID tag on each tote may be scanned to provide a tote identity, and thus an order identity associated with that tote, such as stored in the central server. The central server may then disassociate the order identity from the tote identity and place the tote back into available status for assignment to a new order, such as at induction. The order and status thereof may not be send to the WMS via the central server, and may be removed from the global task list of the central server. A human worker at the drop-off station may pack the items from the order for shipping.

In certain implementations, the logistics facility may be configured to provide the order direct to a customer. For example, the logistics facility may be a retail facility and may provide the order to a retail customer. In certain implementations, the order may include parts for a kit, i.e., robot and picker task lists were for kitting a group of parts that may be used to produce or manufacture a product or article of manufacture. In this case, the drop-off location may be configured for shipping, or may be direct to a worker involved in producing/manufacturing the product/article.

Upon delivery of all bins to drop-off locations, as indicated on the AMRs drop-off task list, the AMR is ready to receive a new task list to fulfill one or more new orders (i.e., to induction 305), may proceed to a battery recharge station 350, or may proceed to a holding area 340. Should the AMR be destined for new order fulfilment, before it may proceed to collecting items throughout the logistics facility for the new set of orders, it must be configured for the orders/items assigned thereto in an induction process.

Induction in an Implementation of the "Meet-Me" Model

When an order is received by the central server, it may be analyzed to determine a best AMR to assign to the order based on a number of factors, such as the other orders that AMR is assigned, locations within the logistics facility of items in the order, size and number of items in the order, and the like. While described as an iterative process, i.e., assign an order to an AMR, then assign another order to that AMR during induction, the central server may be analyzing all orders and grouping orders before "assigning" to individual AMRs. In addition, the central server could be configured to assign an order to an AMR—with available capacity—after the induction process is complete and before the picking phase is complete to support a more immediate fulfillment strategy for rush orders.

With reference to FIGS. 19 and 20, once an AMR is selected and the total number of items for a task list determined, an induction scheme including a number and configuration of totes used to collect the items in the task list may be determined. That is, the size and number of totes or other containers to be placed on the AMR, and their specific positions on the shelves of the AMR, may be determined and sent to a processor of a user device. A stop location for an induction station 310 would be sent to a processor of the AMR.

Upon arrival of the AMR at the induction station 310, a human worker may receive an induction scheme including a list of totes and positions for those totes on platforms of an AMR. The user may scan an ID tag on a first of the totes using their user device, which may then send a signal to the central processor. The central processor may send instructions to the AMR including at least an identity of a first tote position on a platform of the AMR, wherein the AMR may communicate with the pick to light controller to cause a first subset of indicators to illuminate defining the first tote position on a platform of the AMR. The human worker may place the first tote on the platform at the designated position on the platform, and depress a button below that tote (i.e., on the indicator bar).

According to certain aspects, the pick to light controller may cause all of the tote locations on the platform(s) to be illuminated to direct specific placement of the totes on the platform, such as by alternating colors, and may optionally include a number assigned to each region. For example, the display elements may indicate the position of a first tote by a "1", and a second tote by a "2", and so on.

This process will proceed for each tote to be placed on the AMR until the induction scheme is completed. The selection and the arrangement of totes on the shelves of the AMR may depend on the characteristics and number of the items in the order and/or the number of orders in a task list.

The container induction logic may further include an optimization to allow the induction of unassigned containers to an AMR in support of real-time allocation of rush orders while the AMR is in the process of executing a mission. This would allow the fulfillment operation to react more quickly in completing their highest priority orders.

As shown in FIG. 20, scanning of each bin prior to placing the bin at an assigned position on the AMR associates that bin with a specific order. As such, this information may also be relayed to the WMS indicating an order status. Such communication to the WMS may be useful to reassign a condition of the order, such as the order may no longer accept changes, or to provide an order update to the consumer placing the order, and the like.

While only one induction station is discussed, multiple induction stations are possible and within the scope of the present disclosure. For example, AMRs having different platform arrangements may be inducted at different induction stations, or AMRs including replenishment items may stop at additional stations, such as a replenishment station to include additional totes comprising the replenishment items or items to previously assigned totes on the AMR.

Specific Implementation of an Autonomous Mobile Robot (AMR)

Figure 2B:
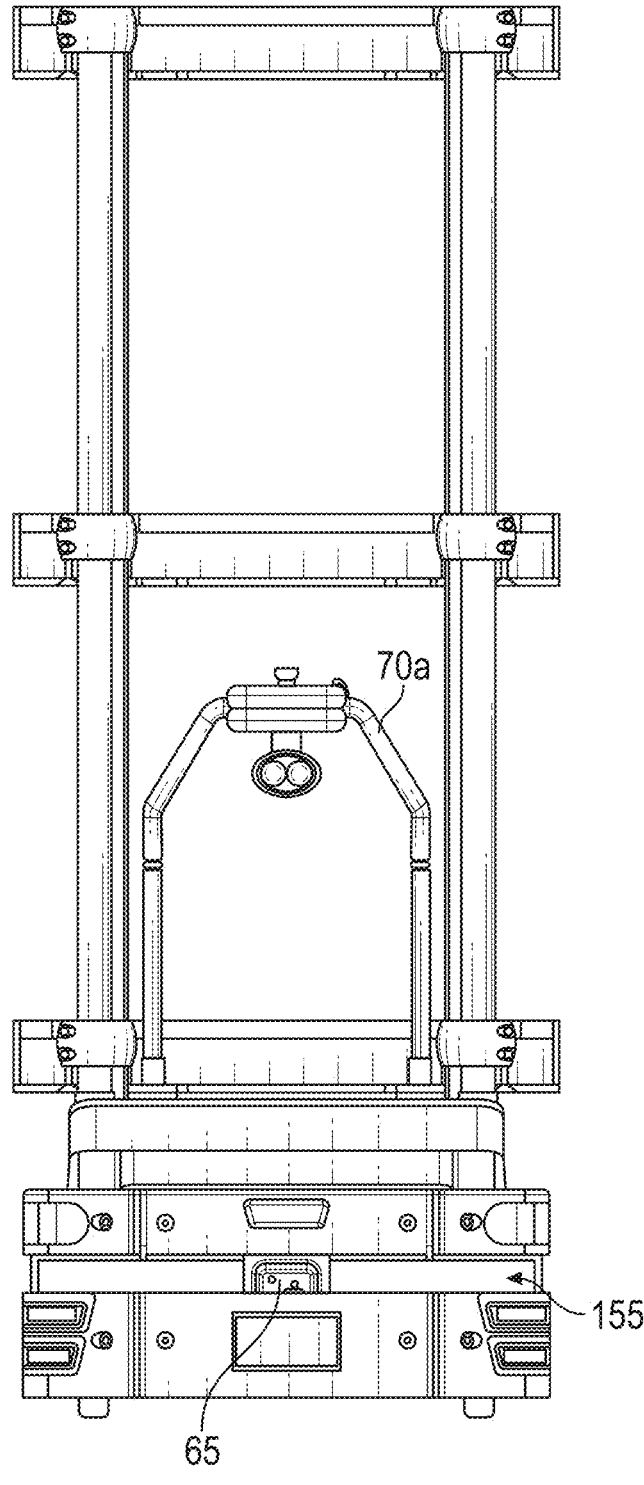
Figure 2C:
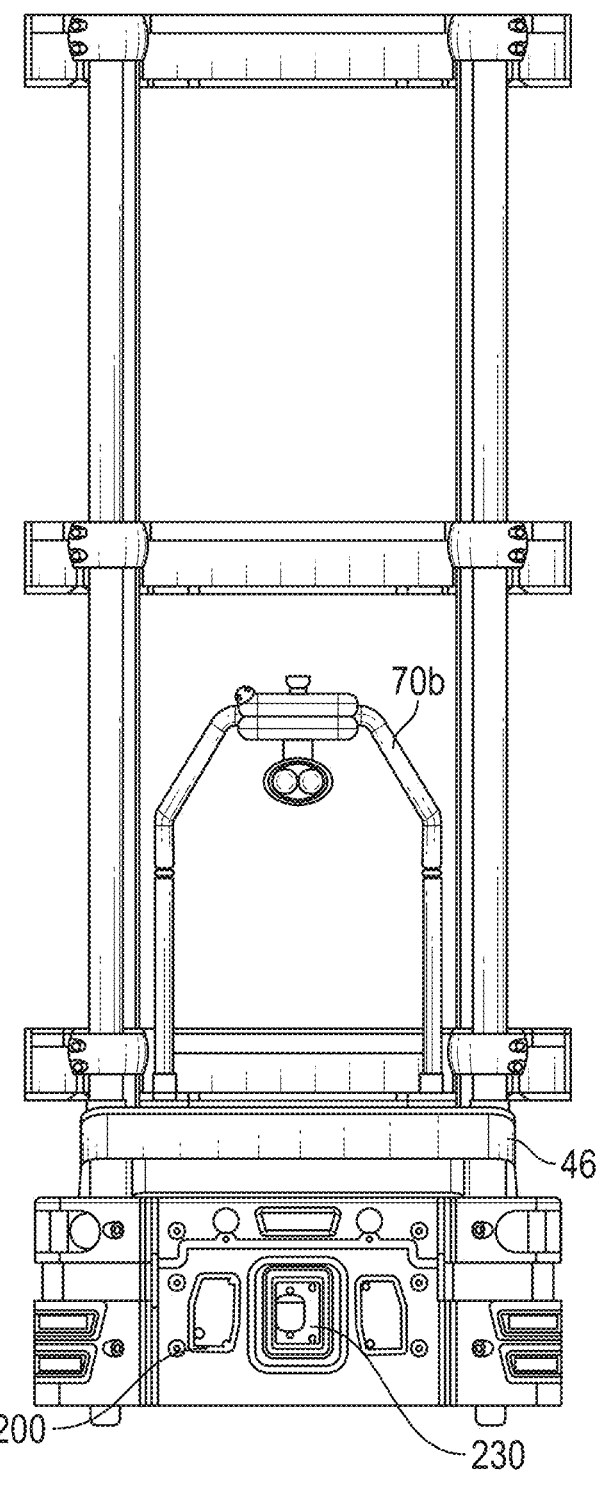
Figure 2D:
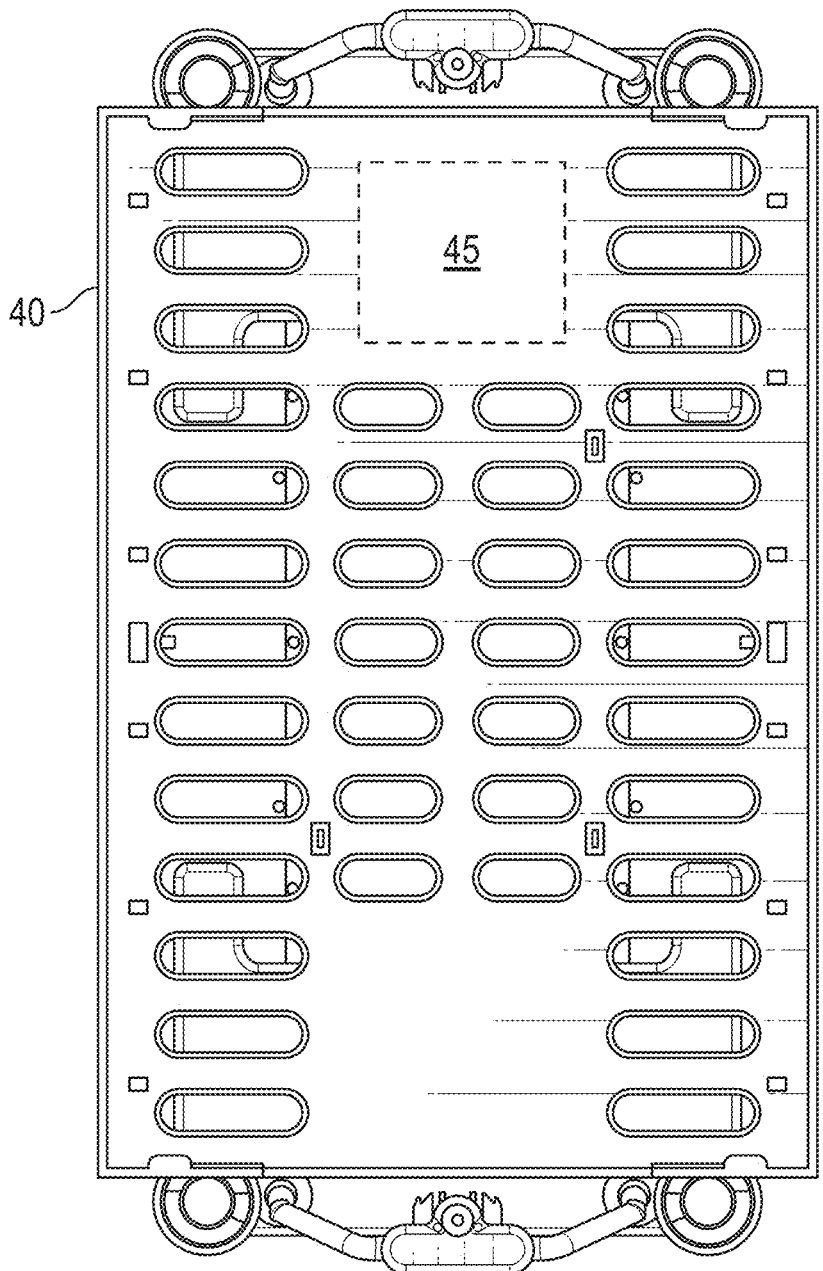
Figure 2E:
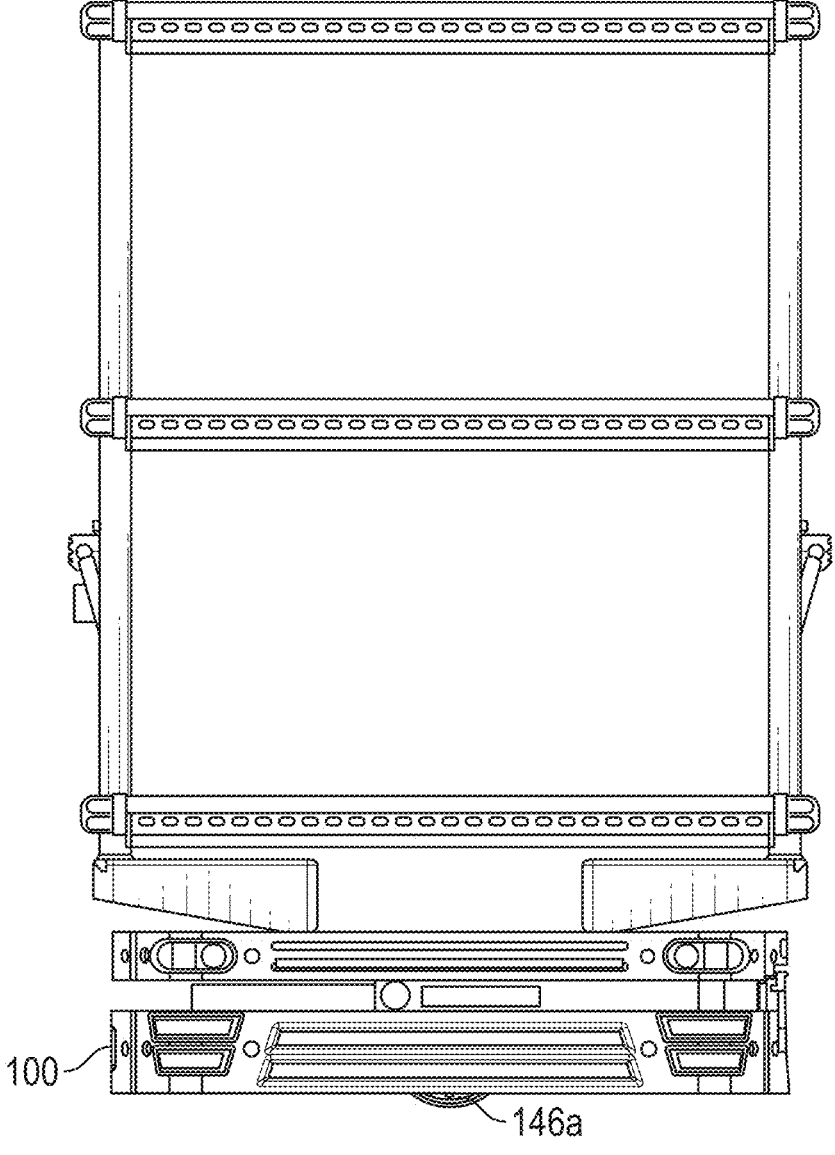
Figure 7A:
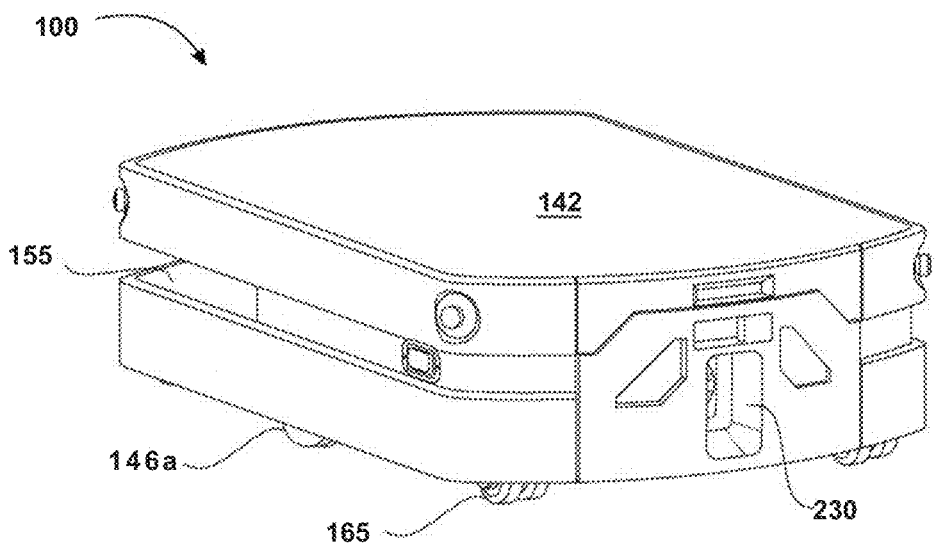
FIGS. 7A and 7B illustrate a front-perspective view and front view, respectively, of an autonomous mobile robot according to aspects of the present disclosure.
Figure 7B:
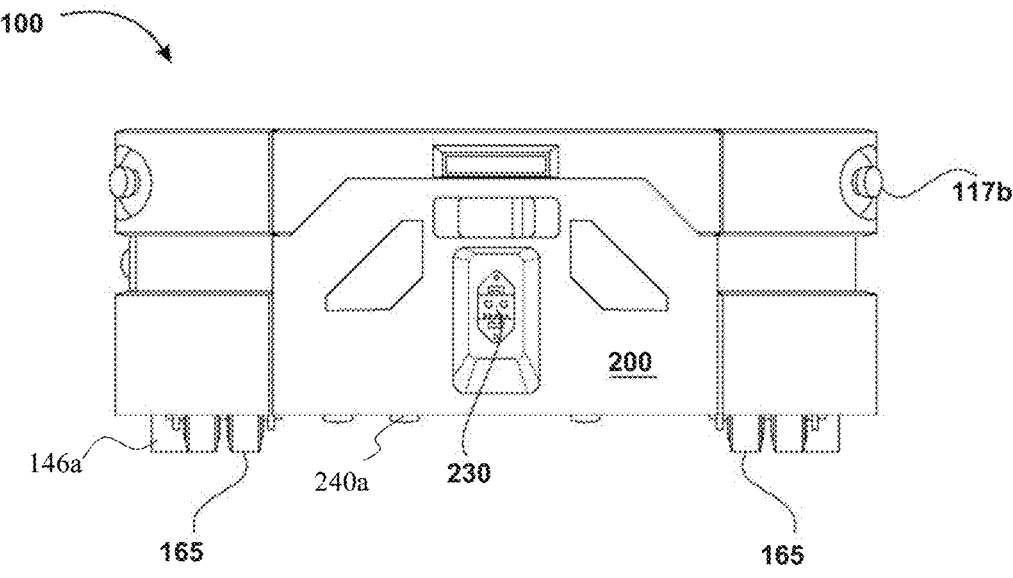

With reference to FIGS. 1 through 15B, exemplary designs for an AMR are shown. The AMR 100 includes a housing or mobile base having a substantially flat top surface (142, FIGS. 2A and 7A) capable of supporting a load, such as a pallet (see FIG. 6) or other cartons or items. The top surface may also support a frame 46, such as shown in FIGS. 2A, 2B, and 2D, wherein the frame may be removeably connected to the top surface of the AMR 100 via screws, bolts (see 56 of FIGS. 2B and 4), or other standard attachment elements known in the art. The frame may be configured to support 2 or 4 vertical posts 42 that may provide releasable or non-releasable support of one or more shelves (e.g., 40a, 40b, 40c in FIGS. 4 and 5). Moreover, the shelves may be repositionable on the vertical posts, as discussed with reference to FIG. 3, so that assorted sizes and configurations of totes may be accommodated.

Figure 12:
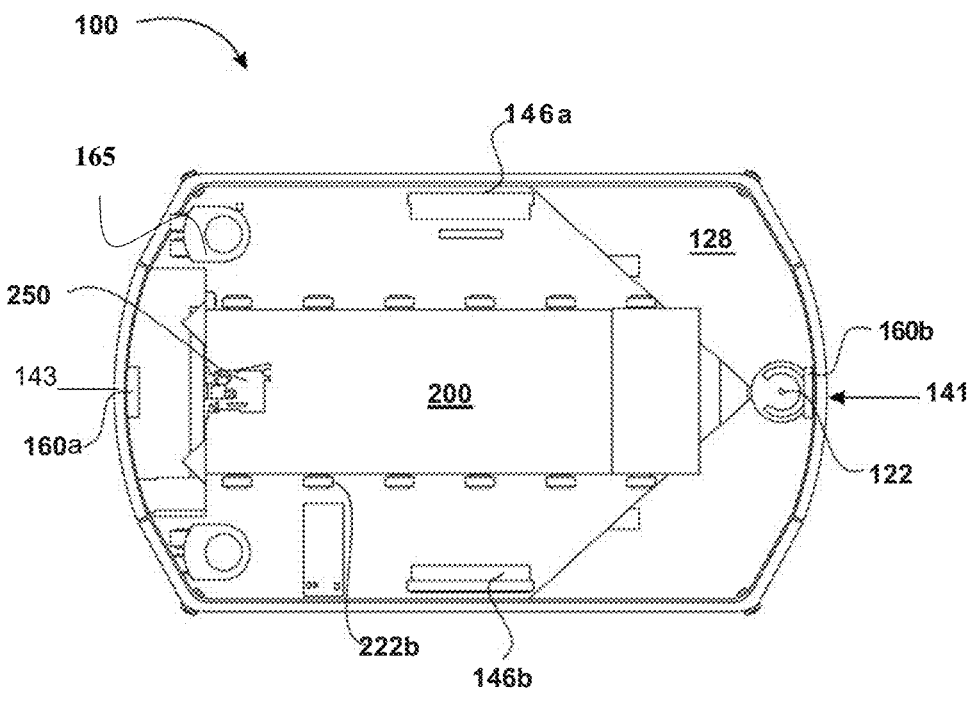
FIG. 12 illustrates a top view of internal components of an autonomous mobile robot according to aspects of the present disclosure.

The AMRs disclosed herein include sensors useful for navigation, i.e., object detection and localization, such as LIDAR or cameras, e.g., 3D camera, fisheye camera (see 65 of FIGS. 2A and 2B). Additional sensors, such as obstacle detection sensors (e.g., IR sensors) and cameras may be included to assist in navigation of the AMR 100, such as front 141 and rear 143 facing sensors (e.g., 160b and 160a, respectively) as shown in FIG. 12. According to certain aspects, the AMR 100 may additionally include side sensors. Exemplary front and rear facing sensors include structured light depth cameras (3D depth cameras), while exemplary side facing sensors include stereo cameras. As such, the AMR 100 may be configured to navigate while driving both forwards and backwards and may provide a full 360-degree field of view of the environment around the AMR 100.

One or more of the sensors may be positioned within a slot 155 located on a front end 141 of the AMR 100. The slot 155 may be configured as a recess within the front portion of the AMR 100, such as a recess extending from a front end of the AMR 100 to a point 0.2× to 0.5× the longitudinal length thereof, such as 0.3× to 0.5×, or 0.3× to 0.4× the longitudinal length. The slot 155 thus provides a 180-degree field of view, such as a 210-degree, 240-degree, or even 270-degree field of view 128 for the sensor, such as LiDAR 122 (described in additional detail hereinbelow). Accordingly, the AMRs 100 disclosed herein may provide forward and reverse navigation and a 360-degree field of view provided by a laser ranging device, such as LIDAR, augmented with 3D cameras.

As noted herein, should a camera be used for navigation, such as a fisheye camera, it may be positioned within the above-described slot, or in a different location, such as on a top or front of the AMR.

These exteroceptive sensors may be differentiated from sensors included on the AMR 100 disclosed herein that may be proprioceptive or interoceptive, such as accelerometers, gyroscopes, strain gauges, magnetometers and a compass, wheel encoders, and temperature sensors. The exteroceptive sensors may include forward, side, and/or rear facing sensors such as cameras, depth cameras, laser and/or LiDAR devices, radar, sonar, ultrasonic, infrared, touch sensors such as whiskers or bump sensors, GPS, and proximity sensors. Exemplary cameras may include any of 3D or structured light depth cameras, stereo cameras, color cameras, grey scale cameras, fisheye cameras, and combinations thereof.

The AMR 100 may further include one or more lights that may be used to improve visibility conditions for the various sensors on the AMR, may improve visibility conditions for other devices that may need to identify the AMR, and/or may improve visibility for human workers in the vicinity of the AMR. The lights may also be used to communicate the AMR's state, i.e., moving direction, turning, manual/autonomous navigate state, system ready, system fault, etc. The AMR 100 may include emergency stop buttons (117b, FIG. 7B) that may provide emergency 'shut off' of the AMR 100, such as when it cannot be shut down remotely or in the case of an emergency.

Figure 2F:
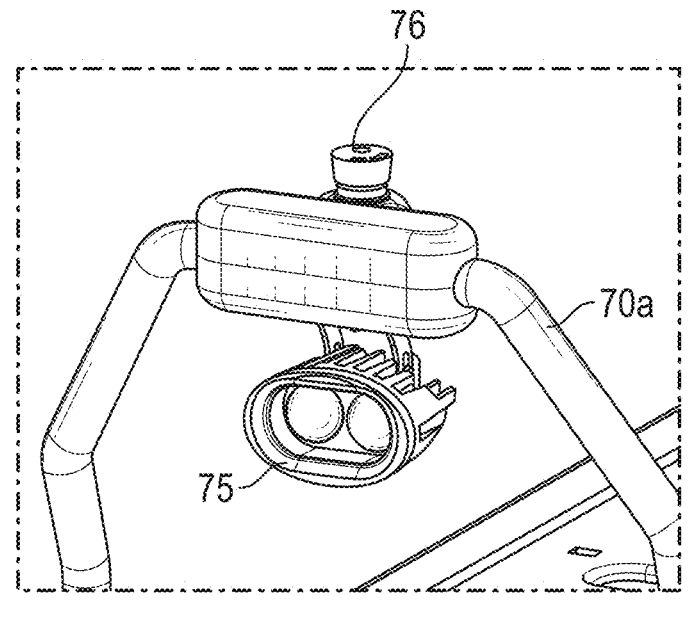
FIGS. 2F and 2G illustrate front and back handles, respectively, of an autonomous mobile robot according to aspects of the present disclosure.
Figure 2G:
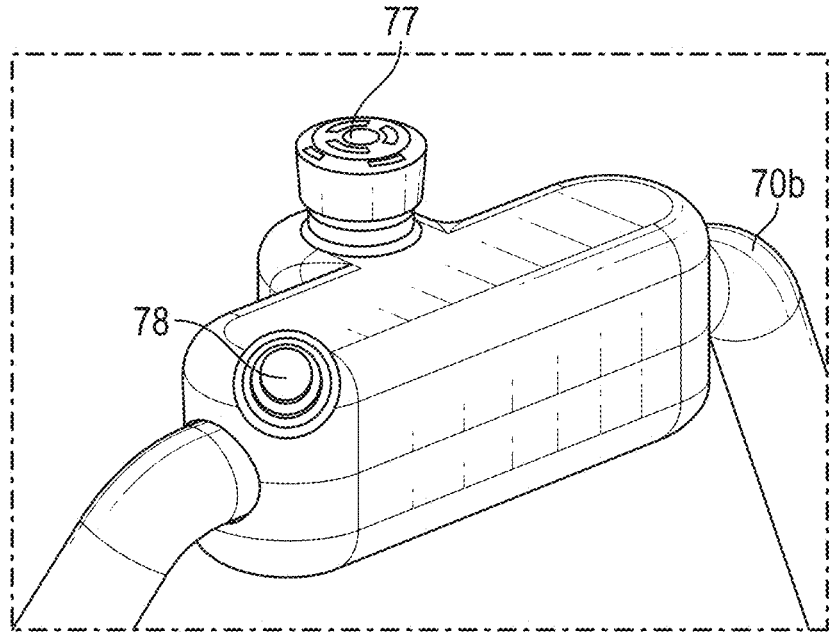

One such arrangement of lights and stop buttons is shown in FIG. 2F, which illustrates a closeup view of a front handle 70a (section A from FIG. 2A), and FIG. 2G, which illustrates a closeup view of a rear handle 70b of the AMR 100. Both the front and rear handles are shown as attached to the platform 46. According to certain aspects, the front handle 70a may include a spotlight and an emergency stop button 76. The rear handle 70b may include an emergency stop button 77 and a pause/resume button 78, which may be useful in situations where the AMR 100 is obstructed for movement and may need an operator to take control (e.g., human picker or worker in the logistics facility). The operator may depress the pause/resume button 78 to cause the AMR 100 to disengage its drive wheels (see description below) and allow the operator to move the AMR within the facility to an unobstructed position using the handles (70a, 70b). The operator may then depress this button again and resume the operation of the AMR, i.e., the AMR 100 may not lose its work order and may continue with the next task in the work order.

The handles (70a, 70b) further provide locations for additional accessories on the AMR, such as holders for a step stool/ladder, printer/label-maker, barcode scanner, cupholder, and the like.

The AMRs 100 disclosed herein generally comprise drive wheels and passive wheels. Positions of drive wheels 146 and passive wheels 165 are shown in FIG. 12. According to certain aspects, a drive system of the AMR 100 includes two drive wheels (146a, 146b), and four passive wheels 165. The AMR 100 includes an onboard computer processor (718; see FIG. 16). Each drive wheel 146 may have an encoder that provides motion feedback to the processor 718, which can be used to precisely control the speed of each wheel to achieve the desired rotation and translation velocities of the AMR 100. The feedback data may also be used for odometry to estimate the motion of the AMR 100 relative to the logistics facility. The odometry, alone or in addition to other information, may assist in guiding the AMR 100 navigation at times when visual markers are out of sensor range. The AMR 100 may use the passive wheels 165, such as casters, for stability and weight distribution.

Most prior art AMRs use motor-driven drive wheels in which the motor transfers power to a set of wheels via a gearbox. A disadvantage of such gearbox-driven robots is that they require a heavier force of touch to bring the motor to stop. Because of the necessary greater force, gearbox-driven robots may pose a safety hazard when operating near human workers in a warehouse. The drive wheels 146 of the presently disclosed AMRs overcome these drawbacks by providing a direct drive mechanism that is configured to detect much lighter forces, such as from an unintended collision, and instantly transfer that response back to the motors that are directly driving the wheels, thereby stopping the AMR more quickly and more reliably.

Figure 14A:
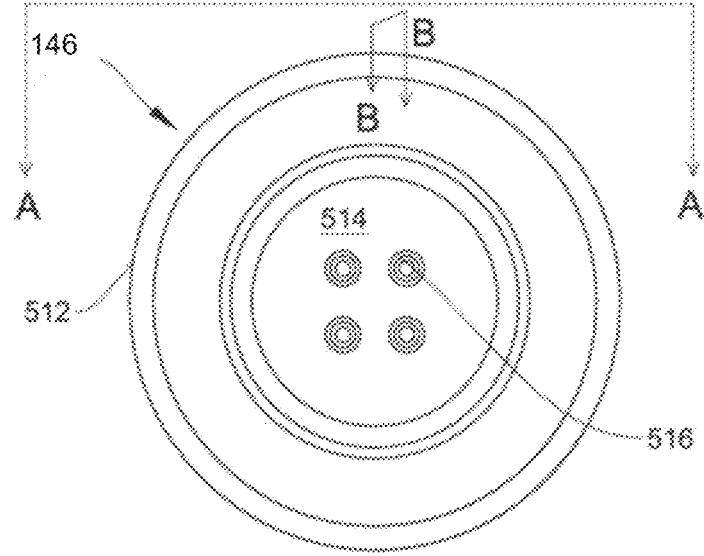
FIG. 14A illustrates a front view of an outer rotor brushless DC motor drive wheel of robot according to aspects of the present disclosure.

An exemplary drive wheel 146 of the AMR 100 is shown in FIG. 14A, wherein the drive wheel 146 generally includes an integrated tire 512 and a front cover 514 having holes 516 that allow passage of front attachment means. An exemplary attachment means, e.g., bolts, may pass through the holes 516 in the front cover 514 and extend through a thickness of the drive wheel 146 to attach to the AMR 100. As such, these drive wheels 146 are easily replaced or removed for repairs. Additionally, the tire 512 is attachable or integrated with an outer rotor that may also be easily replaced, such as when the tire is worn.

Figure 14B:
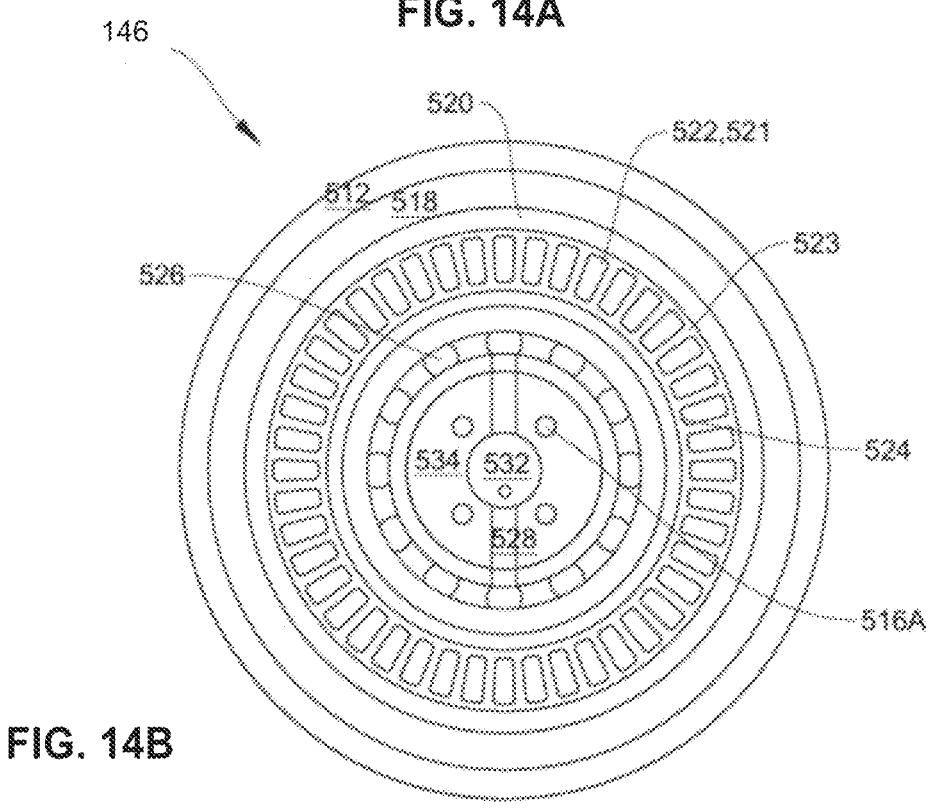
FIG. 14B illustrates a cross-sectional view taken along line A-A of the drive wheel shown in FIG. 14A.

Shown in FIG. 14B is a cross-sectional view of the drive wheel 146 taken along line A-A of FIG. 14A. The drive wheel 146 generally includes components of a brushless direct current motor, such as a stator 524 comprising electromagnets 521, a rotor 518, and alternating poles, i.e., permanent magnets 520. The rotor 518 may be positioned around the circumference of the stator 524 such that it is capable of rotation around the stator. Attached or connected to an inner wall of the rotor 518 are a number of alternating poles, i.e., permanent magnets 520 with alternating north and south poles. These magnets 520 are generally positioned with a small clearance or magnetic clearance gap between an inward facing surface of the magnet (i.e., inward to a center of the drive wheel) and the outer most surface of the stator (i.e., outward away from a center of the drive wheel). The magnetic clearance gap may be 5 mm or less, such as 3 mm or less.

The stator 524 is stationary and is formed around the outer circumference of a circular mechanical support element, or central shaft 534. A plurality of electromagnets 521 are positioned within slots 522 along an outer circumference of the stator 524 proximate the magnets 520 on the inner wall of the rotor 518. While the stator 524 is shown to include 44 slots 522 configured to hold electromagnets 521, any number of slots and electromagnets could be included in the drive wheel 146. Moreover, while the central shaft 534 is shown to be formed in the shape of a ring, any shape could be used, including, for example, a hub-and-spoke shape in which the stator 524 is supported by spokes connecting to a central hub.

Also shown in FIG. 14B are the attachment bores 516a that pass through the width of the drive wheel 146 and are positioned in the central shaft 534. These accept the attachment means discussed above that provide connection between the drive wheel 146 and the AMR 100. The central shaft 534 also includes a central axial bore 532 that extends longitudinally through the central shaft (i.e., thickness of the drive wheel 146), and at least one wire passthrough bore 528 that extends radially from the central bore 532 through the central shaft 534. The central axial bore 532 and wire passthrough bore 528 provide for passage of wiring from the electromagnets and an encoder, such as to a motor controller and power supply, generally a battery provided by the AMR 100.

Figures 15A, 15B:
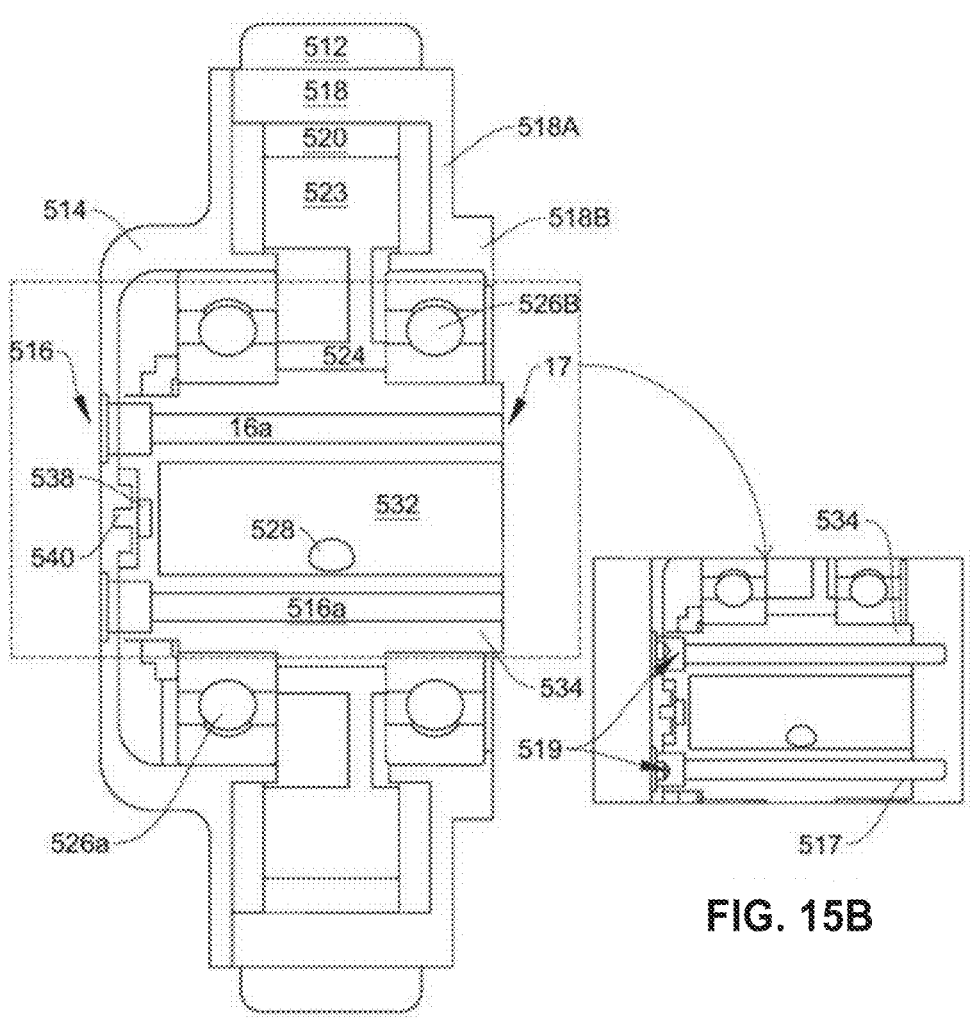
FIG. 15A illustrates a side cross-sectional view taken along line B-B of the drive wheel shown in FIG. 14A.
FIG. 15B illustrates a portion of the cross-sectional view of the drive wheel shown in FIG. 15A pointing out placement of attachment means through the central shaft according to aspects of the present disclosure.

With specific reference to FIGS. 15A and 15B, which are cross-sectional views taken along line B-B of FIG. 14A, the stator 524 is shown to extend radially inward and connect to the central shaft 534. In FIG. 15A, a sidewall 523 of the slot 522 is shown, as is an inner most portion of the stator 524 attached to the central shaft. These views of the drive wheel 146 clearly illustrate the cover 514 on an outward facing surface, i.e., when the drive wheel is attached to the mobile base, and a sidewall (518a, 518b) of the rotor 518 that covers a large portion of an inward facing surface thereof. The holes 516 in the cover that allow passage of the attachment means, which extend through axial bores 516a in the central shaft 534. Reference number 17 points to an exit point of the axial bores 516a on a back side of the central shaft 534.

As shown more clearly in FIG. 15B, the attachment means 519, such as a bolt, may pass through the holes 516 in the cover and may reside in the axial bores 516a including past the exit 517 on the back side of the central shaft 534 so that they may engage complementary bores on an AMR 100. Once engaged, the attachment means does not interfere with rotation of the cover, i.e., as the rotor 518 and cover rotate about the stator 524, as they may be countersunk into the central shaft so that they are flush with a surface of the central shaft 534. As indicated above, the stator 524, electromagnets 521 positioned in the slots 522, and central shaft 534 do not rotate, while the rotor 518 and magnets 520 are configured for rotation. To support the axial rotation of the rotor 518 relative to the stator 524, bearings are included between the cover 514 and the central shaft 534, and between the sidewall (518a, 518b) of the rotor 518 and the central shaft 534 (bearings 526a and 526b, respectively).

The electromagnets 521 of the stator 524 can be energized in a controlled fashion to drive rotation of the magnets 520 attached to the inner surface of the rotor 518, and thus drive rotation of the tire 512 attached to the rotor 518. Accordingly, also included on each drive wheel 146 is an encoder. An exemplary implementation of an encoder may include an encoder read head 538 and an encoder magnet 540 as shown in FIG. 15A. The encoder magnet 540 is shown to be attached to an inner side of the cover 514, which rotates with the rotor 518, while the encoder read head 538 is attached to the stationary central shaft 534 (i.e., a rotary encoder). As the rotor 518 and cover 514 rotate, the encoder magnet 540 will also rotate and present different poles to the encoder read head 538. The encoder may be an absolute encoder or an incremental encoder.

All systems onboard the AMR 100 may be powered from onboard batteries, such as the rechargeable battery 200 shown in FIGS. 7A to 10B, 12 and 13. The rechargeable battery 200 may supply power to the AMR 100 during navigation for a limited time and may be rechargeable to maintain operation through an economically viable work period. Battery charging may occur opportunistically during times at which no work orders are present for the AMR 100, or charging may occur separately from the AMR 100. In this later case, the rechargeable battery 200 may be swapped with separately charged batteries for continued operation of thereof.

For opportunistic charging, the AMR 100 may have a charging station in a designated area of the logistics facility in which the AMR can make temporary electrical contacts which feed power into the onboard batteries (i.e., rechargeable battery 200) while the AMR is present. For separate charging, a battery hot-swap may be performed using permanently installed smaller short-life (i.e., minutes) onboard batteries to maintain power while the larger rechargeable battery 200 is replaced with a fully charged rechargeable battery 200. This prevents the AMR from needing to power down during battery swap, which saves time.

Hot-swapping may be done manually by a human operator or may be done automatically such as with internal mechanisms of the AMR 100 and charging station that may automatically discharge/swap batteries at the charging station with the AMR 100 coordinating the procedure. That is, the AMR 100 may automatically discharge an exhausted rechargeable battery at an empty charging station, travel to a second charging station having a charged rechargeable battery thereon and load the charged rechargeable battery from that second charging station. The smaller, short-life batteries may provide sufficient power for each of these operations (see 675 of FIG. 11B). Moreover, the smaller, short-life batteries may be recharged by the rechargeable battery during normal operation of the AMR 100.

Additional signaling from the various charging stations that provide information regarding their status, e.g., presence or absence of a battery, and/or charge state of a battery on the charging station, may be provided to the central server 700 or the WMS. This information may be shared with each of the AMR 100 in the logistics facility.

Figure 13:
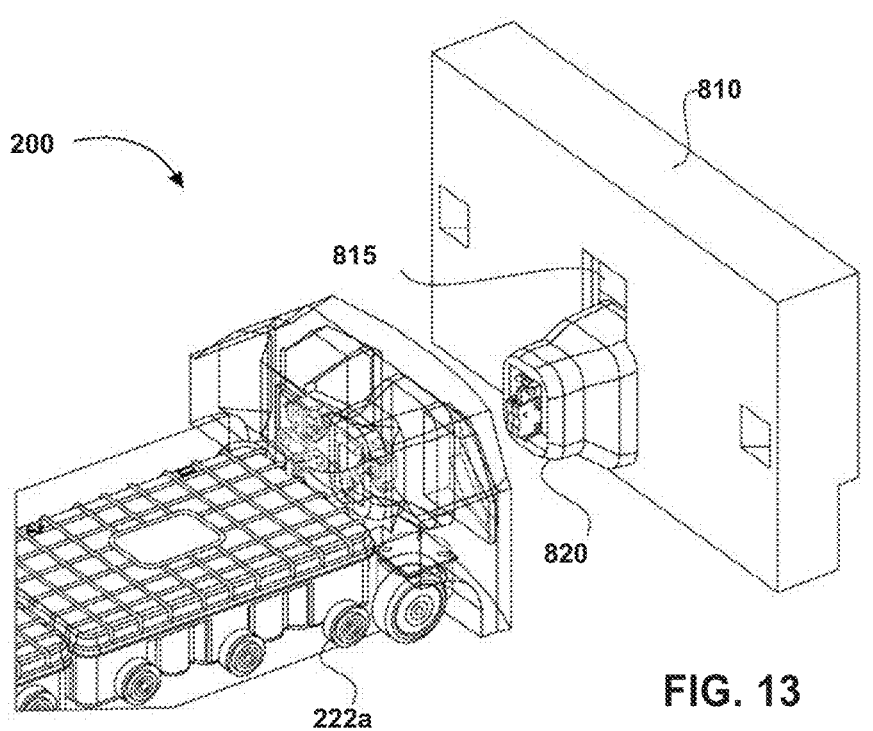
FIG. 13 illustrates a rechargeable battery docking with a docking station according to aspects of the present disclosure.

Charging of the rechargeable battery at the charging station may be wireless or may include direct contacts for interfacing with corresponding contacts (e.g., such as a charger pad or direct contacts) on the rechargeable battery. The contacts may be any suitable contacts such as spring loaded or other actuatable contacts that are configured to engage the contacts of the rechargeable battery when the battery is positioned substantially over or in front of the charging station. An exemplary design for the contacts between a rechargeable battery 200 and a charging station 810 is shown in FIG. 13. A contact 820 of the charging station 810 may be positioned so that a complementary contact (see FIGS. 7A, 7B and 8B, 230) of the rechargeable battery 200 may be pushed or moved into contact therewith by a human worker or an AMR (i.e., any of the AMRs disclosed herein).

With reference to FIG. 14, an exemplary design and location for the rechargeable battery 200 in an AMR 100 is shown, such as positioned within a cavity of the AMR 100. As shown in FIGS. 8A, 8B, 10A, and 10B, the rechargeable battery 200 may include a main body having a top side (214 and 218), left- and right-side walls (216*a* and 216*b*, respectively), and front and back side walls. The top side 214 may include a cover which may be opened to provide access to contents therein, such as at least one rechargeable battery cell. Exemplary rechargeable batteries include at least lithium-ion batteries, such as rechargeable lithium iron phosphate batteries (e.g., 55V, 110 Amp).

Figure 10A:
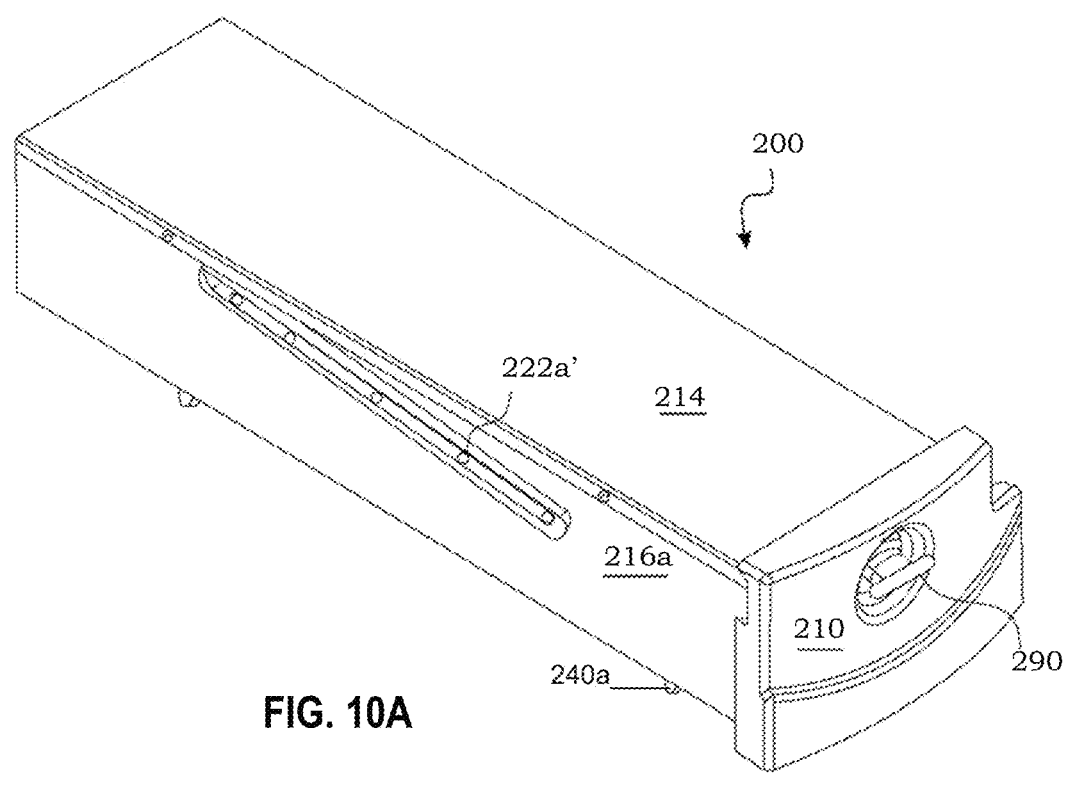
FIGS. 10A and 10B illustrate left- and right-side perspective views, respectively, of a rechargeable battery useful in the autonomous mobile robots according to aspects of the present disclosure.
Figure 10B:
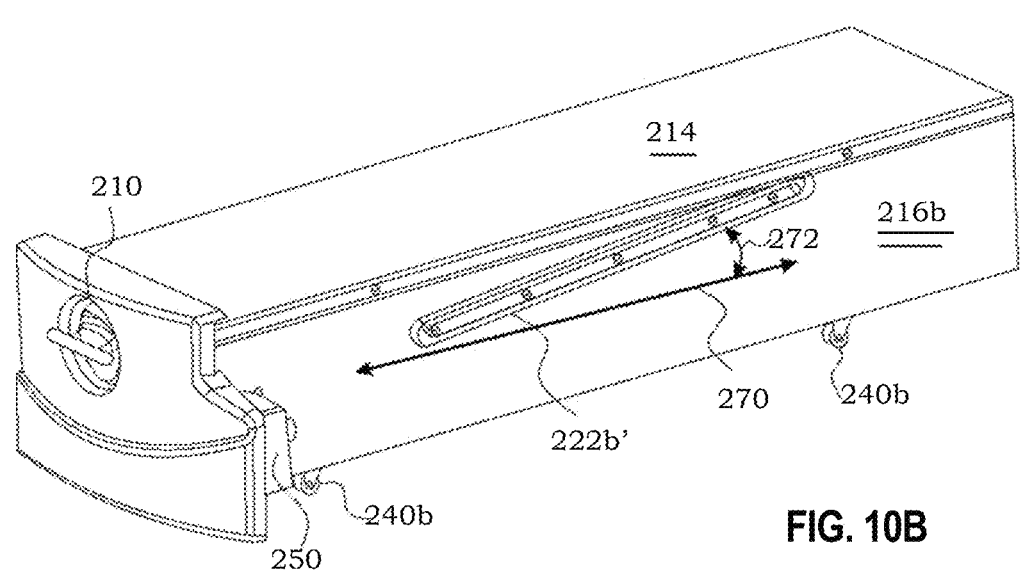
Figure 11A:
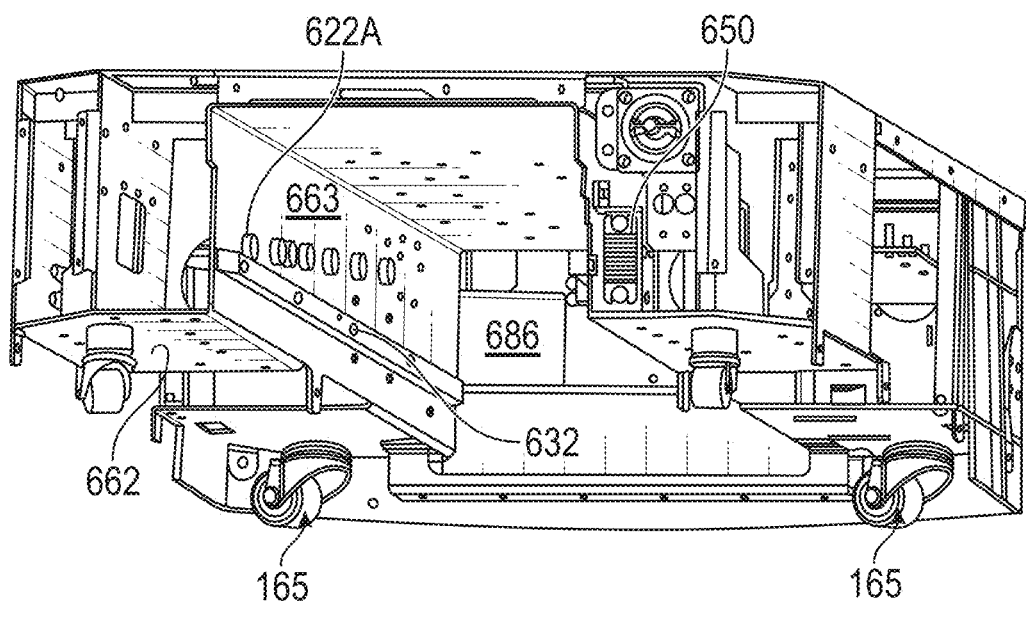
FIGS. 11A and 11B illustrate bottom- and top-perspective views of a battery cavity of an autonomous mobile robot according to aspects of the present disclosure.
Figure 11B:
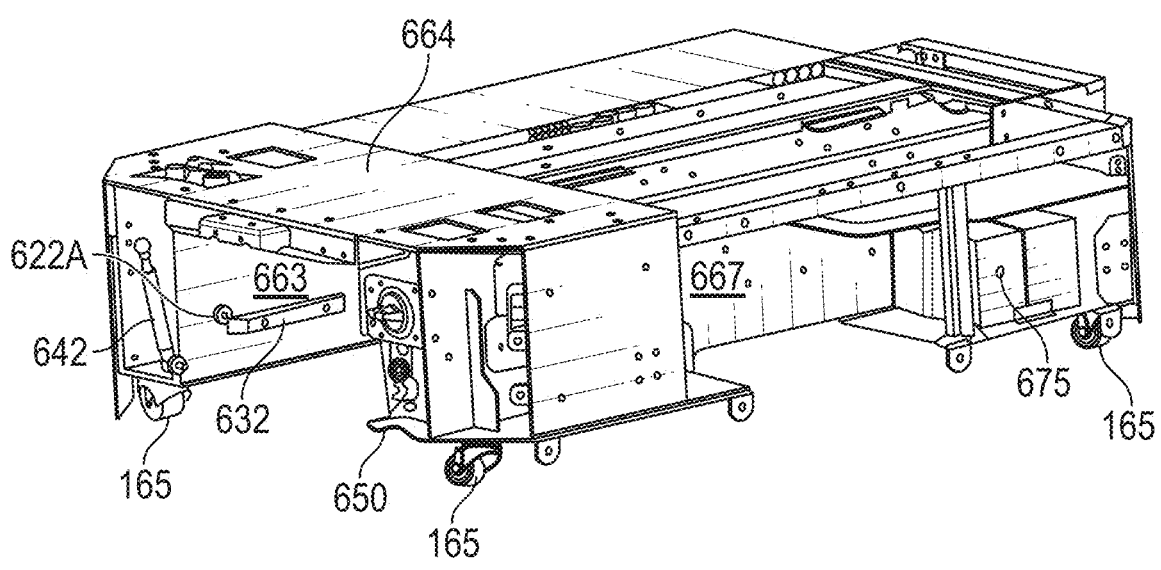

Exemplary battery configurations are shown in U.S. Pat. No. 10,953,555, the entire content of which is incorporated by reference herein. These exemplary batteries, which are configured to provide sufficient power to the AMR 100 disclosed herein, may weight more than 100 pounds. Accordingly, they would generally be too heavy for the average person to lift and/or maneuver. Thus, also provided on the main body may be a means to enable movement of the rechargeable battery. For example, as shown in FIGS. 10B, wheels 240*b* such as fixed or rotatable casters may be attached to a bottom of the main body of the rechargeable battery 200.

Figure 9:
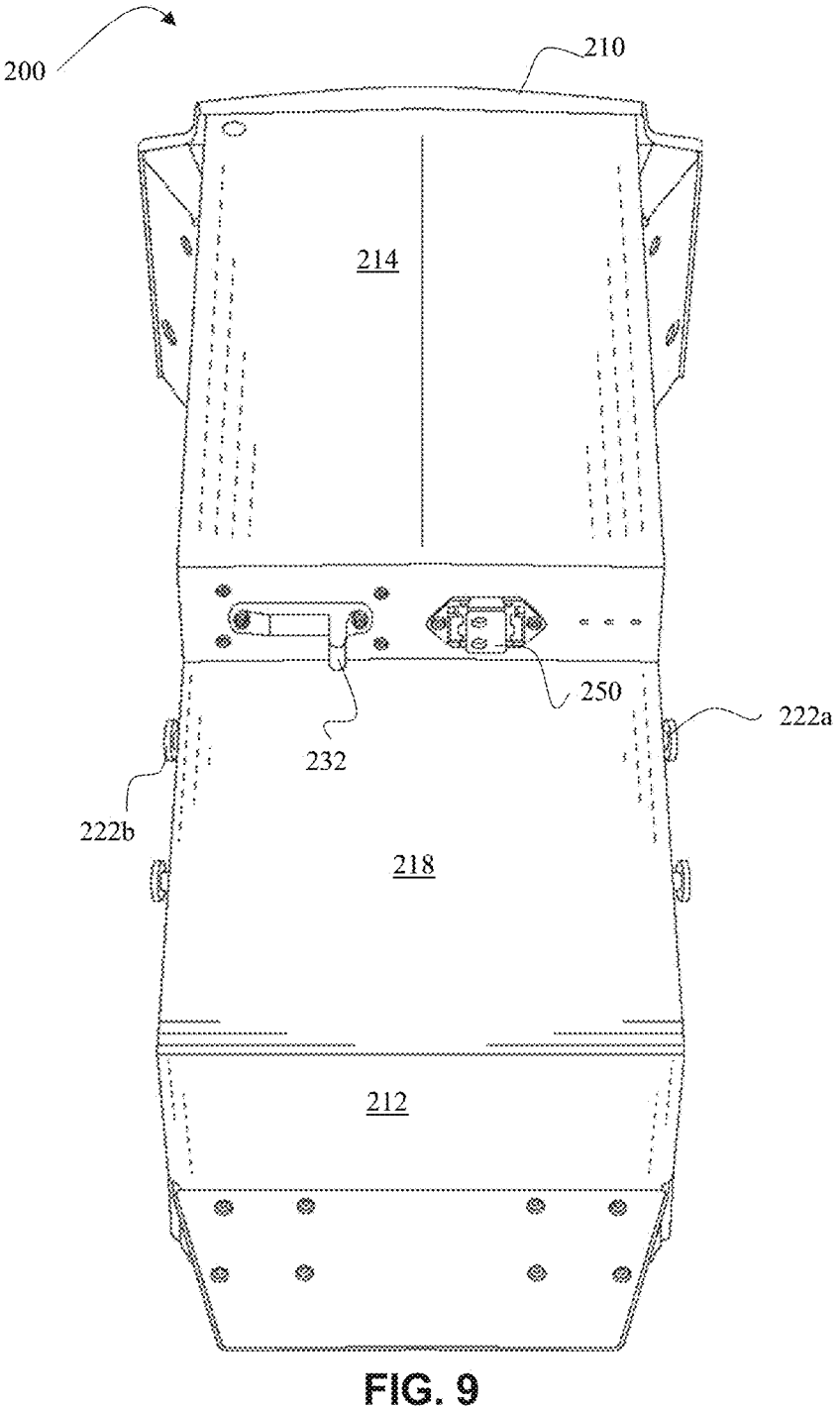
FIG. 9 illustrates a top-perspective view of the rechargeable battery shown in FIGS. 8A and 8B.

The main body of the rechargeable battery 200 may further include at least one attachment or connection means for engaging with complementary attachment or connection means on the AMR(s). For example, the main body may include at least one connection means on each of the left and right sides of the main body. Shown in FIG. 10A is a connection rail 222*a*' on the left-side wall 216*a* of the main body. Shown in FIG. 10B is a connection rail 222*b*' on the right-side wall 216*b* of the main body. Each connection rail is attached to the side of the main body at an angle 272 that deviates from the longitudinal axis 270 of the main body. That is, the connection rails (222*a*', 222*b*') extend upward from a front wall 210 to a back wall 212 (see FIG. 9) of the main body with respect to the longitudinal axis thereof.

The angle 272 may be at least 5°, such as at least 6°, or 7°, or 8°, or 9°, or 10°, or 15°, or 20°, or 25°, or 30°, or 35°, or 40°, or 45°. In general, the angle would not exceed 45° as the force required to push the rechargeable battery into the cavity on the AMR 100 is directly related to the angle 272. That is, the connection rails provide a means to lift/elevate the rechargeable battery 200 into an engaged position on the AMR 100. See for example the wheels 240*a* of the rechargeable battery 200 that are elevated relative to the drive wheels 146 and passive wheels 165 of the AMR 100 shown in FIG. 7B when the battery is engaged and locked into the AMR 100.

Figure 8A:
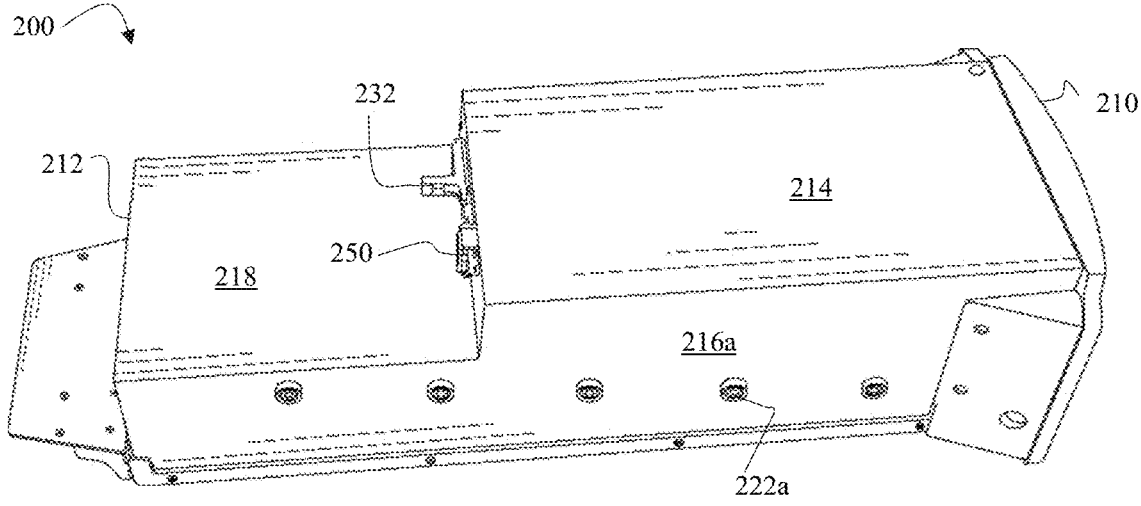
FIGS. 8A and 8B illustrates side- and front-perspective views, respectively, of a rechargeable battery useful in the autonomous mobile robots according to aspects of the present disclosure.
Figure 8B:
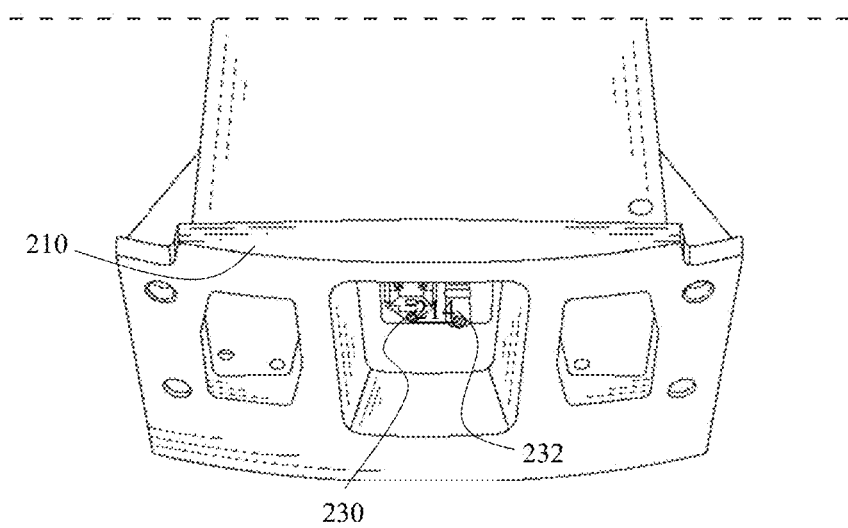

The specific position of these connection rails on the sides of the main body provide a means to connect the rechargeable battery with the AMR 100 by engaging with complementary device connection means in a cavity thereof. For example, and with reference to FIGS. 11A and 11B, the device connection means may be positioned on an inner right side and an inner left side 663 of the cavity at a position complementary to the position of the battery connection rails (i.e., distance from the ground surface, angle, horizontal spacing, etc.). The rechargeable battery may be positioned (e.g., rolled on wheels 240*a*, 240*b*) for connection by positioning a back sidewall of the battery proximate to an open front of the cavity in the AMR. The connection rails (222*a*', 222*b*') may engage a complementary connection means on each of the right and left sides of the cavity (e.g., rails, wheels, etc. that are configured to interact with the connection means on the rechargeable battery). Connection of the rechargeable battery to the AMR 100 is then achieved by pushing the battery into the cavity. The connection means on the outer side walls of the main body of the battery will engage with the connection means on the inner side walls of the cavity so that when the rechargeable battery is pushed into the cavity of the AMR, the battery is lifted into the cavity with a bottom of the battery suspended above the ground surface (e.g., floor). In this way, the wheels (240*a*, 240*b*) of the rechargeable battery are lifted/elevated off the ground surface. While the connections means are shown in FIGS. 10A and 10B as rails (222*a*') on the sides of the battery 200 that engage with wheels 622A on the inner sides of the cavity on the AMR 100, other connections means are possible and within the scope of the present disclosure, such as wheels, etc. For example, shown in FIGS. 8A, 8B, and 9 are wheels (222*a*, 222*b*) positioned on a side of the battery 200 that may engage with corresponding connection means, e.g., rails, on each of the right and left sides of the cavity in the AMR 100.

Once the rechargeable battery 200 is fully inserted (pushed) into the cavity of the AMR 100, an electrical connection may be established between the two via a connector. A preferred connector includes a blind mate connector on the rechargeable battery which may be configured to make an electrical connection with a blind mate connector 250 on the AMR 100. Shown in FIG. 9 is a blind mate connector 250 positioned on a vertical step-down wall between an upper level 214 and lower level 218 of the top surface of the battery 200. With reference to FIG. 10B, the blind mate connector 250 is shown positioned on a back side of the front wall 210 of the main body of the rechargeable battery 200. This blind mate connector is configured to engage a corresponding blind mate connector on the AMR 100 to electrically connect the at least one battery cell of the rechargeable battery 200 to power supply circuitry of the AMR 100 when the rechargeable battery 200 is installed in the cavity.

As shown in FIGS. 10A and 10B, the rechargeable battery 200 may further include a locking handle 290 or manual release push button for the latch having a locked position and an unlocked position. For example, the locked position may be configured to lock the rechargeable battery 200 in an engaged position on the AMR 100. In the engaged position, the rechargeable battery 200 is fully pushed into the cavity of the AMR and the blind mate connectors on each are connected to provide electrical connection between the two. The unlocked position of the handle may be configured to allowed movement of the rechargeable battery 200 within the cavity of the AMR 100 (e.g., insert or remove the battery from the cavity).

Alternatively, the rechargeable battery 200 may not include an exterior handle but may rather be locked into position within the AMR 100 by an electronic latch, such as a latch that may be activated (i.e., opened or closed) by the AMR 100 or by pressing the manual release push button. Such a configuration would enable manual or autonomous exchange of discharged batteries for charged batteries by the AMR 100.

For example, the AMR 100 may be configured to autonomously swap the rechargeable battery 200 when it is nearly or fully discharged at a charging station 810 such as shown in FIG. 13. The AMR 100 may receive signals from the rechargeable battery 200, such as from a charge sensor configured to sense a charge state of the battery (i.e., charge state of at least one battery cell). Upon receiving a signal indicative of a low charge state of the rechargeable battery 200, the AMR 100 may proceed to an empty charging station 810. Signals related to the status of various charging stations, i.e., occupied or empty, and of the field replaceable batteries 200 docked at any of the charging stations, may be communicated between the AMR 100 and the central server 700 and/or WMS.

Once at an empty charging station 810, the AMR 100 may autonomously unlatch the electronic latch so that the rechargeable battery 200 may be released from the AMR 100 and slide into position on the charging station 810. As shown in FIG. 13, the charging station 810 includes a contact 820, generally a male connector, that may engage with a complementary contact 230, generally a female connector, on the rechargeable battery 200.

The contact 820 on the charging station 810 may be configured to move vertically within a slot 815 on the charging station. As indicated above, when a rechargeable battery 200 is engaged within an AMR, it is elevated above the ground. As such, when an AMR 100 approaches a charging station 810, the contact 820 may be elevated vertically to a position that best enables engagement with the complementary contact 230 of the rechargeable battery 950'.

Upon release of the electronic latch by the AMR 100, the rechargeable battery 950' may slide down and out of the AMR 100 while maintaining connection with the charging station contact 1020, which moves vertically down to match a position of the complementary contact 1030 on the battery.

The AMR 100 may send/receive signals related to the status of this newly positioned rechargeable battery 200, such as proper alignment of the battery on the charging station and active charging of the battery. These signals may be sent from the rechargeable battery 200 and/or the charging station 810 and may be received by the AMR 100 and/or central server 700 (and/or a WMS). In the case that improper alignment, connection, or charging are detected by the charging station 810, further signals may be sent out by any of the AMR 100, rechargeable battery 200, and/or charging station 810 (i.e., those devices participating in the battery docking and charging activity) to summon a human worker to correct the error, or to cause the AMR 100 to re-engage the rechargeable battery 200 and attempt to position the battery on the charging station again.

Thus, a standard autonomous hot-swap of a discharged battery may include signaling between an AMR 100 and the central server 700 and/or a WMS to locate an empty charging station 810, traveling to that charging station, and docking the complementary contact 230 of the rechargeable battery 200 with a contact 820 of the charging station 810. The AMR 100 may then send/receive signals, as detailed above, regarding a successful docking action at the charging station 810, and upon a successful docking action, may unlatch the electronic latch to discharge the rechargeable battery 200 from the internal cavity of the AMR 100 so that it may move away from the charging station. Docking may include simple contact between the charging station contact 820 and the contact 230 of the battery, and/or may further include a physical locking engagement therebetween, such as to avoid accidental disconnect upon exit of the mobile base from the discharged battery.

The AMR 100 may send/receive signals from any of a charging station having a charged battery, the central server 700, and/or a WMS regarding location and charge status of a rechargeable battery 200 that may be used to replace the recently discharged battery. Upon locating a suitable replacement battery, the AMR 100 may proceed to that charging station 810 and drive over/engage the replacement battery within the internal cavity. Once engaged properly within the internal cavity (i.e., connected so that the battery may provide power to the AMR 100 may re-engage the electronic latch to secure the battery therein. The AMR 100 may exit the charging station and proceed with previous duties.

Alternatively, the AMR 100 may not hot-swap the rechargeable battery 200 but may remain positioned on the charging station 810 during charging, i.e., in-AMR charging. In such a case, AMR 100 would dock on the charging station without releasing the battery during charging. When the rechargeable battery 200 is fully charged or if the AMR 100 is sent to perform a task by the central server 700, the AMR 100 would unlatch itself from the charging station 810 and would drive, e.g., proceed within the logistics facility, to perform that task.

The rechargeable battery generally includes at least one rechargeable battery cell. Further, the rechargeable battery may include a charge sensor configured to sense a charge state of the at least one battery cell, and a circuit electrically connected to the charge sensor for receiving a signal indicative of the charge state of the at least one battery cell. Additional sensors may be included which register a temperature, voltage, current, etc. of the at least one battery, and such information (data) may also be relayed via a circuit. Alternatively, each of the sensor signals, e.g., signals related to charge state, temperature, voltage, current, etc., may be sent wirelessly from the rechargeable battery to any of the mobile base, the charging station, and/or the WMS. Additionally, when more than one battery cell is included in the rechargeable battery, each individual battery may include a charge sensor (and optionally additional sensors), which may communication via individual circuits, wirelessly, or may communicate directly, to a battery management system. Such a system manages a rechargeable battery (cell or group of cells), such as by protecting the battery from operating outside its safe operating area, temperature, voltage, etc.; and by monitoring its state, calculating secondary data, reporting that data, controlling its environment, authenticating it and/or balancing the usage of individual cells in a groups of cells.

The rechargeable battery may be part of a power management system that may also include a backup battery to provide power to the AMR 100 when the rechargeable battery is removed or fully discharged. Moreover, the power management system may include a battery docking station, such as the charging station 810 previously discussed, and/or AC plug. In additional to specific signals sent from the rechargeable battery to the AMR 100 and/or remote server, the rechargeable battery may also indicate a charge status on a visible face of the main body of the battery either through one or more lights or a visible readout. Alternatively, or additionally, the rechargeable battery may indicate the charge status by an audible signal that may change (e.g., start at a certain charge state, grow louder and/or increase frequency of signal, etc.) as the battery is progressively discharged. Moreover, the rechargeable battery may be configured with both an electronic latch and a locking handle that enable either or both of electronic and manual connection/disconnection of the battery with an AMR 100.

With reference to FIG. 16, the AMR 100 further includes one or more onboard processors 718, an onboard storage or memory 716, and a remote communication interface 710 that allows communication with external servers (central server 700), the internet, and other similar or dissimilar robots. This communication may be established through a wireless network via a wireless access point. For example, AMR 100 may include a Wi-Fi access point. Moreover, various other types of communication are possible and may be used in addition to, or as an alternative to wireless communication, such as a tethered wire connection or other point-to-point wireless data exchange.

The AMR 100 may contain an external swappable memory port on a side, where necessary information may be uploaded to the AMR directly when the operator inserts a data storage device, thus by-passing the wireless communication to the server. The data storage device may be a disk, USB flash device, or other form of external memory storage device. The data may also be transferred through proximity communication technologies, such as near field communication (NFC), Bluetooth, or short-range radio-frequency identification (RFID) standards. The AMR 100 may be addressable via attachment of an external display screen, keyboard, mouse, and the like. Such interaction may be useful for diagnostic, repair, and update purposes.

With reference to FIGS. 16 through 18, the AMR 100 may move and navigate between locations in a logistics facility 900, such as a work zone 910, an order transfer area 920 (e.g., storage queue, retrieval queue, etc.), induction area 930, and/or charging area 940. During navigation, data from the various sensors (e.g., at least the exteroceptive sensors) may be processed by the onboard computer processor 718 in an autonomy module 712 to extract two modalities of information. The first modality may be local mapping information that indicates which areas around the AMR 100 are traversable and which areas contain obstacles. The second modality may be visual or audible landmark locations, characteristics of which may be stored on the central server 700 and/or on the memory 716 of the AMR 100. When the characteristics of the landmarks are stored on the memory, the AMR 100 may navigate autonomously through a logistics facility and may not require constant communication from the central server 700.

The AMR 100 may include a health monitor module on the processor/memory that may receive signals from the various sensors and may communicate a fault or error state to the central server. As example, the health monitor may register a power loss, or obstacle, or sensor failure, or battery status or battery fault, and may communicate this information to the remote server. The health monitor may cause the AMR 100 to stop, slow movement, signal an audible or visual error state, or change routes, or after receiving signals from the AMR regarding an error or fault state, the central server 700 may cause any of these actions. Certain limits may be dynamically set for the AMR 100 depending on the logistics facility and/or specific job requirements of the AMR 100.

Furthermore, AMR 100 may receive signals from the central server 700, or directly from a warehouse management system (WMS), which may indicate an emergency and may direct the AMR 100 to stop and/or may further activate the one or more safety lights or strobes and/or audible warning annunciator or horn. If an unstable and/or unsafe diagnostic state for the AMR 100 is detected by the one or more AMR processors (i.e., 718 of FIG. 16), the AMR 100 may be stopped. The AMR 100 may also be stopped if the sensors detect an obstacle in proximity or detect unsafe operation of the AMR. Such signals may be processed at the central server 700 which may then control the AMR speed and or direction of operation.

The AMR 100 may also send signals back to the central server 700, the WMS, or to other AMRs regarding conditions in a navigation pathway (e.g., obstacles, unsafe conditions), a condition of the AMR (e.g., unstable and/or unsafe diagnostic state, load state, status of the work order, battery charge state), or a condition of the inventory or warehouse (e.g., no item at pick location, inventory status).

Internal details of components and software relevant to the system are shown in FIGS. 16, which provide block diagrams of a system comprising a central server 700, at least one AMR 100, and at least one user device 30. Components of the smart platform 80 of the AMR 100 disclosed herein are illustrated in FIG. 17.

The central server 700 may have an electronic communications interface (server communication interface 740) that connects with an electronics communication interface on the AMR 100 (remote communication interface 710). This connection may be established through a wireless network via a wireless access point. Various other types of communication are possible and may be used in addition to, or as an alternative to wireless communication, such as a tethered wire connection or other point-to-point wireless data exchange.

The onboard computer processors 718 of the AMR 100 may also have local persistent memory 716 which stores specific information relevant to the configuration of the AMR 100. Such information may include sensor calibration data, actuator tuning parameters, such as for the conveyance system actuators, and other smart platform specific data. The onboard computer processor 718 may also communicate with the central server 700 to receive pick information and respond back with confirmation data to inform the central server 700 of successful picks or any errors that might occur.

Computer Implementation of the Disclosed Methods

Certain of the described methods and/or their equivalents may be implemented with computer executable instructions. Thus, according to aspects of the present disclosure, a non-transitory computer readable/storage medium may be configured with stored computer executable instructions of an algorithm/executable application that, when executed by a machine(s), cause the machine(s) (and/or associated components) to perform any one of the disclosed methods. Example machines include but are not limited to a processor, a computer, a server operating in a cloud computing system, a server configured in a Software as a Service (SaaS) architecture, and so on. According to certain aspects, a computing device is implemented with one or more executable algorithms that are configured to perform any of the disclosed methods. For example, and with reference to FIG. 16, a system of the present disclosure may include a central server 700 that is cloud based and communicates with client devices, i.e., user devices 30 and AMRs 100 via network connections.

The system illustrated in FIG. 16 depicts the central server as providing all software services. As indicated hereinabove, the software and hardware components of the central server 700 that enable the presently claimed systems and methods may be distributed in any number of arrangements. For example, each of the following may be part of the software application layer (i.e., backend services): the task creation and task dispatch module 728, and any associated databases; a warehouse metadata module (i.e., SKU analysis module 726 and SKU database 755); a warehouse task management module and database (i.e., order fulfillment, replenishment, put-away, etc.); a robot-human coordination module; and an integration and communication module and database (generic system communication module, part interfacing with external systems). Each of the following may be part of the presentation layer (i.e., frontend services): a communications module and database; a configuration and map module and databases (i.e., 724, 754); a traffic and route manager module and database (which may include 722, 752); user module and database; and the state management module and database (i.e., 730). Thus, use of the term central server herein refers to any and all of these services (i.e., backend and frontend services), wherein the system may be accessible via the cloud, or may be physically located as provided as hardware and associated software running therein within a logistics facility.

Each of the central server and client devices include a central processing unit (720, 38, 718; CPU, also "processor" and "computer processor" herein), which can be a single core or multi core processor, or a plurality of processors for parallel processing, a memory (e.g., cache, random-access memory, read-only memory, flash memory, or other memory), an electronic storage unit (e.g., hard disk, storage), communication interface (e.g., network adapter) for communicating with one or more other systems, and peripheral devices, such as adapters for cache, other memory, data storage and/or electronic display. Of note, the AMR 100 does not generally include a display device. The memory, storage unit, interface, and peripheral devices may be in communication with the CPU through a communication bus, such as a motherboard.

The system of the present disclosure may be a classical computing system or may rely on quantum interference or quantum superposition to perform a computation, i.e., a quantum computing device. Quantum computing refers to a computational device or method that utilizes properties of quantum states defined by quantum mechanics such as superposition, entanglement, etc., to perform computations. Quantum devices utilize qubits which are the quantum equivalent to bits in a classical computing system. Qubits include at least two quantum states or probable outcomes. These outcomes, combined with a coefficient representing the probability of each outcome, describe the possible states, or bits of data, which can be represented by the qubits according to the principle of quantum superposition. These states can be manipulated which can shift the probability of each outcome or additionally add additional possible outcomes to perform a calculation, the final state of which can be measured to achieve a result. Thus, a major advantage of quantum computing over classical solvers and computer systems is observed in terms of scaling and sampling. While classical solvers rely on sampling one state at a time, quantum annealing can consider multiple states of a search space, and therefore, may determine multiple possible solutions simultaneously.

The system can be operatively coupled to a computer network ("network") with the aid of the communication interface. The network can be the Internet, an internet and/or extranet, or an intranet and/or extranet that is in communication with the Internet. The network in some cases is a telecommunication and/or data network. The network can include one or more computer servers, which can enable distributed computing, such as cloud computing over the network ("the cloud") to perform various aspects of analysis, calculation, and generation of the present disclosure, such as, for example, receiving orders from a WMS and generating a global task list (e.g., tasks for individual robots and pickers to fulfil the orders in the global task list). Such cloud computing may be provided by cloud computing platforms such as, for example, Amazon Web Services (AWS), Microsoft Azure, Google Cloud Platform, and IBM cloud. The network, in some cases with the aid of the computer system, can implement a peer-to-peer network, which may enable devices coupled to the computer system to behave as a client or as a server.

The processor can execute a sequence of machine-readable instructions, which can be embodied in a program or software, e.g., the task dispatch module 728 and traffic management module 722, that can be stored in memory (e.g., 728, 752). The instructions can be directed to the processor (e.g., 720), which can subsequently program or otherwise configure the processor to implement the methods of the present disclosure.

The storage unit(s) can store files, such as drivers, libraries and saved programs. The storage unit can store user data, e.g., user preferences and user programs. The storage unit may be part of the central server 700 or may be a remote database. The computer system in some cases can include one or more additional data storage units that are external to the computer system, such as located on a remote server that is in communication with the computer system through an intranet or the Internet (e.g., SKU database).

Methods as described herein can be implemented by way of machine (e.g., computer processor) executable code stored on an electronic storage location of the computer system, such as, for example, on the memory or electronic storage unit. The machine executable or machine-readable code can be provided in the form of software. During use, the code can be executed by the processor. In some cases, the code can be retrieved from the storage unit and stored on the memory for ready access by the processor. In some situations, the electronic storage unit can be precluded, and machine-executable instructions are stored on memory.

Aspects of the systems and methods provided herein, such as the computer system, can be embodied in programming. Various aspects of the technology can be thought of as "products" or "articles of manufacture" typically in the form of machine (or processor) executable code and/or associated data that is carried on or embodied in a type of machine-readable medium. Machine-executable code can be stored on an electronic storage unit, such as memory (e.g., read-only memory, random-access memory, flash memory) or a hard disk. "Storage" type media can include any or all the tangible memory of the computers, processors or the like, or associated modules thereof, such as various semiconductor memories, tape drives, disk drives and the like, which may provide non-transitory storage at any time for the software programming.

All or portions of the software may at times be communicated through the Internet or various other telecommunication networks. Such communications, for example, may enable loading of the software from one computer or processor into another, for example, from a host computer into the computer platform of an application server. Thus, another type of media that can bear the software elements includes optical, electrical, and electromagnetic waves, such as used across physical interfaces between local devices, through wired and optical landline networks and over various air-links. The physical elements that carry such waves, such as wired or wireless links, optical links or the like, also can be considered as media bearing the software. As used herein, unless restricted to non-transitory, tangible "storage" media, terms such as computer or machine "readable medium" refer to any medium that participates in providing instructions to a processor for execution.

Hence, a machine-readable medium, such as computer-executable code, may take many forms, including but not limited to, a tangible storage medium, a carrier wave medium, or physical transmission medium. Non-volatile storage media include, for example, optical or magnetic disks, such as any of the storage devices in any computer(s) or the like, such as can be used to implement the databases, etc. shown in the drawings. A "database," as used herein, may refer to a digitally stored data in the form of a table, a set of digitally stored tables, and a set of data stores (e.g., disks) and/or methods for accessing and/or manipulating those data stores. Volatile storage media include dynamic memory, such as main memory of such a computer platform. Tangible transmission media include coaxial cables, copper wire and fiber optics, including the wires that comprise a bus within a computer system.

Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave. or any other medium from which a computer may read programming code and/or data. Many of these forms of computer readable media can be involved in carrying one or more sequences of one or more instructions to a processor for execution.

The computer system can include or be in communication with an electronic display that comprises a user interface (UI) for providing, for example, AMR and picker numbers and configurations, logistics facility map data, and the like. Examples of UIs include, without limitation, a graphical user interface (GUI) and web-based user interface.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The computer readable program instructions may execute entirely on a client device (100, 30), partly on the client device, as a stand-alone software package, partly on the client computer and partly on a remote computer or entirely on the remote computer or server. In various implementations, a set of APIs, such as RESTful APIs, may be available for a user to integrate the systems and software disclosed herein with their existing application(s), or to allow for customization and optimization. The APIs may provide similar functions as available via the cloud platform. In some designs, the APIs may be available for both desktop and mobile applications. Some exemplary APIs may also be designed for the companies interested in utilizing the systems disclosed herein for clinical studies, such as for monitoring and data gathering purposes.

While specific embodiments of the invention have been described in detail, it should be appreciated by those skilled in the art that various modifications and alternations and applications could be developed in light of the overall teachings of the disclosure. Accordingly, the particular arrangements, systems, apparatuses, and methods disclosed are meant to be illustrative only and not limiting as to the scope of the invention.

The present disclosure relates to robotic systems for picking and putting within a logistics facility, such as for order fulfilment, replenishment of inventory, case and multipack break apart and storage, and the like. Accordingly, in addition to the aspects provided in the claims, the following aspects are considered as part of the disclosed invention described therein:

Aspect 1: A method for picking within a logistics facility, the method comprising: receiving, at a central server, a plurality of item orders each including at least one item to be picked; generating, at the central server, a robot task list comprising a list of stop locations within the logistics facility, and a first picker task list comprising a first item in one or more item orders of a group of item orders assigned to a robot, a number of the first item to be picked, a location of the first item within the logistics facility, and an identity of the robot; sending, from the central server, the robot task list to a processor of the robot; calculating, at the robot processor, a route within the logistics facility to each of the stop locations, and sending output control signals to a drive system of the robot for autonomous navigation to a first stop location in the list of stop locations; and sending, from the central server, the first picker task list to a processor of a user device worn or carried by a first human picker.

Aspect 2: The picking method according to aspect 1, comprising: receiving, at the central server, a scan signal from the user device of the first human picker, wherein the scan signal includes information from a read by the user device of any one or more of: an item ID tag on the first item, a shelf ID tag on a shelf holding the first item, and a bin ID tag of a bin in which the first item is stored on the shelf; receiving, at the robot processor from the central server, an instruction to illuminate a subset of indicators on a platform of the robot to designate a target tote positioned on the platform and a first number of the first item to be placed in the target tote by the first human picker; illuminating the subset of indicators on the platform of the robot and displaying the first number of the first item; and receiving a verification signal indicating the first item is received in the target tote, and sending the verification signal to the central server, wherein the robot receives items from a plurality of human pickers and each human picker delivers items to more than one robot, and wherein the central server determined timing for sending the first picker task list to the first human picker based on a location of the robot.

Aspect 3: The picking method according to any one of aspects 1 to 2, wherein illuminating the subset of indicators on the platform of the robot comprises sending a command from the robot processor to a pick to light controller based on the instruction received from the central server, wherein the instruction from the central server is not sent until the scan signal from the user device of the first human picker is received.

Aspect 4: The picking method according to any one of aspects 1 to 3, wherein the platform of the robot comprises an array of indicators spaced along opposing first and second horizontal edges thereof, and a pick to light controller in communication with the array of indicators and the robot processor, and wherein the method further comprises: illuminating a next subset of indicators on the platform to designate a next target tote to receive the first item from the first human picker, wherein the next subset of indicators display a next number of the first item to be placed in the next target tote by the first human picker; and receiving, at the processor of the robot from the pick to light controller, a next verification signal indicating the first item is received in the next target tote, and sending the next verification signal to the central server.

Aspect 5: The picking method according to any one of aspects 1 to 4, wherein the steps of illuminating the next subset of indicators and receiving the next verification signal are continued until all of the first item picked by the first human picker are received to totes on the robot, wherein the method further comprises: sending output control signals to the drive system of the robot for autonomous navigation to a next stop location in the list of stop locations; and receiving a next item from a next human picker, wherein the next item is found in one or more of the item orders of the group of item orders assigned to the robot.

Aspect 6: The picking method according to any one of aspects 1 to 5, wherein the steps of illuminating the next subset of indicators and receiving the next verification signal are continued until all of the first item picked by the first human picker are received to totes on the robot, wherein the method further comprises: generating, at the central server, a next task list for the first human picker comprising a second item in one or more of the item orders assigned to the robot, a number of the second item to be picked, a location of the second item within the logistics facility, and the identity of the robot; sending, from the central server, the next task list to the processor of the user device of the first human picker; receiving, at the central server, a second scan signal from the user device of the first human picker, wherein the second scan signal includes information from a read by the user device of any one or more of: an item ID tag on the second item, a shelf ID tag on a shelf holding the second item, and a bin ID tag of a bin in which the second item is stored on the shelf; receiving, at the robot processor from the central server, an instruction to illuminate a new subset of indicators on to designate a new target tote positioned on the platform and a first number of the second item to be placed in the new target tote by the first human picker; illuminating the new subset of indicators to display the first number of the second item; and receiving a new verification signal indicating the second item is received in the new target tote, and sending the new verification signal to the central server.

Aspect 7: The picking method according to any one of aspects 1 to 6, wherein the steps of illuminating the new subset of indicators and receiving the new verification signal are continued until all of the second item picked by the first human picker are received to totes on the robot, wherein the method further comprises: sending output control signals to the drive system of the robot for autonomous navigation to a next stop location in the list of stop locations; and receiving a next item in one or more of the item orders from a next human picker.

Aspect 8: The picking method according to any one of aspects 1 to 7, wherein the steps of illuminating the next subset of indicators and receiving the next verification signal are continued until all of the first item picked by the first human picker are received to totes on the robot, wherein the method further comprises: generating, at the central server, a second picker task list comprising a second item in one or more of the item orders assigned to the robot, a number of the second item to be picked, a location of the second item within the logistics facility, and the identity of the robot; sending, from the central server, the second picker task list to a processor of a user device worn or carried by a second human picker; and receiving, at the central server, a second scan signal from the user device of the second human picker, wherein the second scan signal includes information from a read by the user device of any one or more of: an item ID tag on the second item, a shelf ID tag on a shelf holding the second item, and a bin ID tag of a bin in which the second item is stored on the shelf; receiving, at the robot processor from the central server, an instruction to illuminate a new subset of indicators on the platform of the robot to designate a new target tote positioned on the platform and a first number of the second item to be placed in the new target tote by the second human picker; illuminating the new subset of indicators on the platform of the robot to display the first number of the second item; and receiving, at the robot processor from the pick to light controller, a second verification signal indicating the second item is received in the new target tote, and sending the second verification signal to the central server.

Aspect 9: The picking method according to any one of aspects 1 to 8, wherein the steps of illuminating the new subset of indicators and receiving the second verification signal are continued until all of the second item picked by the second human picker are received to totes on the robot, wherein the method further comprises: sending output control signals to the drive system of the robot for autonomous navigation to a next stop location in the list of stop locations; and receiving a next item in one or more of the item orders assigned to the robot from a next human picker.

Aspect 10: The picking method according to any one of aspects 1 to 9, wherein illuminating the new subset of indicators on the platform of the robot comprises sending a command from the robot processor to the pick to light controller based the instruction received from the central server, wherein the instruction from the central server is not sent until the second scan signal from the user device of the second human picker is received.

Aspect 11: The picking method according to any one of aspects 1 to 10, wherein calculating the route within the logistics facility to each of the stop locations comprises:

determining the route based on a facility map of the logistics facility stored in a memory of the robot, wherein the facility map defines virtual roads navigatable by the robot, and wherein the virtual roads include a plurality of nodes.

Aspect 12: The picking method according to any one of aspects 1 to 11, wherein the robot is configured to communicated with the central server at each node on the navigation route to receive a stop or proceed instruction based on traffic of other robots in the logistics facility.

Aspect 13: The picking method according to any one of aspects 1 to 12, wherein the platform of the robot comprises an array of indicators spaced along opposing first and second horizontal edges thereof, and a pick to light controller in communication with the array of indicators and the robot processor, wherein each indicator in the array of indicators comprises a seven-segment display and an assignable selection button comprising an LED and, based on the instruction received by the robot processor from the central server, the pick to light controller causes the selection buttons of the subset of indicators defining the position of the target tote on the platform to illuminate or change color and at least one of the seven-segment displays of the subset of indicators to display the first number of the first item.

Aspect 14: The picking method according to any one of aspects 1 to 13, wherein the pick to light controller further causes the selection buttons of the subset of indicators defining the position of the target tote on the platform to darken or change color when one of the selection buttons of the subset of indicators is selected.

Aspect 15: The picking method according to any one of aspects 1 to 14, wherein all items for each item order are grouped in a single tote.

Aspect 16: The picking method according to any one of aspects 1 to 15, wherein item orders may be grouped to be received in totes on different robots based on any one or more of requested delivery time, shipper cutoff time, number of items in the order, and availability of items in the order.

Aspect 17: The picking method according to any one of aspects 1 to 16, wherein multiple item orders each comprising a single item are grouped to be received in a single tote.

Aspect 18: The picking method according to any one of aspects 1 to 17, wherein the central server dynamically updates the robot task list based on any one or more or availability of human pickers, availability of items in an order, shipper cutoff time, number of items in the order, and to accommodate quick-ship order requests.

Aspect 19: The picking method according to any one of aspects 1 to 18, wherein the central server dynamically generates each picker task list to include an assigned item and assigned robot based on current availability of robots, availability of items in an order, shipper cutoff time, number of items in the order, and to accommodate quick-ship order requests.

Aspect 20: The picking method according to any one of aspects 1 to 19, wherein the robot is part of a group of robots assigned to a team of human pickers, and wherein individual human pickers in the team are selected based on experience level, error rate, and efficiency.

Aspect 21: The picking method according to any one of aspects 1 to 20, wherein the robot is part of a group of robots assigned to a team of human pickers, and wherein performance data is collected for each team of human pickers.

Aspect 22: A method for configuring an autonomous mobile robot for a pick action, the method comprising: generating at a central server an induction configuration for a mobile robot, wherein the induction configuration includes a target location for at least one tote on a platform of the mobile robot; sending the induction configuration to a processor of the mobile robot and a user device; causing a subset of indicators of an array of indicators positioned on opposing first and second horizontal edges of a platform on the mobile robot to illuminate, wherein the subset of indicators define a target location for a first tote on the platform; receiving from the user device a scan of an ID tag on a tote that is to be positioned on the target location; and receiving a signal from the mobile robot indicating the tote has been placed on the target location.

Aspect 23: The induction method of aspect 22, further comprising: causing a next set of indicators to illuminate, wherein the next set of indicators define a target location for a next tote on the platform; receiving from the user device a scan of an ID tag on a next tote that is to be positioned on the target location; receiving a signal from the mobile robot indicating the next tote has been placed on the target location; and repeating the process until all totes in the induction configuration are positioned on the platform of the mobile robot.

Aspect 24: The induction method of aspect 22 or 23, wherein the mobile robot comprises a mobile base having two or more platforms positioned above and vertically separated from the mobile base and from each other, each platform further comprising a pick to light controller in communication with the array of indicators and a processor of the mobile robot, wherein the induction configuration includes totes positioned on each of the two or more platforms.

Aspect 25: The induction method according to any one of aspects 22 to 24, wherein the induction configuration comprises totes of different sizes, colors, or both.

Aspect 26: The induction method according to any one of aspects 22 to 25, wherein the pick to light controller is configured to illuminate subsets of the array of indicators to define individual regions of the platform that delimit positions for tote placement based on instructions from the processor, and wherein the memory comprises computer program instructions executable by the processor to receive data from and send data to a central server, process data received from each of the plurality of sensors, and output control signals to the mobile base for autonomous navigation and obstacle avoidance.

Aspects 27: A method for configuring an autonomous mobile robot for a pick action, the method comprising: generating at a central server an induction configuration for a mobile robot, wherein the induction configuration includes a target location for at least one tote on a platform of the mobile robot; sending the induction configuration to a processor of the mobile robot and a user device; causing a subset of indicators of an array of indicators positioned on opposing first and second horizontal edges of a platform on the mobile robot to illuminate, wherein the subset of indicators define a target location for a first tote on the platform; receiving from the user device a scan of an ID tag on a tote that is to be positioned on the target location; receiving a signal from the mobile robot indicating the tote has been placed on the target location.

Aspect 28: The method for induction according to aspect 27, further comprising: causing a next set of indicators to illuminate, wherein the next set of indicators define a target location for a next tote on the platform; receiving from the user device a scan of an ID tag on a next tote that is to be positioned on the target location; receiving a signal from the mobile robot indicating the next tote has been placed on the target location; and repeating the process until all totes in the induction configuration are positioned on the platform of the mobile robot.

Aspect 29: The method for induction according to aspect 27 or 28, wherein the mobile robot comprises a mobile base having two or more platforms positioned above and vertically separated from the mobile base and from each other, each platform further comprising a pick to light controller in communication with the array of indicators and a processor of the mobile robot, wherein the induction configuration includes totes positioned on each of the two or more platforms.

Aspect 30: The method for induction according to any one of aspects 27 to 29, wherein the induction configuration comprises totes of different sizes, colors, or both.

Aspect 31: The method for induction according to any one of aspects 27 to 30, wherein the pick to light controller is configured to illuminate subsets of the array of indicators to define individual regions of the platform that delimit positions for tote placement based on instructions from the processor, and wherein the memory comprises computer program instructions executable by the processor to receive data from and send data to a central server, process data received from each of the plurality of sensors, and output control signals to the mobile base for autonomous navigation and obstacle avoidance.

What is claim is:

1. An autonomous mobile robot comprising:
a mobile base comprising a processor, a memory, a remote communication interface, and sensors including forward and rear facing cameras and a navigation sensor; and
a platform positioned above and vertically separated from the mobile base, the platform comprising:
an array of indicators spaced along each of a first horizontal edge of the platform and a second horizontal edge of the platform, and
a pick to light controller in communication with the array of indicators and the processor of the mobile base,
wherein the array of indicators of the first horizontal edge of the platform are configured to operate separately from or in tandem with the array of indicators of the second horizontal edge of the platform,
wherein both the mobile base and the platform are do not include a display device and users interact with the robot via the array of indicators,
wherein the pick to light controller is configured to illuminate subsets of the array of indicators to define individual regions of the platform that delimit positions for tote placement based on instructions from the processor, and
wherein the memory comprises computer program instructions executable by the processor to receive data from and send data to a central server, process data received from each of the plurality of sensors, and output control signals to the mobile base for autonomous navigation and obstacle avoidance.

2. The robot of claim 1, wherein each indicator in the array of indicators comprises a seven-segment display and an assignable selection button comprising an LED and, based on instruction received by the processor from the central server, the pick to light controller is configured to cause a target subset of indicators to define a position of a target tote on the platform, wherein the selection buttons of the target set of indicators illuminate or change color and at least one of the seven-segment displays of the target set of indicators display a number of items to be placed in the target tote.

3. The robot of claim 2, wherein the pick to light controller is further configured to cause the selection buttons of the target set of indicators defining the position of the target tote on the platform to darken or change color when one of the selection buttons of the target set of indicators is selected, and wherein the mobile base is configured to send a pick complete signal to the central server when the one of the selection buttons is selected.

4. The robot of claim 2, wherein the pick to light controller is configured to cause the selection buttons of each subset of the array of indicators to illuminate with a different or alternating light color to delimit positions for tote placement.

5. The robot of claim 1, comprising two or more platforms positioned above and vertically separated from the mobile base and from each other.

6. The robot of claim 5, wherein each of the two or more platforms are supported by at least two vertical posts attached to a top surface of the mobile base, wherein each of the at least two platforms is adjustably attachable to the two or more vertical posts along opposing third and fourth horizonal edges thereof.

7. The robot of claim 1, wherein the navigation sensor comprises a laser ranging device or a fish-eye camera.

8. The robot of claim 1, wherein the processor of the mobile base is configured to:
receive from the central server a task list comprising a list of coordinates of stop locations, and
determine a navigation route to each of the stop locations based on a facility map of a logistics facility stored in the memory of the mobile base,
wherein the facility map defines virtual roads navigatable by the mobile base, and wherein the virtual roads include a plurality of nodes.

9. The robot of claim 8, wherein the robot is configured to communicate with the central server at each node on the navigation route to receive a stop or proceed instruction based on traffic of other robots in the logistics facility.

10. A system for order fulfillment in a logistics facility, the system comprising:
an autonomous mobile robot comprising:
a mobile base comprising a processor, a memory, a remote communication interface, and sensors including forward and rear facing cameras and a navigation sensor, and
a platform positioned above and vertically separated from the mobile base, the platform comprising an array of indicators spaced along each of a first horizontal edge of the platform and a second horizontal edge of the platform, and a pick to light controller in communication with the array of indicators and the processor of the mobile base,
wherein the array of indicators of the first horizontal edge of the platform are configured to operate separately from or in tandem with the array of indicators of the second horizontal edge of the platform, wherein both of the mobile base and the platform are absent a display screen or user interface configured for data input, wherein the pick to light controller is configured to illuminate subsets of the array of indicators to define individual regions of the platform that delimit positions for tote placement based on instructions from the processor, and wherein the memory comprises computer program instructions executable by the processor to receive data from and send data to a central server, process data received from each of the plurality of sensors, and output control signals to the mobile base for autonomous navigation and obstacle avoidance; and a user device designed to be worn or held by a human picker, the user device comprising: a housing comprising a reader processor, a reader memory, a reader communication interface, a reader sensor, and a display screen, wherein the user device is configured to receive from the central server identification information for a pick or put item and a number of the pick or put item, and display the identification information and number on the display screen, and wherein users interact with the robot via the array of indicators.

11. The system of claim 10, wherein the user device is further configured to read any one or more of: an item ID tag on the pick or put item, a shelf ID tag on a shelf holding the pick or put item, and a bin ID tag of a bin in which the pick or put item is stored on the shelf, and send information regarding the read to the central server.

12. The system of claim 10, wherein each indicator in the array of indicators comprises a seven-segment display and an assignable selection button comprising an LED and, based on instruction received by the processor from the central server, the pick to light controller is configured to cause a target subset of indicators to define a position of a target tote on the platform, wherein the selection buttons of the target set of indicators illuminate or change color and at least one of the seven-segment displays of the target set of indicators display a number of items to be placed in the target tote.

13. The system of claim 12, wherein the pick to light controller is further configured to cause the selection buttons of the target set of indicators defining the position of the target tote on the platform to darken or change color when one of the selection buttons of the target set of indicators is selected, and wherein the mobile base is configured to send a pick complete signal to the central server when the one of the selection buttons is selected.

14. The system of claim 12, wherein the pick to light controller is configured to cause the selection buttons of each subset of the array of indicators to illuminate with a different or alternating light color to delimit positions for tote placement.

15. The system of claim 10, wherein the navigation sensor of the mobile robot comprises a laser ranging device or a fish-eye camera.

16. The system of claim 10, wherein the processor of the mobile base is configured to:

receive, from the central server, a task list comprising a list of coordinates of stop locations, and determine a navigation route to each of the stop locations based on a facility map of a logistics facility stored in the memory of the mobile base, wherein the facility map defines virtual roads navigatable by the mobile base, and wherein the virtual roads include a plurality of nodes.

17. The system of claim 16, wherein the robot is configured to communicate with the central server at each node on the navigation route to receive a stop or proceed instruction based on traffic of other robots in the logistics facility.

\* \* \* \* \*